United States Patent
Ijiri

(10) Patent No.: US 9,688,237 B2
(45) Date of Patent: Jun. 27, 2017

(54) SEATBELT RETRACTOR

(71) Applicant: ASHIMORI INDUSTRY CO., LTD., Osaka-shi, Osaka (JP)

(72) Inventor: Takayoshi Ijiri, Neyagawa (JP)

(73) Assignee: ASHIMORI INDUSTRY CO., LTD., Osaka-shi (JP)

( * ) Notice: Subject to any disclaimer, the term of this patent is extended or adjusted under 35 U.S.C. 154(b) by 185 days.

(21) Appl. No.: 14/412,077

(22) PCT Filed: Jul. 3, 2013

(86) PCT No.: PCT/JP2013/068259
§ 371 (c)(1),
(2) Date: Dec. 30, 2014

(87) PCT Pub. No.: WO2014/010487
PCT Pub. Date: Jan. 16, 2014

(65) Prior Publication Data
US 2015/0158457 A1    Jun. 11, 2015

(30) Foreign Application Priority Data
Jul. 13, 2012    (JP) .................. 2012-157421

(51) Int. Cl.
*B60R 22/34*    (2006.01)
*B60R 22/405*    (2006.01)

(52) U.S. Cl.
CPC .......... *B60R 22/341* (2013.01); *B60R 22/405* (2013.01)

(58) Field of Classification Search
CPC .............................. B60R 22/34; B60R 22/341
See application file for complete search history.

(56) References Cited

U.S. PATENT DOCUMENTS 6,047,914 A      4/2000   Sasaki
6,276,626 B1 *   8/2001   Tanaka ................ B60R 22/4676
                                                             242/379.1

(Continued)

FOREIGN PATENT DOCUMENTS

JP    H11-157416 A    6/1999
JP    2006-240618 A   9/2006
JP    2010-089528 A   4/2010

OTHER PUBLICATIONS

Jan. 13, 2015 International Preliminary Report on Patentability issued in Application No. PCT/JP2013/068259.

(Continued)

*Primary Examiner* — Sank Kim
(74) *Attorney, Agent, or Firm* — Oliff PLC

(57) ABSTRACT

A lock member includes a closed cylindrical portion having lock teeth and a fixation boss provided inside the cylindrical portion and inserted in a fitting hole formed at one end of the take-up drum and facing the take-up drum along an axial direction of the cylindrical portion. A stopper mechanism includes a ring member whose inner peripheral surface is mounted on the fixation boss and whose outer peripheral surface is fitted in the fitting hole so as to prohibit relative rotation with respect to the fitting hole. The ring member is movable relative to the fixation boss in the axial direction of the take-up drum by the relative rotation with respect to the fixation boss. Further, movable area allowed for the ring member to move on the fixation boss axially outward with respect to the take-up drum has an movable end located inside of the closed cylindrical portion.

9 Claims, 25 Drawing Sheets

(56) References Cited

U.S. PATENT DOCUMENTS

| 7,152,824 B2* | 12/2006 | Shiotani | B60R 22/3413 |
| | | | 242/379.1 |
| 2011/0121120 A1* | 5/2011 | Ogawa | B60R 22/4676 |
| | | | 242/379.1 |

OTHER PUBLICATIONS

Oct. 15, 2013 International Search Report issued in Application No. PCT/JP2013/068259.

May 10, 2016 Notification of Grounds for Rejection issued in Japanese Patent Application No. 2012-157421.

* cited by examiner

SEATBELT RETRACTOR

TECHNICAL FIELD

The present invention relates to a seatbelt retractor which prevents a webbing from being drawn out in case of an emergency such as vehicle collision.

BACKGROUND ART

Conventionally, there have been proposed various types of seatbelt retractors which prevent a webbing from being drawn out in case of an emergency such as vehicle collision, and specifically seatbelt retractors which absorb energy acting on a vehicle occupant in case of an emergency such as vehicle collision and eventually, restrain the occupant securely by the webbing.

For instance, in a seatbelt retractor disclosed in Japanese Laid-open Patent Application Publication No. 2006-240618, a stopper mechanism fastens a ratchet wheel and a take-up drum in a relatively non-rotatable manner, and has a ring member screwed to engage on the outside through a threading engagement mechanism at a cylindrical portion of the ratchet wheel. The ratchet wheel is coupled to a spline shaft portion of a spindle shaft so as to be relatively non-rotatable. This ring member is fitted inside an engagement hole of the take-up drum and arranged in a manner relatively non-rotatable with regard to the take-up drum, and relatively movable in an axial direction of the take-up drum.

This threading engagement mechanism includes an internal thread portion formed on the inner periphery of the ring member, and an external thread portion formed on the outer periphery of the cylindrical portion of the ratchet wheel and being engaged with the internal thread portion. The ring member moves in the axial direction of the take-up drum when the ring member rotates relative to the cylindrical portion. Then, the axially outer end face of the ring member makes contact with the axially inner end face of a guiding portion of the ratchet wheel so that the ring member and the cylindrical portion are integrated and become relatively non-rotatable.

DISCLOSURE OF THE INVENTION

Problem to be Solved by the Invention

However, in such a conventional seatbelt retractor as disclosed in the above-described patent publication, a guiding portion, a gear portion and a cylindrical portion are integrally formed in a ratchet wheel. The gear portion has a ratchet gear formed on the outer periphery thereof. The guiding portion is smaller than the gear portion in diameter, and provided closer to the take-up drum side in the axial direction thereof. The cylindrical portion is smaller than the guiding portion in diameter, extended to the take-up drum side in the axial direction thereof, and provided with an external thread portion. The cylindrical portion provided with the external thread portion is formed at a location away from the gear portion and closer to the take-up drum in the axial direction thereof.

Accordingly, in order to secure movement amount allowed for the ring member to rotate relative to the cylindrical portion and move in the axial direction, it is necessary to enlarge the stopper mechanism toward the take-up drum side in the axial direction by a length of the cylindrical portion corresponding to the movement amount. Whereas, if the stopper mechanism is enlarged to the take-up drum side in the axial direction, the fitting hole of the take-up drum becomes deeper toward the webbing than a right brimmed portion of the take-up drum, causing interference with the webbing inserted from a webbing insertion opening of the take-up drum, so that it becomes difficult to mount the webbing onto the take-up drum. In order to avoid this adverse effect, in the stopper mechanism, the side opposite to the take-up drum in the axial direction has to be made larger. As a result, it has been difficult to downsize the seatbelt retractor in the axial direction of the take-up drum.

The present invention has been made in view of the above-described problems and an object thereof is to provide a seatbelt retractor capable of downsizing in the axial direction of the take-up drum a stopper mechanism that fastens a lock member and a take-up drum in a relatively non-rotatable manner.

Means for Solving the Problem

To achieve the object of the present invention, there is provided seatbelt retracter comprising:
  a take-up drum onto which a webbing is wound;
  a lock mechanism having a lock member that is arranged near one end of the take-up drum and connected to the take-up drum with relative rotation between the take-up drum and the lock member being prohibited, the lock member being prohibited from rotating in a webbing-pull-out direction in a case of emergency, and the take-up drum being allowed a relative rotation with respect to the lock member when force to pull out the webbing exceeds a predetermined value in a state that the lock member is prohibited from rotating in the webbing-pull-out direction;
  an energy absorption mechanism arranged between the take-up drum and the lock member and configured to absorb energy by allowing the relative rotation between the take-up drum and the lock member; and
  a stopper mechanism configured to stop the relative rotation between the take-up drum and the lock member when the take-up drum is rotated at a predetermined number of times relative to the locking member,
  wherein the lock member includes:
    a closed cylindrical portion having lock teeth; and
    a fixation boss provided inside of the closed cylindrical portion and inserted in a fitting hole formed at the one end of the take-up drum and facing to the take-up drum along an axial direction of the closed cylindrical portion,
  wherein the stopper mechanism includes a ring member of which inner peripheral surface is mounted on the fixation boss and of which outer peripheral surface is fitted in the fitting hole so as to prohibit relative rotation with respect to the fitting hole, the ring member being movable relative to the fixation boss in the axial direction of the take-up drum by the relative rotation with respect to the fixation boss, and
  wherein movable area allowed for the ring member to move on the fixation boss axially outward with respect to the take-up drum has an movable end located inside of the closed cylindrical portion.

In the seatbelt retractor, the lock member includes: the closed cylindrical portion having the lock teeth; and the fixation boss provided inside of the closed cylindrical portion and inserted in the fitting hole formed at the one end of the take-up drum along an axial direction of the closed cylindrical portion. Further, the stopper mechanism includes the ring member of which inner peripheral surface is mounted on the fixation boss and of which outer peripheral surface is fitted in the fitting hole formed at the one end of the take-up drum so as to prohibit relative rotation with respect to the fitting hole. The ring member is movable relative to the fixation boss in the axial direction of the take-up drum by the relative rotation with respect to the fixation boss. Further, the movable area allowed for the ring member to move on the fixation boss axially outward with respect to the take-up drum has an movable end located inside of the closed cylindrical portion.

A base end portion of the fixation boss is located inside of the closed cylindrical portion having the lock teeth on outer periphery thereof. Thus, the movable area allowed for the ring member to move on the fixation boss axially outward is defined inside of the closed cylindrical portion. Accordingly, size reduction of axial directional size can be achieved with respect to the stopper mechanism that consists of the fixation boss and ring member and serves to fasten the lock member and the take-up drum together so as to prohibit relative rotation therebetween. Eventually, size reduction of axial directional size can be achieved with respect to the seatbelt refractor, as well.

Further, the movable area allowed for the ring member to move on the fixation boss axially outward is set at a location inside of the closed cylindrical portion. Thereby, while dimensional design limitation in axial directional size of the seatbelt retractor is suppressed, movement amount of the ring member can easily be secured and the number of times of relative rotations allowed for the take-up drum with respect to the lock member can be set freely.

In the inventive seatbelt refractor, the lock member may include: a ratchet gear member that has the closed cylindrical portion; and a fixation member being fixed to the ratchet gear member so as to prohibit relative rotation with respect to the ratchet gear member and having the fixation boss on a center portion thereof facing to the take-up drum.

In the seatbelt refractor, the lock member consists of: the ratchet gear member having the closed cylindrical portion with lock teeth thereon; and the fixation member being fixed to the ratchet gear member so as to prohibit relative rotation with respect to the ratchet gear member and having the fixation boss on a center portion thereof bacing to the take-up drum. Thus, since the ratchet gear member and the fixation member can be separately manufactured, the closed cylindrical portion and the fixation boss can be formed easily. Further, since the ratchet gear member and the fixation member can be separately manufactured, the closed cylindrical portion and the fixation boss can be made from different material. Accordingly, degree of design freedom of material and manufacturing method can be increased while mechanical strength of the fixation boss is easily secured and weight reduction of the lock member is achieved concurrently.

In the inventive seatbelt retractor, the outer peripheral surface of the ring member may be fitted in the fitting hole so that the ring member can relatively move with respect to the fitting hole in the axial direction.

In the seatbelt retractor, the outer peripheral surface of the ring member is fitted in the fitting hole formed at the one end side of the take-up drum so that ring member can relatively move with respect to the fitting hole in the axial direction. Accordingly, the ring member is allowed to rotate and move in the axial direction when the lock member relatively rotates with respect to the take-up drum. Further, freedom in setting the number of times of relative rotations allowed for the take-up drum with respect to the lock member can be extended.

In the inventive seatbelt retractor, the movable end of the movable area allowed for the ring member to move on the fixation boss axially outward with respect to the take-up drum may be at a location where the ring member gets in contact with a base end portion of the fixation boss, and the stopper mechanism may stop relative rotation between the take-up drum and the lock member by allowing the ring member to get in contact with the base end portion of the fixation boss.

In the seatbelt retractor, the stopper mechanism stops relative rotation between the take-up drum and the lock member by allowing the ring member to get in contact with the vase end portion of the fixation boss. Therefore, stopping strength of the stopper mechanism can easily be secured.

In the inventive seatbelt retractor, the fitting hole may be formed in a stepped portion that is substantially cylindrical shaped and configured to project from the one end of the take-up drum axially outward and the stepped portion may be inserted in the closed cylindrical portion of the ratchet gear member.

In the seatbelt retractor, the fitting hole for allowing insertion of the fixation boss is formed in the stepped portion that is substantially cylindrical shaped and configured to project from the one end of the take-up drum axially outward and the stepped portion is inserted in the closed cylindrical portion of the ratchet gear member. Thereby, while dimensional design limitation in axial directional size of the seatbelt retractor is suppressed, the fitting hole can be formed in the take-up drum, movement amount of the ring member can easily be secured and the number of times of relative rotations allowed for the take-up drum with respect to the lock member can be set freely.

In the inventive seatbelt retractor, the fitting hole may have a deepest position in the axial direction of the take-up drum at a location near a flange portion that is extended radially outward from an outer periphery of the one end of the take-up drum.

In the seatbelt retractor, since maximum depth of the fitting hole in the axial direction of the take-up drum is set at a location near a flange portion that is extended radially outward from an outer periphery at the one end of the take-up drum, the fitting hole can be formed in the one end of the take-up drum without influence on attachment of the webbing to the take-up drum. Accordingly, without considering the attachment of the webbing to the take-up drum, size of the fitting hole can be made as large as possible with respect to the outer diameter of the stepped portion and that of the flange portion that is extended radially outward from the periphery thereof at the one end of the take-up drum. In other words, the size of the fitting hole can be made as large as possible just paying attention to mechanical strength thereof.

Since outer diameter of the ring member can be made large, strength of the ring member can be secured easily. Further, thickness of the ring member can be made thinner, downsizing of the stopper mechanism can be achieved with respect to axial directional size thereof and eventually, downsizing of the seatbelt retractor can be achieved with respect to axial directional size thereof, as well. Further, since outer diameter of the fixation boss can be made large, mechanical strength of the stopper mechanism can be secured easily.

In the inventive seatbelt retractor, the ratchet gear member may have a connecting portion provided inside of the closed cylindrical portion and including a through hole and the fixation member may be attached to the connecting portion so that the fixation member is fitted in at least a part of the through hole.

In the seatbelt retractor, the fixation member can be attached to the connecting portion so that the fixation member is fitted in at least a part of the through hole, which can achieve downsizing of the connecting portion to which the fixation member is attached with respect to axial directional size thereof.

In the inventive seatbelt retractor, the connecting portion may include a plurality of mounting pieces extended radially inward from the inner peripheral surface of the closed cylindrical portion, the fixation member may include a brim-like portion configured to project radially outward from the base end portion of the fixation boss with respect to rotational axis of the take-up drum, and the brim-like portion may include a plurality of concave portions at a radiailly outer peripheral portion so that the plurality of mounting pieces are fitted in the plurality of concave portions, and the brim-like portion may be attached to the connecting portion so that the plurality of mounting pieces are fitted in the plurality of concave portions and the fixation member is attached to the ratchet gear member so as to prohibit relative rotation therebetween.

In the seatbelt retractor, the fixation member includes the brim-like portion configured to project radially outward from the base end portion of the fixation boss with respect to the rotational axis direction of the take-up drum. By fitting the plurality of mounting pieces in the plurality of concave portions that are formed at the outer peripheral portion of the brim-like portion, the fixation member is attached to the ratchet gear member so as to prohibit relative rotation therebetween. Thus, there can be simplified the mechanical structure to attach the fixation member to the ratchet gear member so as not to rotate relatively therebetween.

In the inventive seatbelt retractor, the ratchet gear member may include a plurality of pins arranged so as to erect on the connecting portion, and the fixation member may include a plurality of notch portions formed on an outer peripheral portion of the brim-like portion so that the plurality of pins are fitted in the plurality of notch portions. Further, heads of the plurality of pins may be configured to project from the plurality of notch portions when the plurality of pins are fitted in the plurality of notch portions. Further, the fixation member may be fixedly attached to the ratchet gear member by causing the heads of the plurality pins to get plastically deformed and cover at least a part of the brim-like portion after the plurality of pins are fitted in the plurality of notch portions.

In the seatbelt retractor, the fixation member is fixedly attached to the ratchet gear member by making the brim-like portion get in contact with the connecting portion and causing the heads of the plurality of pins to get plastically deformed. Therefore, the structure to mount the fixation member to the ratchet gear member can be made thinner and downsizing of the lock member can be achieved with respect to axial directional size thereof. Further, making the plurality of pins plastically deformed can facilitate integration of the ratchet gear member and the fixation member. Thereby, efficiency in assemblage work of the lock member can be enhanced.

In the inventive seatbelt retractor, the brim-like portion may be provided on the fixation member at an edge portion located axially outward with respect to the take-up drum and the brim-like portion may be attached to the connecting portion so that a surface of the brim-like portion facing axially outward with respect to the take-up drum constitutes at least a part of a surface of the ratchet gear facing exially outward.

In the seatbelt retractor, the brim-like portion is provided on the fixation member at an edge portion located axially outward with respect to the take-up drum and the brim-like portion is attached to the connecting portion so that the surface of the brim-like portion facing axially outward with respect to the take-up drum constitutes at least a part of a surface of the ratchet gear member facing axially outward. Therefore, the axially outer end surface portion of the lock member can be made thinner, movement amount of the ring member can easily be secured, and weight reduction of the lock member can be realized.

In the inventive seatbelt refractor, the fixation member may be made from material of which strength is higher than strength of material used for the ratchet gear member.

In the seatbelt refractor, the fixation member is made from material of which strength is higher than that of material used for the ratchet gear member. Therefore, design optimization of the stopper mechanism can be satisfied while mechanical strength of the stopper mechanism can be enhanced easily. Further weight reduction and cost reduction of the lock member can be realized.

In the inventive seatbelt retractor, the fixation member may be mounted to the ratchet gear member from a take-up-drum-side thereof.

In the seatbelt retractor, the fixation member is mounted to the ratchet gear member from its take-up-drum side. Therefore, in view of the structure of mounting the fixation member to the ratchet gear member, the fixation member can be mounted to the ratchet gear member so that the fixation member does not project from the axially outer end surface of the of the ratchet gear member. Thereby, downsizing of the stopper mechanism can be achieved with respect to axial directional size thereof.

In the inventive seatbelt refractor, the energy absorption mechanism may include a torsion bar that is inserted and fitted inside the take-up drum in such a manner that one axial end of the torsion bar is fixed to the other end of the take-up drum so as to prohibit relative rotation with respect to the take-up drum and the other axial end of the torsion bar is fixed to the fixation boss so as to prohibit relative rotation with respect to the fixation boss, the torsion bar absorbing energy in a form of torsional deformation caused by relative rotation between the take-up drum and the lock member.

In the seatbelt retractor, the torsion bar is inserted and fitted inside the take-up drum in such a manner that one axial end of the torsion bar is fixed to other end of the take-up drum so as to prohibit relative rotation with respect to the take-up drum and other axial end of the torsion bar is fixed to the fixation boss so as to prohibit relative rotation with respect to the fixation boss, whereby the torsion bar can absorb the energy in a form of torsional deformation and the mechanical structure of the energy absorption mechanism can be simplified.

Further, in the inventive seatbelt retractor, the energy absorption mechanism may include a long deformable member that is arranged between the one end of the take-up drum and the lock member. Further, the long deformable member may include a crooked portion formed at one end thereof and a continuous portion formed so as to continue to the crooked portion, the crooked portion being fitted in and fixedly supported by a holding-side crooked path formed in either one of the take-up drum and the lock member and the continuous portion being arranged so as to pass through a deformation-giving crooked path provided in the other one of the take-up drum and the lock member. Further, the long deformable member may absorb the energy in a form of bending deformation when being pulled out through the deformation-giving crooked path along relative rotation between the take-up drum and the lock member.

In the seatbelt retractor, the long deformable member includes the crooked portion formed at one end thereof and the continuous portion formed so as to continue to the crooked portion, wherein the crooked portion is fitted in and fixedly supported by a holding-side crooked path formed in either one of the take-up drum and the lock member and the continuous portion is arranged so as to pass through a deformation-giving crooked path provided in other one of the take-up drum and the lock member. Thereby, the long deformable member can absorb the energy in a form of bending deformation when being pulled out through the deformation-giving crooked path and the mechanical structure of the energy absorption mechanism can be simplified.

DETAILED DESCRIPTION OF THE PREFERRED EMBODIMENTS

Hereinafter, first and second embodiments of the seatbelt retractor according to the present invention will be described in detail while referring to the accompanying drawings.
[First Embodiment]
[Schematic Configuration]

Figure 1:
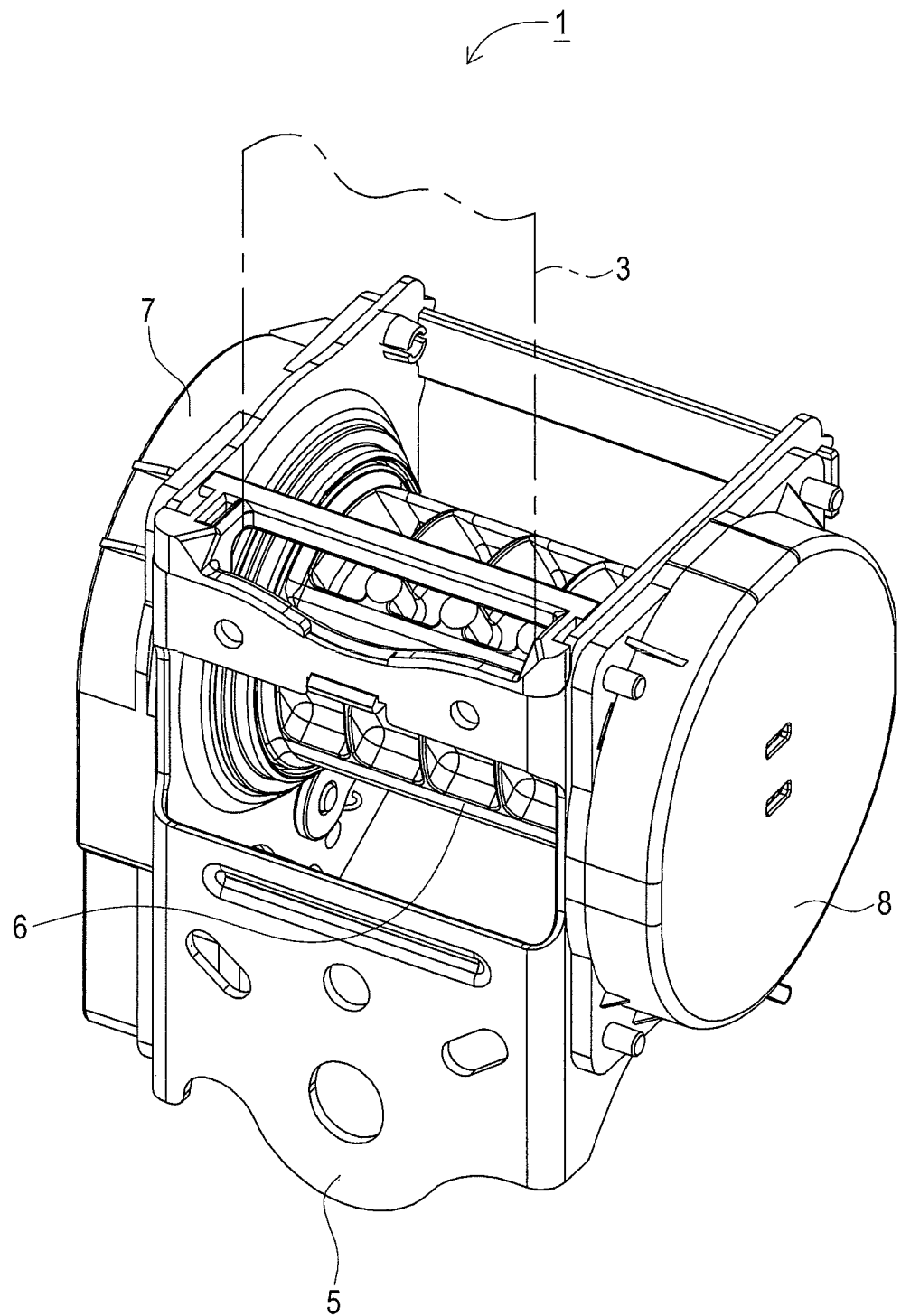
FIG. 1 is a perspective view showing an external appearance of a seatbelt retractor according to a first embodiment.
Figure 2:
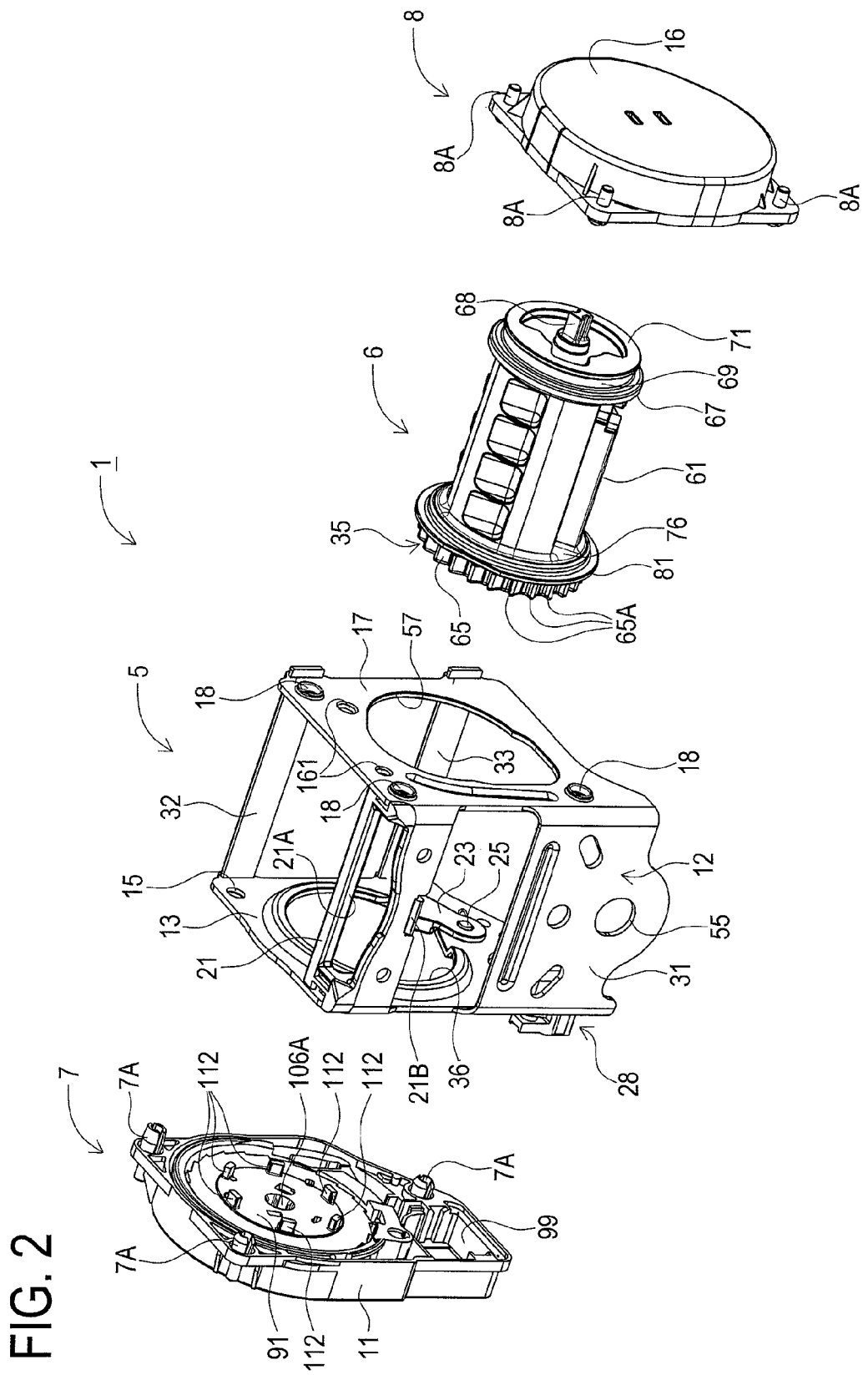
FIG. 2 is a perspective view showing respective assemblies of the seatbelt retractor in a disassembled state.
Figure 3:
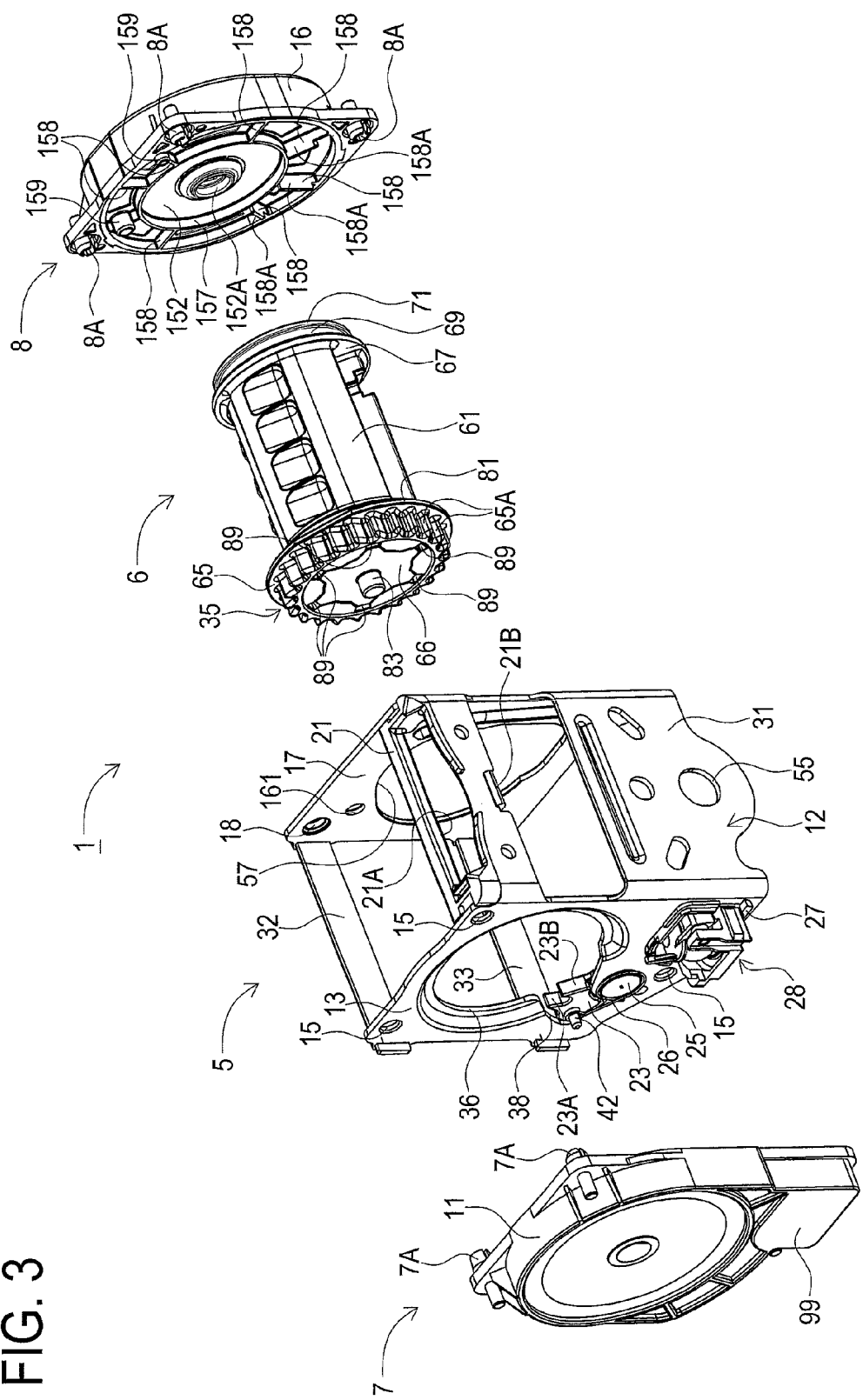
FIG. 3 is a perspective view showing respective assemblies of the seatbelt retractor in a disassembled state.

First, a schematic configuration of a seatbelt retractor 1 according to the first embodiment will be described based on FIG. 1 through FIG. 3. FIG. 1 is a perspective view showing an external appearance of a seatbelt retractor 1 according to the first embodiment. FIG. 2 and FIG. 3 each are a perspective view showing the respective assemblies of the seatbelt retractor 1 in a disassembled state.

As shown in FIG. 1 through FIG. 3, the seatbelt retractor 1 is a device for retracting vehicle webbing 3. The seatbelt retractor 1 has a housing unit 5, a take-up drum unit 6, a locking unit 7 and a take-up spring unit 8.

The locking unit 7 has a mechanism cover 11 with nylon latches 7A integrally formed thereat. The locking unit 7 is fixed by the nylon latches 7A at mounting holes 15 formed on one side wall portion 13 of a housing 12. The housing 12 is formed substantially in a U-shape in planar view and constitutes the housing unit 5. The locking unit 7 constitutes a lock mechanism 10 (refer to FIG. 15) that stops pull-out of the webbing 3 in response to a sudden pull-out of the webbing 3 or abrupt acceleration of a vehicle speed.

The take-up spring unit 8 has a spring case 16 with nylon latches 8A integrally formed thereat. The take-up spring unit 8 is fixed by the nylon latches 8A at mounting holes 18 formed on the other side wall portion 17 of the housing 12, opposite to the side wall portion 13. A take-up drum unit 6 onto which the webbing 3 is wound is rotatably supported between the locking unit 7 fixed to the side wall portion 13 of the housing unit 5 and the take-up spring unit 8 fixed to the side wall portion 17 of the housing unit 5. The take-up drum unit 6 is constantly urged in a take-up direction of the webbing 3 by the take-up spring unit 8 fixed on the outside of the side wall portion 17.
[Schematic Configuration of Housing Unit]

Figure 4:
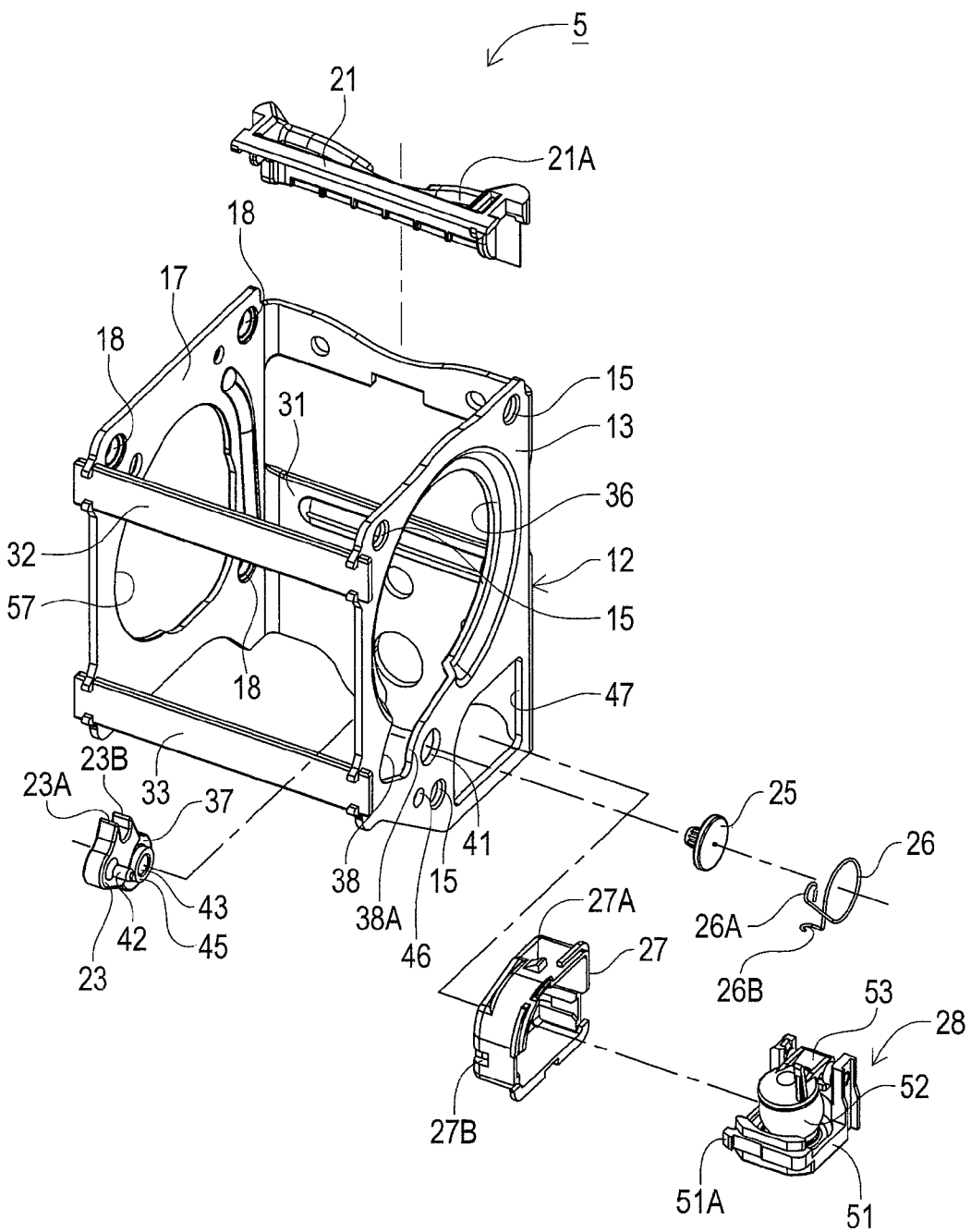
FIG. 4 is an exploded perspective view of a housing unit.

A schematic configuration of the housing unit 5 will next be described referring to FIG. 2 through FIG. 4. FIG. 4 is an exploded perspective view of the housing unit 5.

As shown in FIG. 2 through FIG. 4, the housing unit 5 includes the housing 12, a protector 21, a pawl 23, a pawl rivet 25, a twisted coil spring 26, a sensor cover 27, an acceleration sensor 28, and connecting members 32, 33.

The housing 12 has a back plate portion 31 to be fixed at a vehicle body and the side wall portions 13, 17 opposed to each other and extending from both side edge portions of the back plate portion 31. The housing 12 is made of a steel material or the like and is formed to have a substantially U-shape in planer view. The side wall portions 13, 17 are connected to each other with the connecting members 32, 33, each of which has a horizontally long thin plate-like shape, being long in a direction of the rotational axis of the take-up drum unit 6. An opening portion is formed in the center of the back plate portion 31, and helps reduce weight and regulates the accommodation amount of the webbing 3.

The side wall portion 13 has a through hole 36 into which a lock gear 35 of the take-up drum unit 6 is inserted with a predetermined clearance (for instance, a clearance of approximately 0.5 mm). The inner peripheral portion of the through hole 36 is recessed axially inward in a predetermined depth toward the take-up drum unit 6, opposed to the lock gear 35 of the take-up drum unit 6. The side wall portion 13 has the mounting holes 15 into which the nylon latches 7A of the locking unit 7 are fitted, at three locations including both corners of the upper end portion (the upper end portion in FIG. 4) and a portion below the through hole 36 (the lower portion in FIG. 4).

From an obliquely lower edge portion of the through hole 36 (at a portion obliquely lower left in FIG. 4), a notch portion 38 is notched outwardly regarding a rotation direction of the pawl 23 (in a direction away from the lock gear 35 of the pawl 23). The notch portion 38 is positioned opposite to a portion of a tip side of the pawl 23 including engagement teeth 23A, 23B, and is notched in a depth enough to receive a portion of the tip side. A through hole 41 is formed at a position lateral to the notch portion 38, at the side of the back plate portion 31 when the notch portion 38 and the through hole 41 are seen from front. The through hole 41 is configured to mount the pawl 23 in a rotatable manner. At a portion on the through hole 41 side on which the pawl 23 abuts, the notch portion 38 further has a guiding portion 38A shaped in a coaxial arc with the through hole 41.

Meanwhile, the pawl 23 is made of a steel material or the like and has a stepped portion 37 at a portion to abut on and move along the guiding portion 38A. The stepped portion 37 is formed at approximately the same height as the thickness of the side wall portion 13, recessed in an arc-like shape at the same radius curvature as the guiding portion 38A. The pawl 23 further has a guiding pin 42 at a tip portion on an axially outer side face (the frontward, in FIG. 4). The guiding pin 42 is inserted into a guiding hole 131 (refer to FIG. 12) of a clutch 95 that forms the locking unit 7.

Further, at an base end portion (one end portion) of the pawl 23, there is formed a through hole 43 into which the pawl rivet 25 is inserted. The through hole 43 has, along the periphery thereof, a boss portion 45 to be rotatably inserted in the through hole 41 of the side wall portion 13, shaped cylindrically and at a height approximately the same as the thickness of the side wall portion 13. Further, in a state where the boss portion 45 is inserted in the through hole 41 of the side wall portion 13 from the inner side of the housing 12, the pawl rivet 25 is inserted into the through hole 43 from outside of the side wall portion 13 to rotatably fix the pawl 23. Accordingly, the engagement teeth 23A, 23B of the pawl 23 and ratchet gear teeth 65A provided on the outer periphery of the lock gear 35 (refer to FIG. 5) are arranged substantially on the same plane as the outer side surface of the side wall portion 13.

The head of the pawl rivet 25 is formed into a disk-like shape having a larger diameter than the through hole 41 and at a predetermined thickness (for instance, approximately 1.5 mm thick). Then, the twisted coil spring 26 that operates as an example of a return spring is arranged in a single wind to surround the periphery of the head of the pawl rivet 25, and one end side 26A thereof is attached to the guiding pin 42 of the pawl 23. Further, the wire diameter of the twisted coil spring 26 is approximately half the height of the head of the pawl rivet 25 (for instance, approximately 0.6 mm wire diameter). Accordingly, the spring height of the single wind of the twisted coil spring 26 is set to have approximately the same height of the head of the pawl rivet 25.

Further, the other end side 26B of the twisted coil spring 26 is passed at the side wall portion 13 side of the one end side 26A in such a way as to be able to slide on the side wall portion 13, then bent approximately at an right angle inward the side wall portion 13 (backside of the side wall portion 13 in FIG. 4), and inserted into a mounting hole 46 formed at the side wall portion 13. The end portion of the other end side 26B is bent into a U-shape side and abuts on the inner surface of the side wall portion 13, to form a slip-prevention portion.

As a result, the pawl 23 is urged to rotate in a direction deeper into the notch portion 38 (counterclockwise in FIG. 3) by the twisted coil spring 26, and the tip portion including the engagement teeth 23A, 23B is made to abut on the innermost side of the notch portion 38. Thus, the pawl 23 is urged to rotate by the twisted coil spring 26 in a direction moving away from the lock gear 35.

Further, as illustrated in FIG. 2 through FIG. 4, below the through hole 36 of the side wall portion 13 (downward in FIG. 4), there is formed an opening portion 47 which is substantially square-shaped. The opening portion 47 is opened from a portion below the center axis of the through hole 36 (downward in FIG. 4) toward the back plate portion 31. The sensor cover 27 is fitted into the opening portion 47. The sensor cover 27 is shaped in a shallow box body which is substantially the same square shape as the opening portion 47, and fitted from outside (front side in FIG. 4). There, the sensor cover 27 made of resin is made to abut on the outer periphery portion of the opening portion 47 (periphery on the front side in FIG. 4) at a brim portion formed at the periphery on the opening thereof. At the same time, as a pair of fixing claws 27A projected at both end faces in the vertical direction in FIG. 4 of the sensor cover 27 (one of the fixing claws 27A on the upper end face is illustrated in FIG. 4.) is inserted inward at the both sides in the vertical direction of the opening portion 47 in FIG. 4 and elastically locked.

Further, the acceleration sensor 28 includes a sensor holder 51, an inertia mass 52 and a sensor lever 53. The sensor holder 51 is made of resin, formed in an approximately box shape, opened on the vertically upper side (upper side in FIG. 4) and has a bowl-shaped mounting portion on a bottom face. The inertia mass 52 is made of metal such as steel formed into a spherical body and movably placed on the mounting portion. The sensor lever 53 is made of resin, placed on the vertically upper side of the inertia mass 52. The sensor holder 51 supports the sensor lever 53 at an end portion opposite to the pawl 23 (right end portion in FIG. 4), in a manner allowing vertical movement (in up/down direction in FIG. 4).

The sensor holder 51 has a pair of engagement claws 51A at both side face portions opposed to both side wall portions inside the sensor cover 27 (one of the engagement claws 51A is illustrated in FIG. 4). The acceleration sensor 28 is fitted into the sensor cover 27 so that the pair of engagement claws 51A is fitted into and locked at fixing holes 27B of the sensor cover 27. As a result, the acceleration sensor 28 is mounted onto the housing 12 through the sensor cover 27.

Further, the side wall portion 13 has the mounting holes 15 into which the nylon latches 7A of the locking unit 7 are fitted, at three locations including both corners of the upper end portion (the upper end portion in FIG. 4) and the portion below the through hole 36 (the lower portion in FIG. 4). Further, a bolt insertion hole 55 is formed at the lower end portion of the back plate portion 31 (the lower end portion in FIG. 2), and a bolt is inserted into the bolt insertion hole 55 when the back plate portion 31 is mounted onto a fastening piece of a vehicle (not shown).

Further, at a center in the side wall portion 17, a through hole 57 is formed into which the take-up drum unit 6 is inserted. Further, the side wall portion 17 has the mounting holes 18 into which the nylon latches 8A of the take-up spring unit 8 are inserted and fixed, at three locations including both corners of the upper end portion (upper end portion in FIG. 4) and the corner of the lower end portion (lower end portion in FIG. 4) closer to the back plate portion 31.

The horizontally long frame-like protector 21 is made of synthetic resin such as nylon, and configured to be attached onto the upper end portion of the back plate portion 31 (the upper end portion in FIG. 4). The protector 21 has a through hole 21A in a horizontally long square shape in planar view, from which the webbing 3 is drawn out. The protector 21 is inserted into the housing 12 while abutting on the back plate portion 31 so as to be positioned between the side wall portions 13, 17 opposite to each other, so that an engagement projection 21B of the protector 21 is elastically locked and fixed at the upper end portion of the opening portion formed at the back plate portion 31.

[Schematic Configuration of Take-up Drum Unit]

Figure 5:
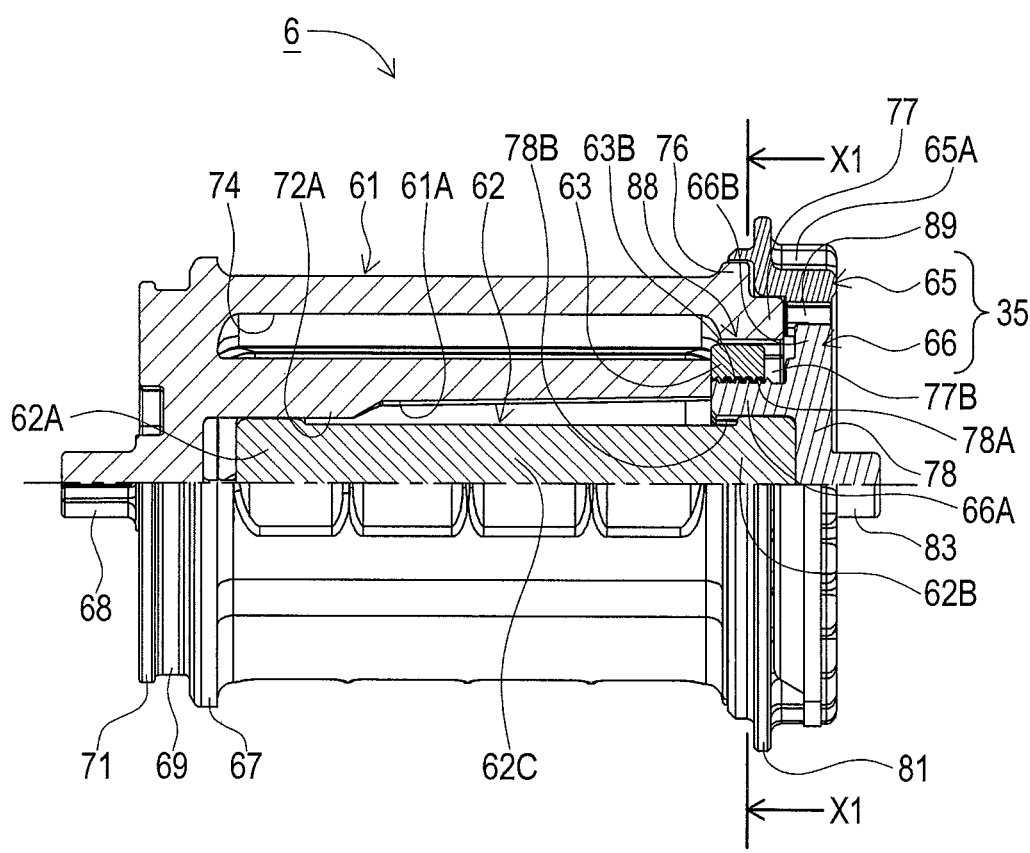
FIG. 5 is a half sectional view of a take-up drum unit.
Figure 6:
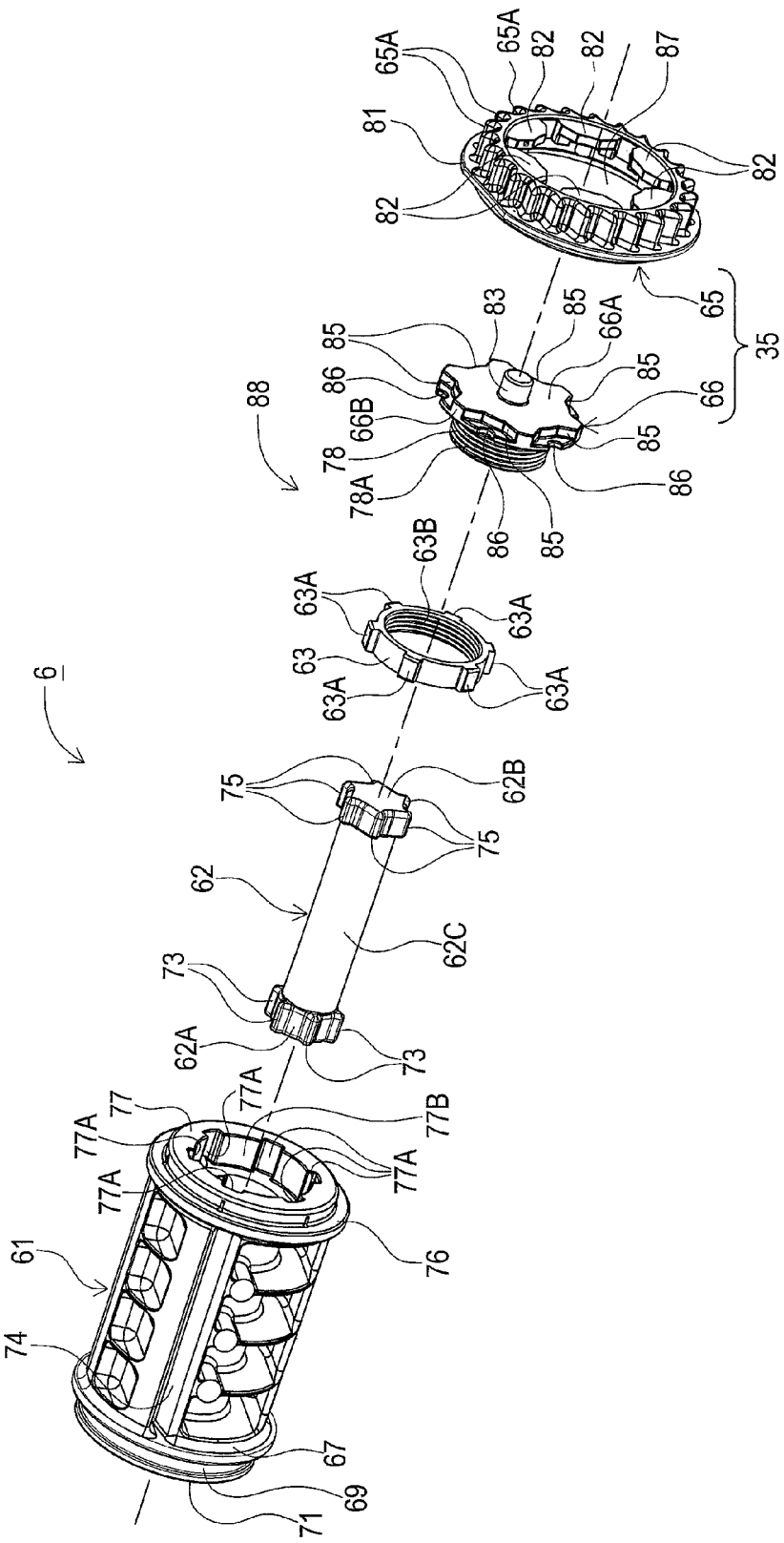
FIG. 6 is an exploded perspective view of the take-up drum unit.
Figure 7:
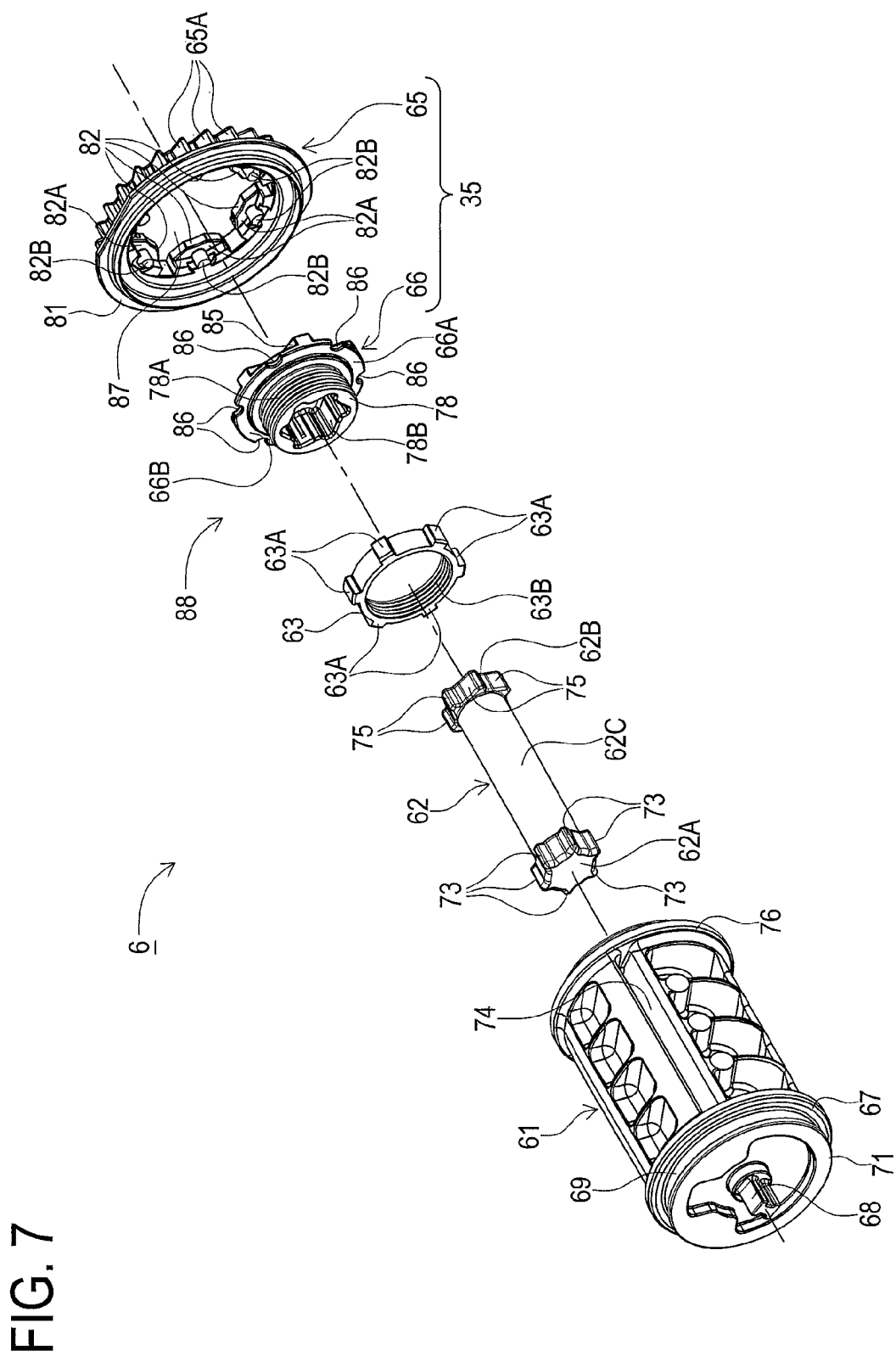
FIG. 7 is an exploded perspective view of the take-up drum unit.
Figure 8:
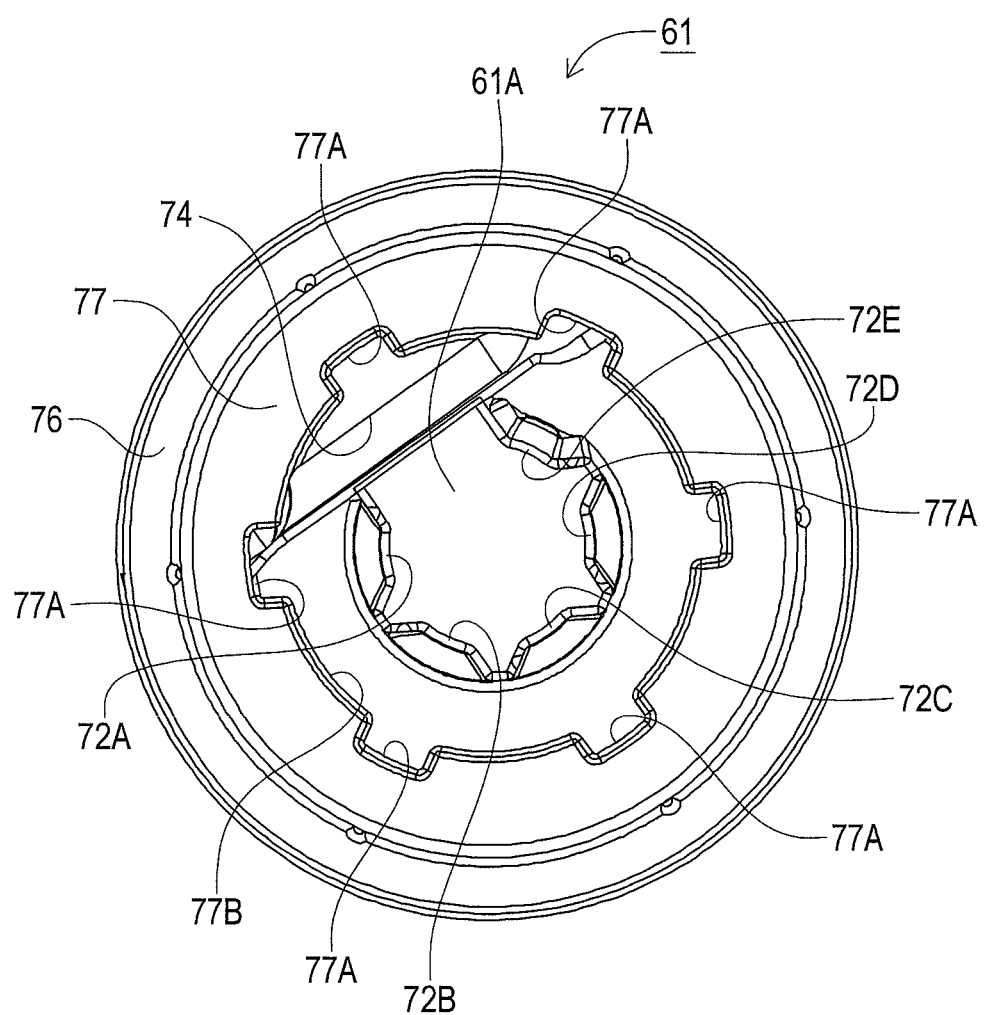
FIG. 8 is a front view of a take-up drum seen from a mounting side of a lock gear.
Figure 9:
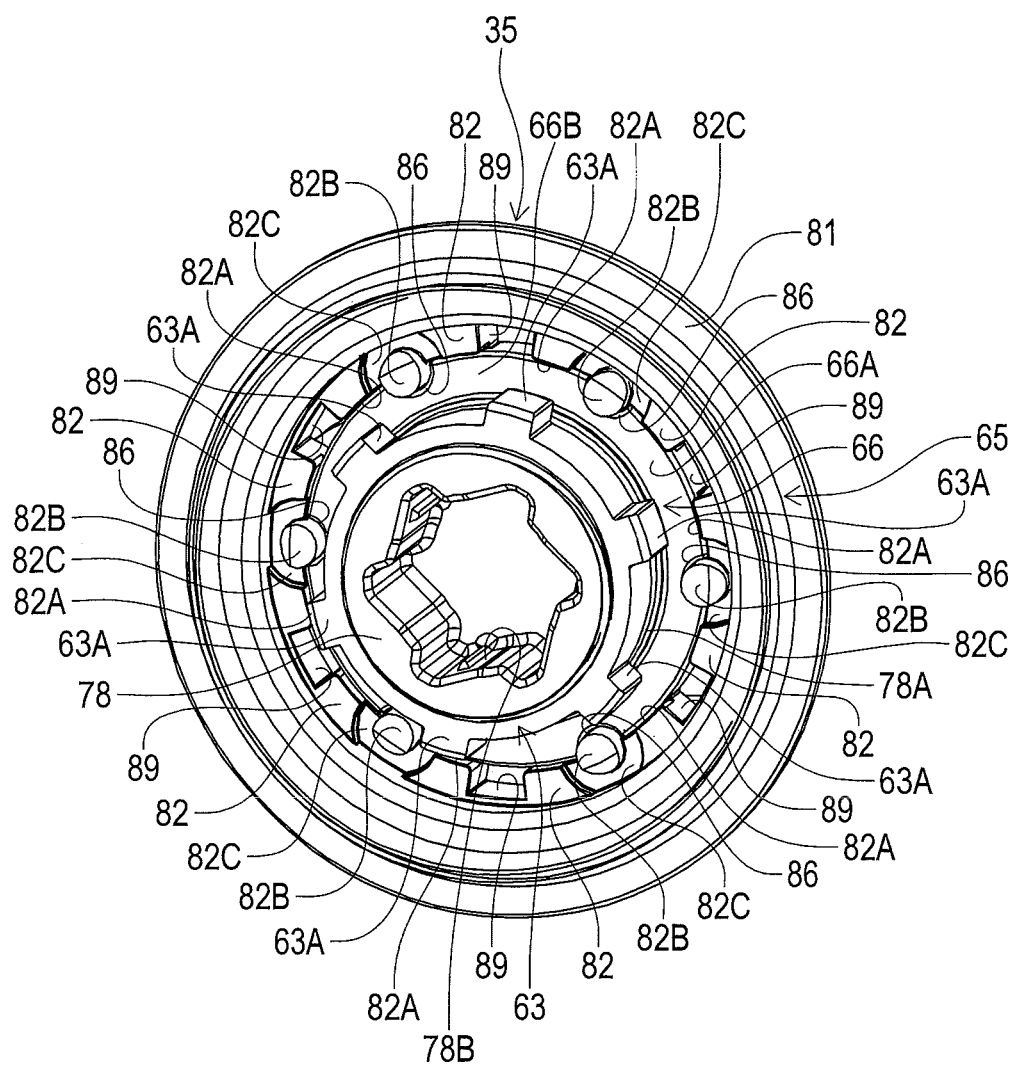
FIG. 9 is a perspective view showing an internal appearance of the lock gear with a stopper nut engaged outside thereof.
Figure 10:
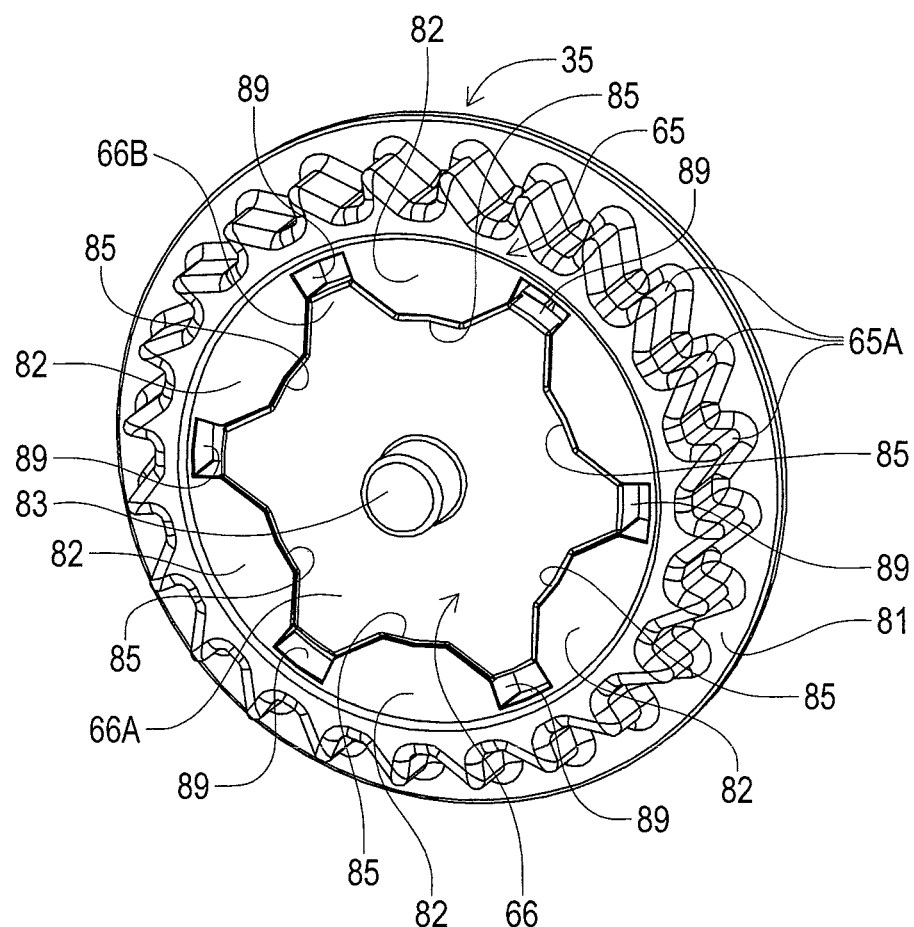
FIG. 10 is a perspective view showing an external appearance of the lock gear.
Figure 11:
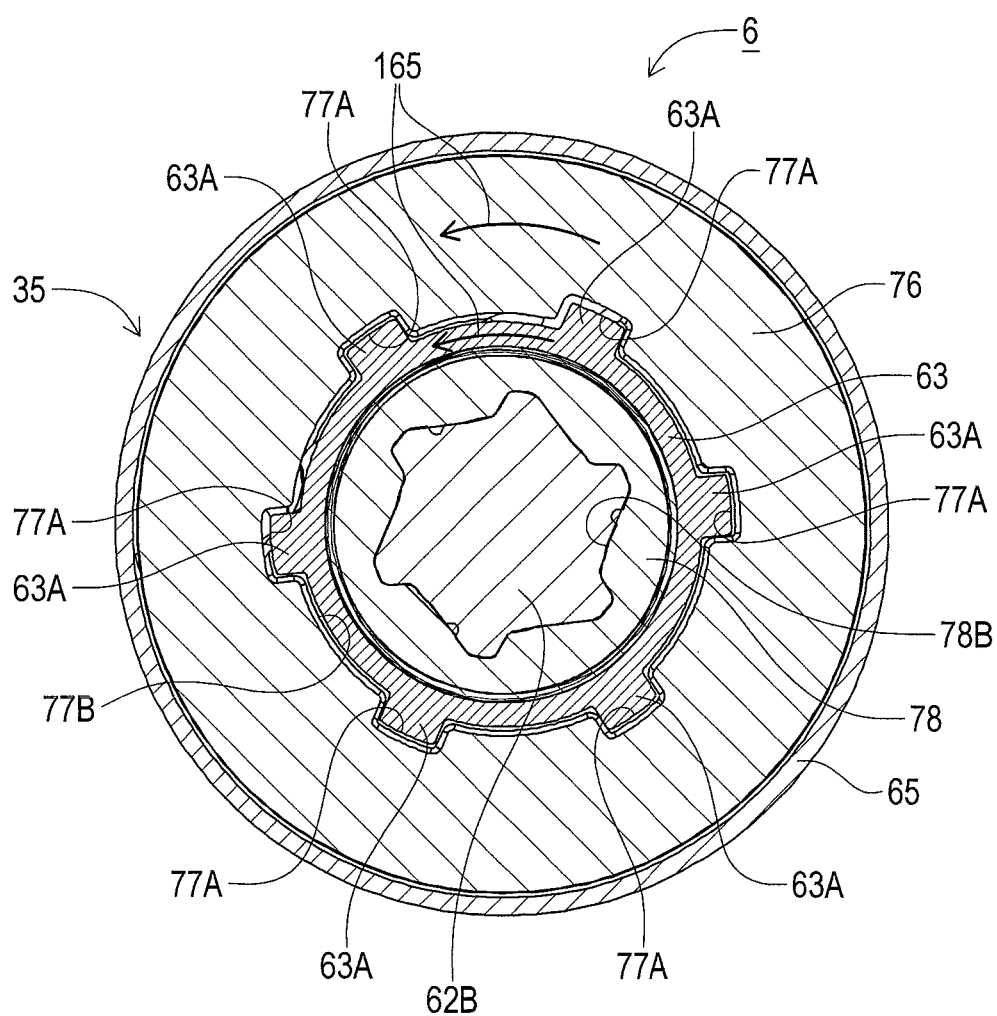
FIG. 11 is a cross sectional view taken along a line indicated by arrows X1-X1 in FIG. 5 and looking in the direction of the arrows.

Next, a schematic configuration of the take-up drum unit 6 will be described based on FIG. 2, FIG. 3, FIG. 5 through FIG. 11. FIG. 5 is a half sectional view of the take-up drum unit 6. FIG. 6 and FIG. 7 each are an exploded perspective view of the take-up drum unit 6. FIG. 8 is a front view of a take-up drum 61 seen from a mounting side of the lock gear 35. FIG. 9 is a perspective view showing an internal appearance of the lock gear 35 with a stopper nut 63 engaged outside thereof. FIG. 10 is a perspective view showing an external appearance of the lock gear 35. FIG. 11 is a cross sectional view taken along a line indicated by arrows X1-X1 in FIG. 5 and looking in the direction of the arrows.

As illustrated in FIG. 6 and FIG. 7, the take-up drum unit 6 includes the take-up drum 61, a torsion bar 62, the stopper nut 63 and the lock gear 35. The lock gear 35 includes a ratchet gear 65 having a substantially cylindrical shape, and a ratchet base 66 fitted inside the ratchet gear 65 and fixed at an axially outer end portion.

As illustrated in FIG. 2, FIG. 3, FIG. 5 through FIG. 7, the take-up drum 61 is made by aluminum die-casting, zinc die-casting or the like and is formed in a substantially cylindrical shape, with an end face on the side of the take-up spring unit 8 being walled and closed. On an edge portion of the take-up drum 61 at the side of the take-up spring unit 8 with respect to axial direction of the take-up drum 61, there is formed a take-up-spring-side flange portion 67 circular-shaped in front view and extending radially and outwardly from an outer peripheral portion thereof.

There is formed a shaft 68 at the center position on an axially outer end face of the take-up-spring-side flange portion 67. In the shaft 68, a base end portion thereof is formed into a circular shape in cross section at a predetermined height (for instance, approximately 3 mm high) and a shaft portion thereof formed into a rectangular shape in cross section is fitted into a later-described spring shaft 151 (see FIG. 16). Further, on the axially outer end face of the take-up-spring-side flange portion 67, a rib portion 69 having a substantially annular shape is coaxially formed so as to be located axially outside the side wall portion 17 when the take-up drum unit 6 is mounted inside the housing 12. Further, an outer flange 71 having a substantially annular shape in front view is also formed, extended radially from the outer surface of the end portion on the axially outside of the annular rib portion 69 on the whole periphery.

The take-up drum 61 has a shaft hole 61A inside thereof. The shaft hole 61A has a draft angle in a manner to be tapered along a center axis. As illustrated in FIG. 5 and FIG. 8, there are formed five projecting portions 72A through 72E on the inner periphery of the shaft hole 61A on the side closer to the take-up-spring-side flange portion 67. The five projecting portions 72A through 72E each have a trapezoidal shape in cross section, with a predetermined circumferential interval, and are projecting radially inward in a rib-like shape. The torsion bar 62 is made of a steel material or the like, and includes a shaft portion 62C of a stick-like shape and circular in cross section, and connecting portions 62A, 62B formed on both ends of the shaft portion 62C.

As illustrated in FIG. 6 and FIG. 7, six raised portions 73 are projected from outer periphery of a column of a predetermined length in axial direction (for instance, approximately 6 mm long in axial direction), on the connecting portion 62A formed on an end portion of the torsion bar 62 at the side to be insertion to the take-up drum 61. The six raised portions 73 are formed by every 60 degrees of equal central angle with predetermined circumferential intervals (for instance, with an interval of approximately 30 degrees center angle), each in an isosceles trapezoid shape in cross section. Further, the outermost diameter of the raised portions 73 is formed substantially equal to the inner diameter of the end portion of the take-up-spring-side flange portion 67 within the shaft hole 61A.

Further, six convex portions 75 are projected from outer periphery of a column of a predetermined length in axial direction (for instance, approximately 5 mm long in axial direction), on the connecting portion 62B formed on an end portion of the torsion bar 62 at the side to be inserted into the lock gear 35. The six convex portions 75 are formed by every 60 degrees of equal central angle each in a trapezoid shape in cross section continually in circumferential direction. Further, the outermost diameter of convex portions 75 is formed substantially equal to the outermost diameter of raised portions 73, and radial height of each convex portion 75 is formed substantially the same as the radial height of each raised portion 73.

As illustrated in FIG. 5 and FIG. 8, the projecting portions 72A through 72E inside the shaft hole 61A are projected in a manner respectively lockable between raised portions 73 of the connecting portion 62A formed on the end portion to be inserted into the take-up drum 61 of the torsion bar 62. Accordingly, as illustrated in FIG. 5 through FIG. 7, the torsion bar 62 is relatively non-rotatably press-fitted inside the take-up drum 61, through pushing and putting the connecting portion 62A side of the torsion bar 62 into the shaft hole 61A of the take-up drum 61, among projecting portions 72A through 72E.

Further, as illustrated in FIG. 5 through FIG. 8, at an end portion of the take-up drum 61 axially on the side of the locking unit 7, there is formed a locking-unit-side flange portion 76 having substantially circular shape in front view, radially extended on the slightly axially inner circumferential surface from the end portion. Further, in the peripheral surface between the take-up-spring-side flange portion 67 and the locking-unit-side flange portion 76, a webbing insertion hole 74 having substantially a slit-like shape through which the webbing 3 is passed is penetratingly formed axially parallel with the take-up drum 61 in all the width in axial direction.

Further, at a portion axially outside from the this locking-unit-side flange portion 76, there are formed a stepped portion 77 having a cylindrical shape with slightly smaller outer diameter, projected axially outward, and an fitting hole 77B inside which the stopper nut 63 is housed and which is coaxial with the shaft hole 61A. This fitting hole 77B is formed to have substantially the same diameter as the outer diameter of the stopper nut 63, the stopper nut 63 being larger than the inner diameter of the shaft hole 61A. Furthermore, in the inner periphery of the fitting hole 77B, of the length equal to the depth thereof, there are formed six groove portions 77A each having a spline-like shape, by every 60 degrees of equal center angle. To each of the six groove portions 77A, there is fitted a spline 63A having a square shape and projecting along the axial direction by every 60 degrees of equal center angle from the outer periphery of the stopper nut 63.

Further, the depth of the fitting hole 77B in axial direction is set such that the axially deepest position of the fitting hole 77B of the take-up drum 61 locates closer to the position of the locking-unit-side flange portion 76, that is, the position at the end portion of the webbing insertion hole 74 at the locking unit 7 side. Further, the depth dimension of the fitting hole 77B in axial direction is set substantially the same as the height of a fixation boss 78 projected at the ratchet base 66 forming the lock gear 35, and longer by a predetermined dimension (for instance, approximately 3 mm longer) than the thickness of the stopper nut 63 in axial direction. Further, the stepped portion 77 is provided to surround the connecting portion 62B on the lock gear 35 side of the torsion bar 62 press-fitted inside the shaft hole 61A.

Further, as illustrated in FIG. 5 through FIG. 7, the substantially cylindrical ratchet gear 65 forming the lock gear 35 is made by aluminum die-casting, zinc die-casting or the like, and has on the outer periphery thereof the ratchet gear teeth 65A. The ratchet gear teeth 65A is configured to engage with the pawl 23 and has a substantially ring shape in axial cross section. Further, the inner periphery of the ratchet gear 65 is formed the dimension that allows the insertion of the stepped portion 77 of the take-up drum 61. Incidentally, the engagement of the ratchet gear teeth 65A and the pawl 23 is only in one direction, to rotate the take-up drum 61 in a webbing pull-out direction.

Further, the ratchet gear 65 has a flange portion 81 formed at the end face portion on the take-up drum 61 side of the ratchet gear teeth 65A, in the all periphery of the ratchet gear 65. The flange portion 81 is in a ring shape in front view, extended radially outward to have larger outer diameter than the locking-unit-side flange portion 76 of the take-up drum 61 and further extended substantially at right angles (leftward in FIG. 7) from slightly radially inside the outer peripheral edge portion, in all the periphery.

Further, as illustrated in FIG. 6, FIG. 7, FIG. 9 and FIG. 10, at the end portion on the locking unit 7 side of the ratchet gear 65 (the right end portion in FIG. 6), substantially plate-like six mounting pieces 82 are projected radially inward from the inner periphery, with predetermined circumferential intervals therebetween (for instance, intervals of approximately 15 degrees central angle). Each of the six mounting pieces 82 is provided by every 60 degrees of equal central angle, and chamfered at both corners radially inside of the substantially rectangular shape in front view up to the radially substantial center portion.

Further, each mounting piece 82 has a stepped portion 82A formed on the take-up drum 61 side, at axially inner surface, from radially inner end portion to radially substantially central portion. The stepped portion 82A is recessed in a shape like an arc centering the rotational axis, and has an axial-direction depth of half the thickness of each mounting piece 82. Further, each mounting piece 82 has a rivet pin 82B in a substantial center portion of the inner surface on the take-up drum 61 side. The rivet pin 82B having a columnar shape is formed with a predetermined diameter (for instance, approximately 3 mm in diameter) radially over the stepped portion 82A.

Further, as illustrated in FIG. 9, the tip portion of each rivet pin 82B is chamfered at semiperimeter radially outside with regard to the rotational axis. A concave portion 82C is formed at the base end portion of each rivet pin 82B. The concave portion 82C is recessed in a predetermined depth (for instance, approximately 0.7 mm deep) in a semicircular shape around the semiperimeter of the rivet pin 82B radially outside with regard to the stepped portion 82A.

Further, as illustrated in FIG. 5 through FIG. 7, FIG. 9, and FIG. 10, the ratchet base 66 included in the lock gear 35 is formed of a steel material or the like, and has a substantially disk-like base portion 66A, the cylindrical fixation boss 78, and a columnar shaft portion 83. The fixation boss 78 is projected in the center portion on the axially inner surface of the base portion 66A, on the take-up drum 61 side. The shaft portion 83 is provided at the center position on the axially outer surface of the base portion 66A.

The substantially disk-like base portion 66A has a brim-like portion 66B, which is substantially annular shaped in front view and projected for all the periphery from the base end portion of the fixation boss 78 radially outside with regard to the rotational axis of the take-up drum 61. The radius of the brim-like portion 66B at the outer periphery is formed approximately the same as the radius of the inner periphery of the stepped portions 82A formed at the mounting pieces 82 of the ratchet gear 65, the inner periphery of the stepped portions 82A located radially outward with regard to the rotational axis. Further, the thickness of the brim-like portion 66B is formed to be substantially the same as the thickness of the base end portion of each mounting piece 82. Further, six concave portions 85 are formed on the periphery portion on the axially outer side of the brim-like portion 66B, by every 60 degrees of equal center angle. Each of the concave portions 85 is recessed in a substantially trapezoidal shape, into which a stepped portion 82A of a mounting piece 82 is fitted.

Further, the depth of each concave portion 85 in axial direction is set to be substantially the same as the thickness of a stepped portion 82A of a mounting piece 82. Further, the brim-like portion 66B has notch portions 86 on the outer periphery thereof. Each of the notch portion 86 is at substantially the circumferentially center portion of each concave portion 85 and cut off radially inward in a semi arc like shape at substantially the same diameter as the outer diameter of the rivet pin 82B provided at each mounting piece 82.

The cylindrical fixation boss 78 of the ratchet base 66 has an external thread portion 78A configured to be screwed with an internal thread portion 63B of the stopper nut 63, for all the length in axial direction on the outer periphery. Further, on the inner periphery, the fixation boss 78 has an engagement concave portion 78B formed to have the similar cross-sectional shape to the connecting portion 62B provided at the end portion of the torsion bar 62 on the side to be inserted into the lock gear 35. The connecting portion 62B is press-fitted into the engagement concave portion 78B.

The ratchet base 66 is mounted onto the ratchet gear 65 as illustrated in FIG. 6, FIG. 7, FIG. 9 and FIG. 10. First, while each of the notch portions 86 formed on the outer periphery of the brim-like portion 66B of the ratchet base 66 is set to counter the rivet pin 82B of each mounting piece 82 of the ratchet gear 65, the shaft portion 83 projected on the axially outer face of the base portion 66A is inserted inside the ratchet gear 65 (rightward in FIG. 6).

The stepped portions 82A of mounting pieces 82 are fitted to the concave portions 85 of the brim-like portion 66B, respectively and abut thereon, while making the notch portions 86 formed on the outer periphery of the brim-like portion 66B abut on the rivet pin 82B, respectively. Thereafter, the head of each rivet pin 82B is deformed outward in the periphery of the concave portion 82C at the base end portion and the notch portion 86 countering thereof, mainly in the periphery of the notch portion 86 of the brim-like portion 66B. Accordingly, the ratchet base 66 is attached inside the ratchet gear 65 in a manner allowing no relative rotation and fixed to the take-up drum 61 side so as to not to remove therefrom, to form the lock gear 35.

Accordingly, a through hole 87 configured to fit with the base portion 66A of the ratchet base 66 is formed by the peripheral portions of the mounting pieces 82 of the ratchet gear 65. As illustrated in FIG. 5, the external thread portion 78A of the fixation boss 78 is positioned inside the ratchet gear 65 at a portion on the base end portion side thereof.

As illustrated in FIG. 9 and FIG. 10, the axially outer surface of the base portion 66A of the ratchet base 66 is substantially coplanar with the axially outer surfaces of the mounting pieces 82 of the ratchet gear 65. Further, the axially inner surface of the brim-like portion 66B of the ratchet base 66 is substantially coplanar with the axially inner surfaces on the inner peripheral portion side of the mounting pieces 82 of the ratchet gear 65.

Further, six through holes 89 are formed with, the outer periphery of the brim-like portion 66B of the ratchet base 66, both peripheral side face portions on the base end portion side of the mounting pieces 82 of the ratchet gear 65; and the inner periphery of the edge portion on the locking unit 7 side of the ratchet gear 65. The six through holes 89 are rectangular in cross section, formed in vicinity of radially inner side with regard to the ratchet gear teeth 65A, at every 60 degrees of equal center angle, on a concentric circle centering on the rotational axis.

Here, the stopper nut 63 being ring-shaped in axial cross section has, as illustrated in FIG. 5 through FIG. 7, the internal thread portion 63B at the inner periphery thereof. The internal thread portion 63B is configured to be screwed with the external thread portion 78A formed on the outer periphery of the fixation boss 78. Further, the stopper nut 63 has the square-shaped splines 63A projected radially outward, on the outer periphery thereof. The square-shaped splines 63A are projected by every 60 degrees of equal center angle along axial direction. The stopper nut 63 is formed to have the thickness dimension in axial direction shorter than the whole length of the fixation boss 78 in axial direction by a predetermined length (for instance, approximately 3 mm).

Further, the internal thread portion 63B of the stopper nut 63 and the external thread portion 78A of the fixation boss 78 are formed to be right-hand screws. Accordingly, as later described, the stopper nut 63 is configured to be able to move toward the base end portion side of the fixation boss 78 and to abut on the brim-like portion 66B, when the take-up drum 61 has made relative rotation in the webbing pull-out direction with respect to the lock gear 35 in case of an emergency such as vehicle collision (see FIG. 19). Accordingly, the axially outward movement of the stopper nut 63 is limited to a position to abut on the brim-like portion 66B, and a position radially inside the ratchet gear 65.

Accordingly, the stopper nut 63 fitted inside the fitting hole 77B and the fixation boss 78 compose a stopper mechanism 88 that fastens the lock gear 35 and the take-up drum 61 in a relatively non-rotatable manner and stops the relative rotation between the take-up drum 61 and the lock gear 35 when the number of times of relative rotations of the take-up drum 61 in the webbing pull-out direction with regard to the lock gear 35 reaches a predeterset number of times of relative rotations (for instance, approximately 1.5 turns), in case of an emergency such as vehicle collision.

To mount the lock gear 35 onto the take-up drum 61, first, as illustrated in FIG. 9, the internal thread portion 63B of the stopper nut 63 is screwed on the external thread portion 78A of the fixation boss 78 of the lock gear 35. That is, the stopper nut 63 being part of the stopper mechanism 88 is externally screwed on the fixation boss 78. Then, the stopper nut 63 is rotated so that the end faces of the fixation boss 78 and the stopper nut 63 axially on the take-up drum 61 sides, respectively, are substantially coplanar.

Thus, as illustrated in FIG. 5 through FIG. 7, and FIG. 11, while inserting each spline 63A projecting at the outer periphery of the stopper nut 63 into each groove portion 77A formed on the inner periphery of the fitting hole 77B of the stepped portion 77, the connecting portion 62B of the torsion bar 62 provided on the insertion side into the lock gear 35 is press-fitted into the engaging concave portion 78B of the fixation boss 78. Accordingly, the lock gear 35 is attached, through the torsion bar 62, in the relatively non-rotatable manner to the take-up drum 61. Further, the stopper nut 63 being part of the stopper mechanism 88 is fitted inside the fitting hole 77B of the stepped portion 77, in a manner relatively non-rotatable, and relatively movable axially outward.

Incidentally, there may be provided a rib projecting along a longitudinal direction of a groove portion 77A. The rib may be formed at a size that does not hinder axially outward relative movement of the stopper nut 63 with respect to the fitting hole 77B, projecting from the inner wall face of each groove portion 77A radially outside with regard to the rotational axis of the take-up drum 61, toward a spline 63A. Accordingly, when a spline 63A of the stopper nut 63 is inserted into a groove portion 77A, the rib makes contact with the spline 63A to prevent the stopper nut 63 from becoming rickety with respect to the fixation boss 78.

[Schematic Configuration of Locking Unit]

Figure 12:
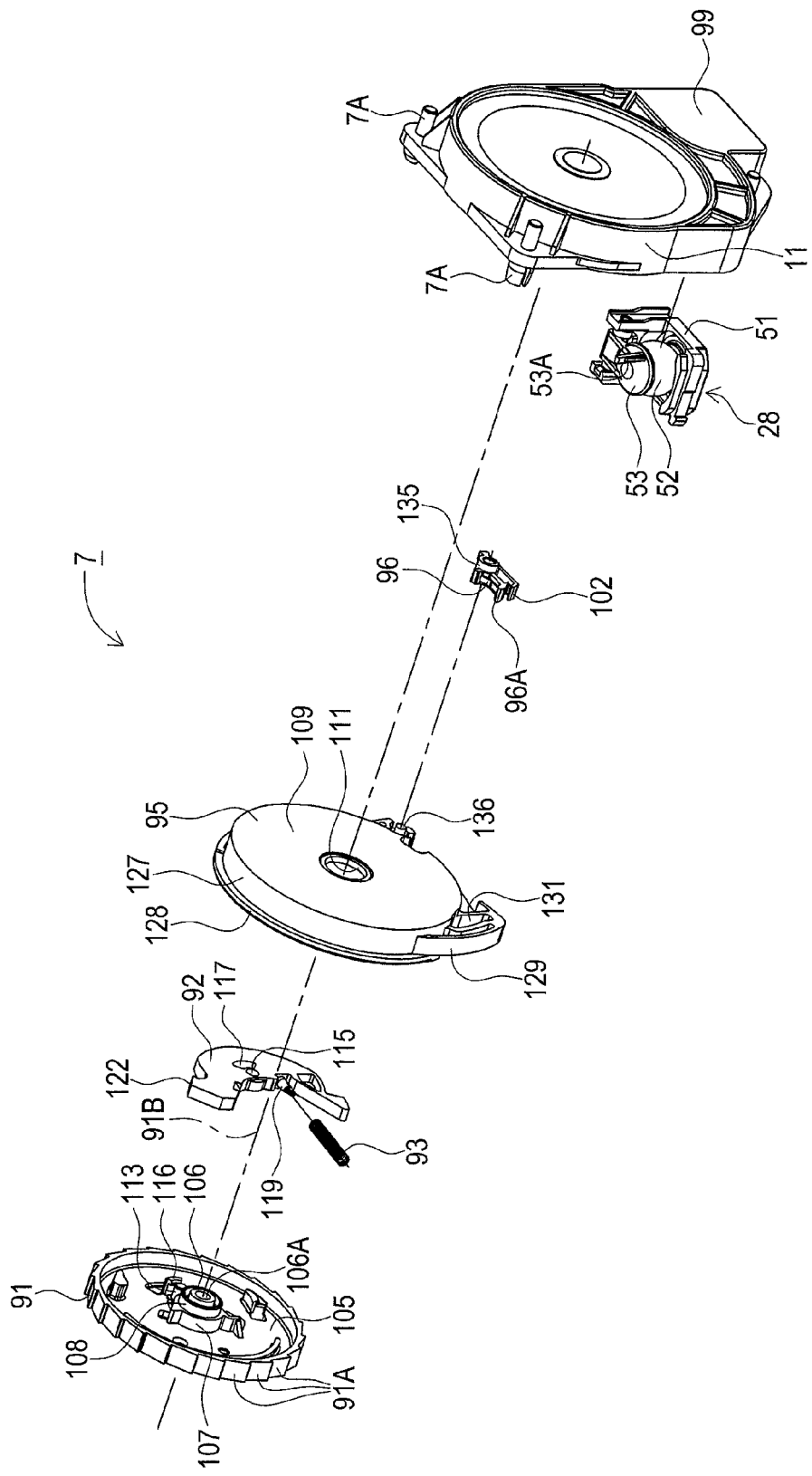
FIG. 12 is an exploded perspective view of a locking unit.
Figure 13:
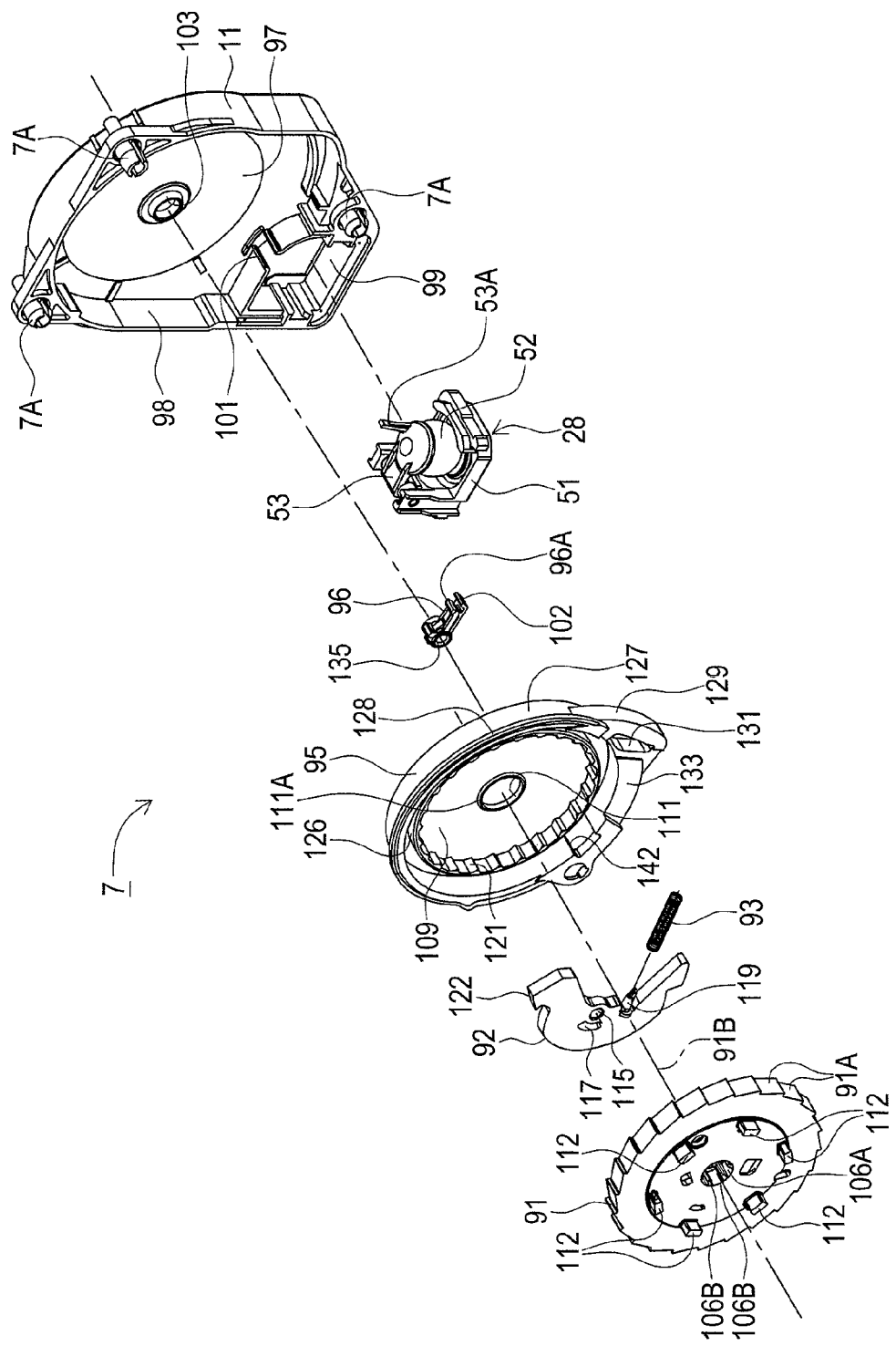
FIG. 13 is an exploded perspective view of the locking unit.
Figure 14:
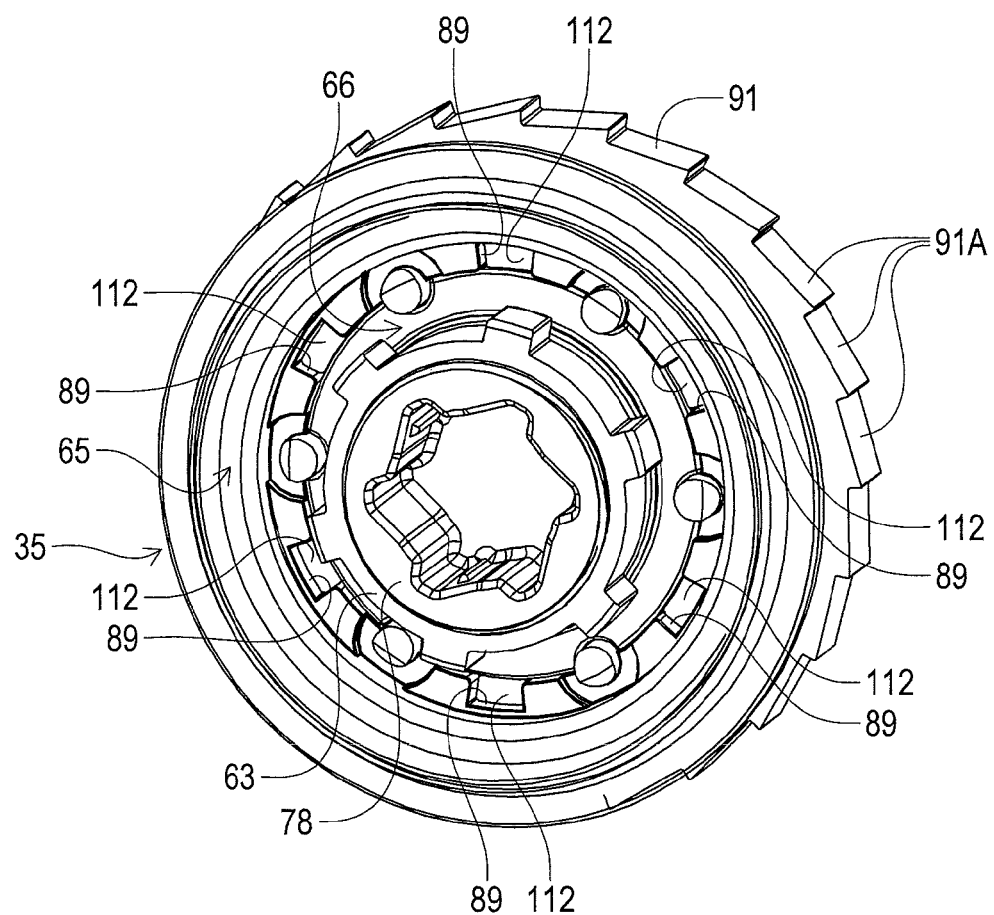
FIG. 14 is a perspective view showing an internal appearance of the lock gear with a locking gear coupled therewith.
Figure 15:
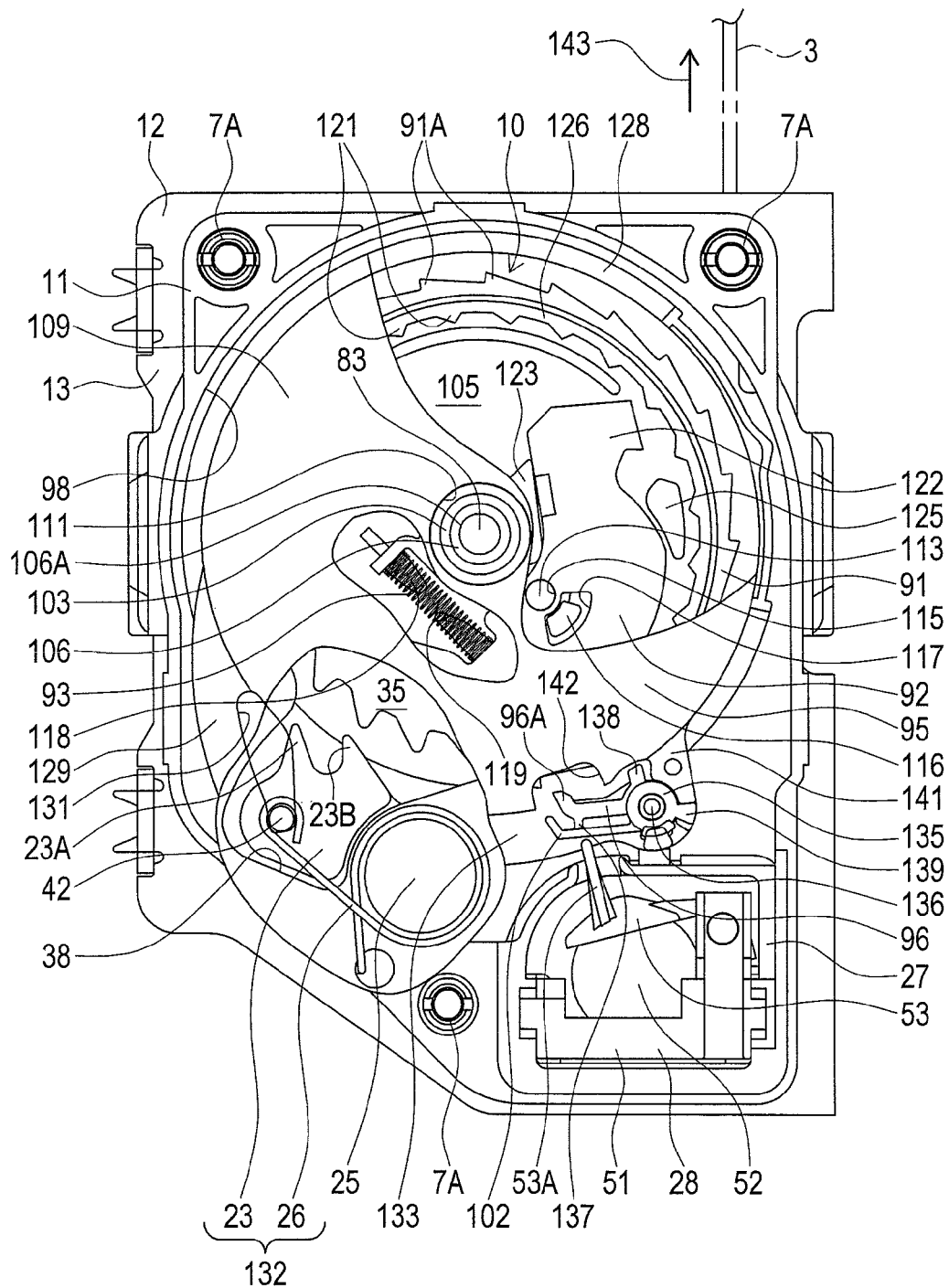
FIG. 15 is a partial cutaway sectional view showing the locking unit with a bottom face portion of a mechanism cover partially cut away.

Next will be described a schematic configuration of the locking unit 7 composing the lock mechanism 10 that stops the pull-out of the webbing 3 in response to the abrupt pull-out of the webbing 3 or abrupt change in acceleration of a vehicle, referring to FIG. 2, FIG. 3, FIG. 12 through FIG. 15. FIG. 12 and FIG. 13 each are an exploded perspective view of the locking unit 7. FIG. 14 is a perspective view showing an internal appearance of the lock gear 35 with a locking gear 91 coupled therewith. FIG. 15 is a partial cutaway sectional view showing the locking unit 7 with the bottom face portion of the mechanism cover 11 partially cut away.

As illustrated in FIG. 2, FIG. 3, FIG. 12 and FIG. 13, the locking unit 7 includes the mechanism cover 11, the locking gear 91, a locking arm 92, a sensor spring 93, a clutch 95 and a pilot lever 96. In the first embodiment, the members included in the locking unit 7 are made of synthetic resin except the sensor spring 93. Thus, friction coefficient of contact between the members is quite small.

The mechanism cover 11 has a substantially box-shaped mechanism housing portion 98 having a bottom face portion 97 formed in substantially unifolin thickness and circular shape and opened on the side facing the side wall portion 13 of the housing 12, to house the locking gear 91, the clutch 95, and the like. Further, the mechanism cover 11 has a sensor housing portion 99 aligned with the mechanism housing portion 98. The sensor housing portion 99 is formed in a concave shape being rectangular in cross section, at a corner portion (downward left corner in FIG. 13) facing the acceleration sensor 28 attached to the housing 12 with the sensor cover 27.

The sensor holder 51 of the acceleration sensor 28 is configured to be fitted into the sensor housing portion 99 when the mechanism cover 11 is attached to the side wall portion 13 by the nylon latches 7A, so that the sensor lever 53 is housed in a vertically movable manner (up/down direction in FIG. 13). Further, an opening portion 101 is opened to allow communication between the mechanism housing portion 98 and the sensor housing portion 99, on substantially middle of the lower end portion of the mechanism housing portion 98 of the mechanism cover 11 (substantially middle on the lower end portion in FIG. 13).

This opening portion 101 is formed to allow vertical movement (in up/down direction in FIG. 13) of the top end portion of a lock claw 53A. The lock claw 53A is projected in upward direction (upward in FIG. 13) from the tip portion of the sensor lever 53 of the acceleration sensor 28. In normal time, the tip portion of the lock claw 53A is positioned in vicinity of a receiving plate portion 102 of the pilot lever 96. When the inertia mass 52 is moved by acceleration exceeding a predetermined value to pivotally move the sensor lever 53 vertically upward, the lock claw 53A abuts on the receiving plate portion 102 of the pilot lever 96 through the opening portion 101 to pivotally move the pilot lever 96 vertically upward.

The mechanism housing portion 98 has a cylindrical supporting boss 103 projected in the center of the approximately circular-shaped bottom face portion 97. A chamfered portion is formed on the whole outer periphery of the tip portion of the supporting boss 103 on the locking gear 91 side, tapered toward the top with an inclination of a predetermined angle (for instance, approximately 30 degrees inclination). Further, the locking gear 91 has a disk-like bottom face portion 105 provided with a cylindrical rotational axis portion 106 projected from the back side facing the mechanism cover 11, at the center portion thereof. The cylindrical rotational axis portion 106 is inserted into the supporting boss 103, and held slidably and rotatably.

The locking gear 91 has locking gear teeth 91A formed on a circular ring-like projection projecting toward the clutch 95 side on the whole periphery of the disk-like bottom face portion 105. The locking gear teeth 91A is formed on the outer peripheral portion thereof, and configured to engage with the pilot lever 96. The locking gear teeth 91A are formed to engage with an engagement claw portion 96A of the pilot lever 96 only when the locking gear 91 is rotated in the webbing pull-out direction.

The center portion of the bottom face portion 105 of the locking gear 91 has a through hole, which fittingly receives the shaft portion 83 projected at the center portion of the end face of the lock gear 35 on the locking gear 91 side. Further, a cylindrical pedestal portion 107 is projected at the peripheral portion of the through hole on the mechanism cover 11 side, at a height substantially similar to the height in axial direction of the locking gear teeth 91A. Further, the cylindrical rotational axis portion 106 of the locking gear 91 is co-axially extended from the edge portion of the cylindrical pedestal portion 107 on the mechanism cover 11 side, at an outer diameter smaller than the pedestal portion 107 and substantially the same diameter as the inner diameter of the supporting boss 103, toward the mechanism cover 11 side.

Accordingly, inside the pedestal portion 107 and the rotational axis portion 106, there is formed a shaft hole portion 106A, circular shaped in cross section. The shaft hole portion 106A is opened at the end face of the locking gear 91 on the lock gear 35 side, and fittingly receives the shaft portion 83 projected at the center portion of the end face of the lock gear 35 on the mechanism cover 11 side. Further, on the inner periphery of the shaft hole portion 106A, a plurality of ribs 106B are projected along the axial direction at radially the same height so as to make contact with the outer periphery of the columnar shaft portion 83 of the lock gear 35.

Around the base end portion of the rotational axis portion 106, a circular ring-like rib 108 is co-axially formed, at a height substantially the same as the thickness dimension of a substantially disk-like plate portion 109 of the clutch 95, and an insertion groove that receives insertion of the supporting boss 103 is formed thereat. The inner circumferential wall portion of the circular ring-like rib 108 is inclined radially outward at an angle larger than the inclination of the tip portion of the supporting boss 103 (for instance, approximately 45 degrees inclination). Further, the outer diameter of the bottom face portion of the insertion groove formed inside the circular ring-like rib 108 is formed to be substantially the same as the outer diameter of the tip portion of the supporting boss 103.

Still further, the outer diameter of the circular ring-like rib 108 is formed substantially the same as the inner diameter of a through hole 111 formed at the center portion of the plate portion 109 of the clutch 95, and at the same time, smaller than the outer diameter of the pedestal portion 107. Further, a circular ring-like rib 111A is projected for whole periphery of the edge portion of the through hole 111 of the clutch 95 on the locking gear 91 side, at a predetermined height (for instance, approximately 0.5 mm high).

Accordingly, the circular ring-like rib 108 of the locking gear 91 is fittedly inserted into the through hole 111 of the clutch 95 so as to make the circular ring-like rib 111A abut on the outer peripheral side of the base end portion of the rib 108, and then the rotational axis portion 106 is inserted into the supporting boss 103 of the mechanism cover 11. Then the tip portion of the supporting boss 103 is made to abut on the bottom face portion of the insertion groove formed radially inside the circular ring-like rib 108, so that the rotational axis portion 106 projecting from the backside of the locking gear 91 is attached co-axially with regard to the supporting boss 103 for substantially the whole height and is pivotally supported. Further, the circular ring-like rib 108 of the locking gear 91 is inserted into through hole 111 slidably and rotatably, and the clutch 95 is housed between the locking gear 91 and the mechanism cover 11 in a manner rotatable within a predetermined rotation range.

On the end face of the locking gear 91 on the lock gear 35 side, six convex portions 112 are formed at positions corresponding to the six through holes 89 formed at the end face portion of the lock gear 35 on the locking unit 7 side. The six convex portions 112 are formed each in a circumferentially long, approximately rectangular shape in cross section, in substantially the same shape as each through hole 89. The six convex portions 112 are projected each in a square pillar shape, and are positioned concentrically by every 60 degrees of equal center angle. Further, the height of the shaft portion 83 projected on the end face of the lock gear 35 axially outward is set to be substantially the same as the length of the shaft hole portion 106A of the locking gear 91.

Accordingly, as illustrated in FIG. 14, the shaft portion 83 of the lock gear 35 is inserted into the shaft hole portion 106A of the locking gear 91, and at the same time, each convex portion 112 of the locking gear 91 is fitted into each through hole 89 of the lock gear 35. As a result, with the locking gear 91 abutting on the axially outside end face of the lock gear 35, the locking gear 91 is co-axially mounted onto the lock gear 35 so as to be relatively non-rotatable. The shaft portion 83 of the lock gear 35 is positioned within the supporting boss 103 of the mechanism cover 11 and pivotally supported through the rotational axis portion 106 of the locking gear 91. The tip portion of the shaft portion 83 of the lock gear 35 and the edge portion of the rotational axis portion 106 on the mechanism cover 11 side are positioned substantially on the same plane.

Further, as illustrated in FIG. 12, FIG. 13 and FIG. 15, a columnar supporting boss 113 is projected on the surface of the bottom face portion 105 of the locking gear 91 on the clutch 95 side. The columnar supporting boss 113 is projected adjacent to the pedestal portion 107, at a height lower than the locking gear teeth 91A. The locking arm 92 made of synthetic resin is formed into approximately an arch shape so as to surround the pedestal portion 107. In the locking arm 92, a through hole 115 is formed in the edge portion at the approximately the center portion in longitudinal direction on the pedestal portion 107 side, and the supporting boss 113 is rotatably inserted into the through hole 115 so that the locking arm 92 is rotatably supported.

The bottom face portion 105 of the locking gear 91 has an elastic engagement piece 116 projected at a position in vicinity of the radially outside of the supporting boss 113, on the mechanism cover 11 side. The elastic engagement piece 116 is reverse-L shaped in cross section. This elastic engagement piece 116 is inserted into a window portion 117 formed next to the through hole 115 of the locking arm 92, and engaged elastically and rotatably around the axis of the pedestal portion 107. The window portion 117 is formed in an approximately fan-like shape and has a stepped portion.

Further, as illustrated in FIG. 15, in the locking gear 91, a spring supporting pin 118 is projected on the rib portion extended radially outward from the outer periphery of the pedestal portion 107. One end side of the sensor spring 93 is fitted onto the spring supporting pin 118. The spring supporting pin 118 is projected in webbing pull-out direction perpendicular to the axial center of the pedestal portion 107. Further, at the locking arm 92, a spring supporting pin 119 is projected on the side wall facing the spring supporting pin 118, and the other end side of the sensor spring 93 is fitted into the spring supporting pin 119.

Accordingly, as illustrated in FIG. 13 and FIG. 15, by putting both ends of sensor spring 93 onto the spring supporting pins 118, 119, respectively, the locking arm 92 is urged with a predetermined load so as to rotate toward the webbing pull-out direction side (counterclockwise direction in FIG. 15) centering the axis of the supporting boss 113. Further, the locking arm 92 has an engagement claw 122 configured to engage with a clutch gear 121 of the clutch 95, and at an edge portion on the engagement claw 122 side, abuts on a stopper 123 projecting radially outward from the pedestal portion 107 of the locking gear 91.

Meanwhile, as later described, when the locking arm 92 is rotated in webbing take-up direction (clockwise in FIG. 15) against the urging force of the sensor spring 93 to engage with the clutch gear 121, an edge portion opposite to the engagement claw 122 forms a predetermined gap (for instance, approximately 0.3 mm gap) with a rotation restrictor 125 formed at the bottom face portion 105 of the locking gear 91. The rotation restrictor 125 is spindle-shaped in cross section.

Further, as illustrated in FIG. 12, FIG. 13 and FIG. 15, the clutch 95 is housed in a manner rotatable within a predetermined rotation range in the mechanism housing portion 98, while being held between the locking gear 91 and the mechanism cover 11. On the locking gear 91 side of the clutch 95, there is provided a circular ring-like rib portion 126. The circular ring-like rib portion 126 is co-axially formed with regard to the through hole 111, and has a slightly smaller outer diameter than the inner periphery of the circular ring-like projection of the locking gear 91 having the locking gear teeth 91A on the outer periphery portion thereof.

The rib portion 126 has the clutch gear 121 configured to engage with the engagement claw 122 of the locking arm 92, on the inner periphery thereof. The clutch gear 121 is to engage with the engagement claw 122 of the locking arm 92 only when the locking gear 91 is rotated in the webbing pull-out direction around the axis of the through hole 111.

Further, a circular ring-like outer rib portion 127 is formed at the outer peripheral portion of the substantially disk-like plate portion 109 of the clutch 95, so as to surround the rib portion 126. Further, on the whole periphery of the edge portion of the outer rib portion 127 on the lock gear 35 side, a flange portion 128 is formed, extending radially outward with respect to the central axis of the through hole 111, being slightly slanted toward the lock gear 35 side.

The outer rib portion 127 has a guiding block portion 129 extended on a portion opposing the pawl 23 (lower left corner portion in FIG. 12). The guiding block portion 129 is extended from the outer periphery of the outer rib portion 127 downward in vertical direction (downward in FIG. 12). The guiding block portion 129 has the long guiding hole 131 into which the guiding pin 42 formed on the side face of the tip portion including engagement teeth 23A, 23B of the pawl 23 is movably engaged from the lock gear 35 side.

The guiding hole 131 is, as illustrated in FIG. 15, formed at the portion opposed to the pawl 23 of the clutch 95 into a long groove-like shape substantially parallel to the webbing pull-out direction (vertically in FIG. 15). Accordingly, when the clutch 95 is rotated in the webbing pull-out direction (counterclockwise in FIG. 15), the guiding pin 42 is moved along the guiding hole 131, and the engagement teeth 23A, 23B of the pawl 23 are rotated so as to move closer to the ratchet gear teeth 65A of the lock gear 35.

Further, the pawl 23 is rotatably urged in a direction away from the lock gear 35 by the twisted coil spring 26, and the guiding pin 42 of the pawl 23 movably engaged at the guiding hole 131 urges the clutch 95. The clutch 95 is urged by this urging force so as to achieve a rotated state where the guiding pin 42 of the pawl 23 makes contact with the edge portion of the guiding hole 131 (lower edge portion of the guiding hole 131 in FIG. 15) located farthest away from the lock gear 35 in radial direction of the rotation of the clutch 95, so that the clutch 95 is rotatably urged in the direction opposite to the webbing pull-out direction. Thus, a clutch urging mechanism 132 is configured by the pawl 23 and the twisted coil spring 26.

At the same time, as the guiding pin 42 of the pawl 23 is made to have contact with the edge portion of the guiding hole 131 (lower edge portion of the guiding hole 131 in FIG. 15) located farthest away from the lock gear 35 in the radial direction of the rotation of the clutch 95 to regulate the rotation of the pawl 23 in normal occasion, the pawl 23 is held to be positioned in vicinity of the rear side of the notch portion 38 formed at the side wall portion 13.

Further, an extending portion 133 is extended in a plate-like shape, radially outward in approximately arc-like shape from the flange portion 128, on the lower edge portion of the outer rib portion 127 of the clutch 95 (lower edge portion in FIG. 13). The extending portion 133 extends from the end face portion of the guiding block portion 129 on the lock gear 35 side, to the portion facing the upper portion of the sensor housing portion 99 (upper direction in FIG. 13). Further, as illustrated in FIG. 12, FIG. 13 and FIG. 15, in vicinity of the edge portion opposite to the guiding block portion 129, the extending portion 133 has a mounting boss 136 on the mechanism cover 11 side at substantially the same height as the outer rib portion 127. The mounting boss 136 is thin columnar shaped and to be inserted into a cylindrical shaft portion 135 of the pilot lever 96.

Here, as illustrated in FIG. 12, FIG. 13 and FIG. 15, the pilot lever 96 includes the cylindrical shaft portion 135, the plate-like engagement claw portion 96A, the thin-plate-like receiving plate portion 102, and a thin-plate-like connecting plate portion 137. The length of the shaft portion 135 in axial direction is set substantially the same as the height of the mounting boss 136 erected at the extending portion 133. Further, the plate-like engagement claw portion 96A is formed approximately L shaped when viewed in the rotation axis direction, with the tip portion thereof obliquely bent toward the locking gear 91 side. Further, the plate-like engagement claw portion 96A is projected from the outer periphery of the shaft portion 135 to the guiding hole 131 side, in a predetermined length and at a width shorter than the length of the shaft portion 135. The plate-like engagement claw portion 96A is projected so as to be substantially horizontal when the pilot lever 96 is rotated by its own weight to regulate downward rotation in vertical direction.

Further, the thin-plate-like receiving plate portion 102 is projected from the outer periphery of the shaft portion 135 to the guiding hole 131 side in tangential direction so as to oppose to the engagement claw portion 96A, and the tip portion is obliquely bent so as to be substantially parallel with the tip side of the engagement claw portion 96A. The thin-plate-like connecting plate portion 137 is formed to connect the tip portions of the engagement claw portion 96A and the receiving plate portion 102. In vicinity of the base end portion of the engagement claw portion 96A, an upward rotation restrictor portion 138 is projected radially outward from the outer periphery of the shaft portion 135. The upward rotation restrictor portion 138 regulates the rotation of the pilot lever 96 in a direction of the locking gear 91 side, namely, the rotation upward in vertical direction. Further, the upward rotation restrictor portion 138 is projected at substantially the same width dimension of the width of engagement claw portion 96A and at a predetermined height (for instance, approximately 1.5 mm high) so as to form a right angle with the base end portion of the engagement claw portion 96A.

As illustrated in FIG. 15, at the edge portion of the extending portion 133 opposed to the mounting boss 136, a pilot lever supporting block 141 is projected toward the mechanism cover 11 side at a substantially the same height with the outer rib portion 127. The inner surface of the pilot lever supporting block 141 facing the mounting boss 136 is formed co-axially with the mounting boss 136 and into an approximately semicircular smooth curved face in front view at a radius curvature slightly larger (for instance, approximately 0.1 mm larger) than the radius of the outer periphery of the shaft portion 135 of the pilot lever 96.

Further, as illustrated in FIG. 15, an opening portion 142 penetrating in vertical direction is formed on the outer rib portion 127, at a location that the engagement claw portion 96A of the pilot lever 96 faces. The opening portion 142 is formed by cutting out the outer rib portion 127 at a predetermined dimension and at a predetermined circumferential width, to a portion more inward than the edge portion of the plate portion 109. The opening portion 142 is formed so as to allow the engagement claw portion 96A to enter the opening portion 142 and engage with the locking gear teeth 91A, when the engagement claw portion 96A is pressed and rotated by the lock claw 53A of the sensor lever 53.

Further, as illustrated in FIG. 15, when the pilot lever 96 is rotated by its own weight to the lower side in vertical direction (in lower direction in FIG. 15), a downward rotation restrictor portion 139 makes contact with the pilot lever supporting block 141 to regulate the rotation angle to the lower side in vertical direction (in lower direction in FIG. 15). Further, in normal state, the receiving plate portion 102 of the pilot lever 96 and the lock claw 53A of the sensor lever 53 have a clearance therebetween.

When the sensor lever 53 is rotated vertically upward (in upward direction in FIG. 15), and the pilot lever 96 is rotated by the lock claw 53A vertically upward, the engagement claw portion 96A of the pilot lever 96 makes contact with the locking gear 91 and engages with a locking gear tooth 91A. Further, when the locking gear 91 is rotated in the webbing pull-out direction (counterclockwise in FIG. 15) under the state where the engagement claw portion 96A of the pilot lever 96 is engaged with the locking gear teeth 91A, the engagement claw portion 96A is subject to a load in the mounting boss 136 side direction.

Thereby, when the load applied to the engagement claw portion 96A elastically deforms toward the shaft portion 135 side and further rotates the tip portion of the engagement claw portion 96A formed obliquely bent to the locking gear 91 side, the upward rotation restrictor portion 138 of the pilot lever 96 is made to abut on the pilot lever supporting block 141. Further, when the mounting boss 136 is warped by the load applied to the engagement claw portion 96A, the outer periphery of the shaft portion 135 makes contact with the inner surface of the pilot lever supporting block 141. Thus, the pressure load applied to the engagement claw portion 96A can be supported at the pilot lever supporting block 141 through the upward rotation restrictor portion 138 and the shaft portion 135.

[Operation of Lock Mechanism]

Next, the operation of the lock mechanism 10 will be described referring to FIG. 15. In FIG. 15, the pull out direction of the webbing 3 is indicated by arrow 143. Further, in FIG. 15, the counterclockwise direction is the direction of the rotation of the take-up drum unit 6 when the webbing 3 is pulled out (webbing pull-out direction). Some parts on the drawing are cut off for the convenience to illustrate the operation of the lock mechanism 10, when necessitated.

Here, the lock mechanism 10 operates two types of locking mechanisms, including a "webbing-sensitive lock mechanism" which is activated in response to sudden pull out of the webbing 3, and a "vehicle-body-sensitive lock mechanism" which is activated in response to acceleration caused by vehicle rocking or tilting. The "webbing-sensitive lock mechanism" and the "vehicle-body-sensitive lock mechanism" have a common operation with respect to the pawl 23. Accordingly, FIG. 15 is depicted in a state with some portion cut off to reveal the relation between the pawl 23 and the lock gear 35. Further, other portions are cut off to reveal the relation between the locking arm 92 and the clutch gear 121, and to reveal the sensor spring 93.

[Description of Operation in Webbing-sensitive Lock Mechanism]

First, the locking operation of the webbing-sensitive lock mechanism will be described referring to FIG. 15. As illustrated in FIG. 15, the locking arm 92 is rotatably supported by the supporting boss 113 of the locking gear 91, so that when the acceleration to pull out the webbing 3 exceeds a predetermined acceleration (for instance, approximately 2.0 G, regarding 1G≈9.8 m/s$^2$), an inertial delay is generated in the locking arm 92, to the rotation of the locking gear 91 in the webbing pull-out direction.

As a result, the locking arm 92 abutting on the stopper 123 maintains the initial position against the urging force of the sensor spring 93, rotates clockwise centering the supporting boss 113 with regard to the locking gear 91, to the vicinity of the rotation restrictor 125. Accordingly, the engagement claw 122 of the locking arm 92 is rotated radially outward with regard to the rotational axis of the locking gear 91, and engaged with the clutch gear 121 of the clutch 95.

When the pull out of the webbing 3 is continued exceeding the predetermined acceleration, the locking gear 91 further rotates in the webbing pull-out direction (counterclockwise direction), so that the engagement claw 122 of the locking arm 92 is rotated in the webbing pull-out direction while being engaged with clutch gear 121.

Accordingly, as the clutch gear 121 is rotated in the webbing pull-out direction by the locking arm 92, the clutch 95 is rotated in the webbing pull-out direction around the axial center of the rib 108 of the locking gear 91, namely, around the axial center of the rotational axis portion 106, against the urging force of the guiding pin 42 of the pawl 23 rotatably urged by the twisted coil spring 26 in the direction away from the lock gear 35.

If the pull out of the webbing 3 exceeding the predetermined acceleration is herewith further continued, the clutch 95 is further rotated in the webbing pull-out direction against the urging force of the guiding pin 42 of the pawl 23 rotatably urged by the twisted coil spring 26 in the direction away from the lock gear 35. Accordingly, the guiding pin 42 of the pawl 23 is guided by the guiding hole 131 of the clutch 95, and the pawl 23 is engaged with ratchet gear teeth 65A of the lock gear 35, against the urging force of the twisted coil spring 26. Accordingly, the rotation of the take-up drum unit 6 is locked, and thus the pull out of the webbing 3 is locked.

[Description of Operation in Vehicle-body-Sensitive Lock Mechanism]

Next, the locking operation of the "vehicle-body-sensitive lock mechanism" will be described referring to FIG. 15. As illustrated in FIG. 15, the spherical inertia mass 52 of the acceleration sensor 28 is placed on a bowl-like bottom face portion of the sensor holder 51, and moves on the bottom face portion of the sensor holder 51 to pivotally move the sensor lever 53 upward in vertical direction, if the acceleration due to rocking or tilting of the vehicle body exceeds the predetermined acceleration (for instance, approximately 2.0 G).

Thus, the lock claw 53A of the sensor lever 53 makes contact with the receiving plate portion 102 of the pilot lever 96 rotatably attached to the mounting boss 136 formed at the extending portion 133 of the clutch 95, to rotate the pilot lever 96 upward in vertical direction. Accordingly, the pilot lever 96 is rotated clockwise around the axial center of the mounting boss 136, and the engagement claw portion 96A of the pilot lever 96 enters inside the opening portion 142 of the clutch 95, and is engaged with locking gear teeth 91A formed at the outer peripheral portion of the locking gear 91.

Here, a predetermined clearance (for instance, approximately 0.1 mm clearance) is formed between the upward rotation restrictor portion 138 and the pilot lever supporting block 141.

Then, when the webbing 3 is pulled out while the pilot lever 96 is engaged with the locking gear teeth 91A of the locking gear 91, the locking gear 91 is rotated in the webbing pull-out direction (counterclockwise direction). Further, the rotation of the locking gear 91 in the webbing pull-out direction is transmitted through the pilot lever 96, the mounting boss 136 and the pilot lever supporting block 141 to the clutch 95.

Accordingly, in response to the rotation of the locking gear 91 in the webbing pull-out direction, the clutch 95 is rotated around the axial center of the rib 108 of the locking gear 91, namely, around the axial center of the rotational axis portion 106 in the webbing pull-out direction, against the urging force by the guiding pin 42 of the pawl 23 rotatably urged by the twisted coil spring 26 in the direction away from the lock gear 35.

Accordingly, if the webbing 3 is continued to be pulled out, the clutch 95 is further rotated in the webbing pull-out direction, against the urging force by the guiding pin 42 of the pawl 23 rotatably urged by the twisted coil spring 26 in the direction away from the lock gear 35. Thereby, the guiding pin 42 of the pawl 23 is guided by the guiding hole 131 of the clutch 95, and each of the engagement tooth 23A and 23B of the pawl 23 is engaged with a ratchet gear tooth 65A of the lock gear 35. Thus, the rotation of the take-up drum unit 6 is locked, and thus the pull out of the webbing 3 is locked.

[Schematic Configuration of Take-Up Spring Unit]

Figure 16:
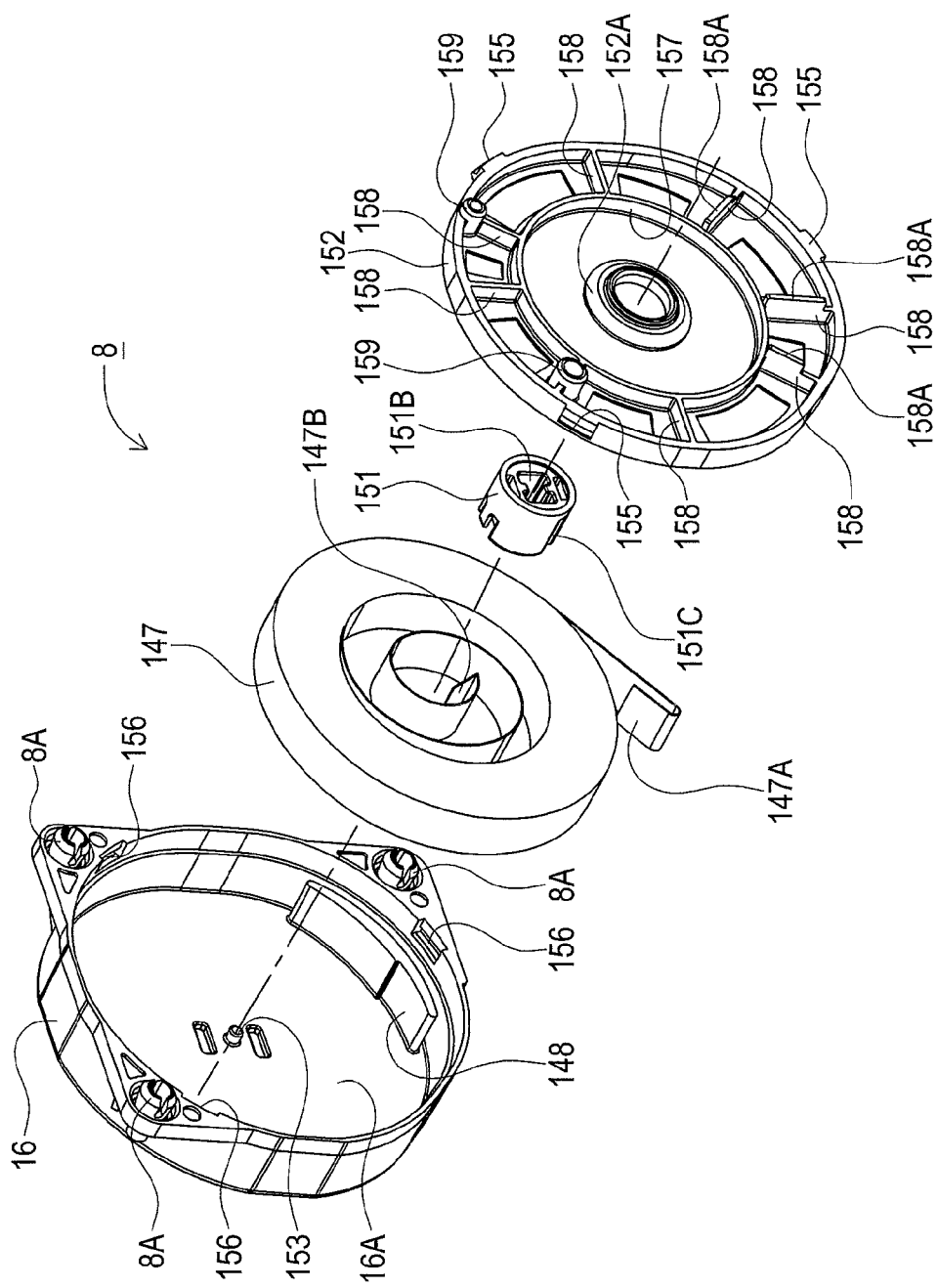
FIG. 16 is an exploded perspective view of a take-up spring unit.
Figure 17:
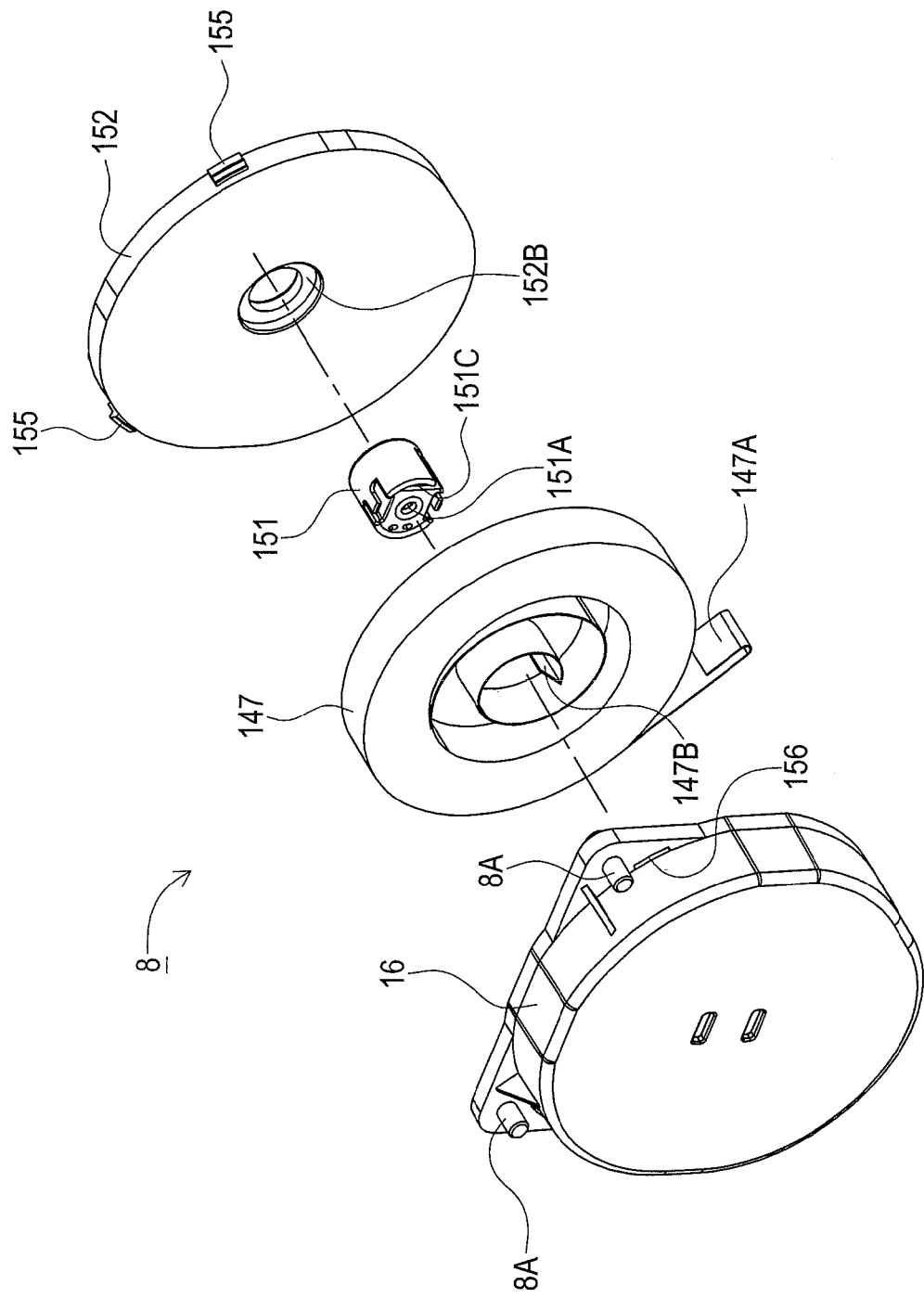
FIG. 17 is an exploded perspective view of the take-up spring unit.

Next, a schematic configuration of the take-up spring unit 8 will be described based on FIG. 2, FIG. 3, FIG. 16 and FIG. 17. FIG. 16 and FIG. 17 are each an exploded perspective view of the take-up spring unit 8.

As shown in FIG. 16 and FIG. 17, the take-up spring unit 8 has a spiral spring 147, the spring case 16, the spring shaft 151 and a spring seat 152. The spring case 16 fixes an outer end 147A of the spiral spring 147 at a rib 148 projected from the bottom face of the inner peripheral portion thereof, and accommodates this spiral spring 147. The spring shaft 151 has a mounting groove 151C in which the inner end 147B of the spiral spring 147 is fitted so that the spring shaft 151 is urged by the spring force. The spring seat 152 has an approximately plate-like shape and is attached to the spring case 16 to cover the spiral spring 147.

A pin 153 is erected approximately at the center position of a bottom face portion 16A of the spring case 16. The pin 153 is inserted into a through hole 151A in the bottom face portion of the spring shaft 151, to rotatably support the spring shaft 151 at the bottom face portion 16A side. Further, the spring seat 152 has an approximately cylindrical boss portion 152A at the center portion thereof. At the inner peripheral portion on the base end side of the cylindrical boss portion 152A, a circular-shaped stepped portion 152B is formed, to rotatably support the end portion of the spring shaft 151 of the spring seat 152 side. Further, the spring seat 152 has fixing projections 155 at three locations on the outer peripheral portion thereof. The fixing projections 155 are elastically locked with fixing holes 156 provided at the opening side circumferential portion of the spring case 16, respectively, so that the spring seat 152 is fixed.

The base end portion of the shaft 68 of the take-up drum unit 6 is circular in cross section, and is fitted at the approximately cylindrical boss portion 152A provided at the center portion of the spring seat 152 and rotatably supported.

At the same time, the tip portion of the shaft 68 of the take-up drum unit 6 is formed in approximately rectangular shape in cross section, and is inserted into a cylindrical hole 151B formed in approximately rectangular shape in cross section at the spring shaft 151, and coupled to the spring shaft 151 in a relatively non-rotatable manner. Accordingly, the urging force of the spiral spring 147 constantly urges the take-up drum unit 6 to rotate in the take-up direction of the webbing 3 through the spring shaft 151.

Further, a rib 157 in a ring-like shape is erected on a surface of the spring seat 152 at the side wall portion 17 side. The rib 157 is formed to cover the outer peripheral portion of the outer flange 71 formed on the edge portion of the take-up drum unit 6. A plurality of reinforcement ribs 158 are radially formed from the outer periphery of the rib 157, extending radially outward to the outer peripheral portion. Of the plurality of reinforcement ribs 158, reinforcement ribs 158 facing the lower peripheral portion of the through hole 57 formed in the side wall portion 17 of the housing 12 each have a positioning portion 158A on the upper end portion thereof. The positioning portion 158A is projected from the outer periphery of the rib 157 to the position facing the inner periphery of the through hole 57 at the height substantially equal to the thickness of the side wall portion 17.

A pair of cylindrical positioning bosses 159 are formed on the outside of the rib 157 of the spring seat 152. Further, a pair of positioning holes 161 are formed in the upper peripheral portion of the through hole 57 formed on the side wall portion 17 of the housing 12, and the pair of positioning holes 161 fittingly receive the positioning bosses 159, respectively.

Figure 18:
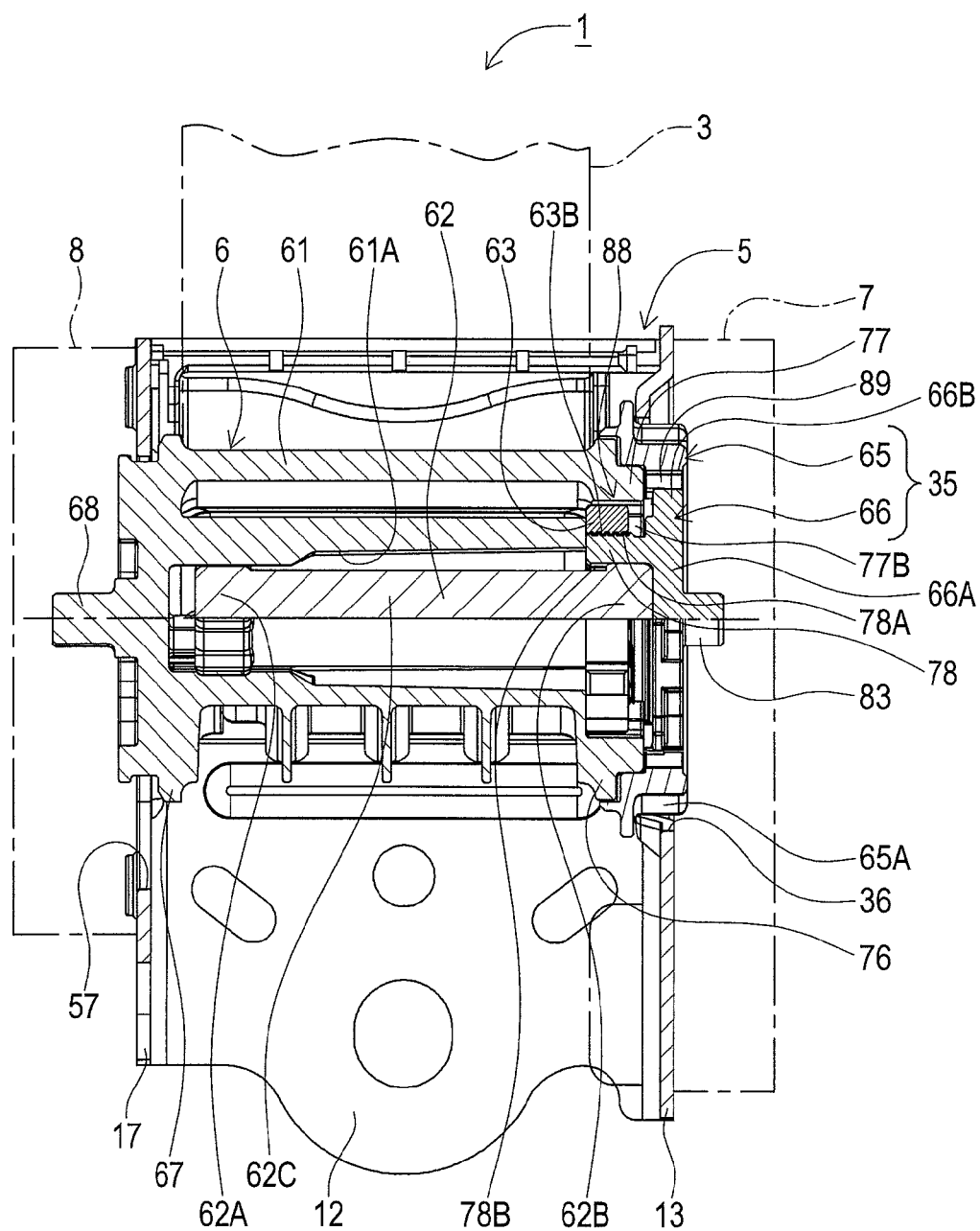
FIG. 18 is a sectional view of a principal portion of the seatbelt retractor in a normal operation.

Next will be described the mounting operation of the locking unit 7 and the take-up spring unit 8 thus configured, onto the side wall portions 13 and 17 of the housing 12, referring to FIG. 18. FIG. 18 is a sectional view of a principal portion of the seatbelt retractor in a normal operation.

First, the mounting operation of the locking unit 7 onto the side wall portion 13 is discussed referring to FIG. 18.

As illustrated in FIG. 18, the locking unit 7 is attached in the respective mounting holes 15 of the side wall portion 13 through nylon latches 7A from axially outside. Further, the shaft portion 83 of the lock gear 35 is inserted in the shaft hole portion 106A of the locking gear 91, while the convex portions 112 of the locking gear 91 are fitted into the through holes 89 formed by the ratchet gear 65 and the ratchet base 66 of the lock gear 35.

Accordingly, while the locking gear 91 is abutting on the axially outside end face of the lock gear 35, the locking gear 91 is coaxially mounted onto the lock gear 35 in a relatively non-rotatable manner. The rotational axis portion 106 of the locking gear 91 is fitted into the supporting boss 103 of the mechanism cover 11, and is rotatably supported while the base end portion of the rotational axis portion 106 abuts on the tip portion of the supporting boss 103.

Further, of the stopper nut 63 included in the stopper mechanism 88, the internal thread portion 63B is engaged from outside with the external thread portion 78A farmed at the outer periphery of the fixation boss 78, and the stopper nut 63 is located innermost end portion of the fixation boss 78 on the shaft hole 61A side in axial direction. Accordingly, a predetermined clearance (for instance, approximately 3 mm clearance) is formed between the stopper nut 63 and the brim-like portion 66B of the ratchet base 66.

Subsequently, the mounting operation of the take-up spring unit 8 onto the side wall portion 17 of the housing 12 will be discussed, referring to FIG. 18.

As illustrated in FIG. 18, while the positioning bosses 159 are respectively fitted into the pair of positioning holes 161 formed in the side wall portion 17 of the housing 12, the take-up spring unit 8 is fixed from axially outside to the mounting holes 18 in the side wall portion 17 by the nylon latches 8A of the spring case 16. Further, the shaft 68 of the take-up drum 61 is inserted into the boss portion 152A of the spring seat 152, and then, the tip portion of the shaft 68 formed approximately rectangular in cross section is inserted into the cylindrical hole 151B formed approximately rectangular in cross section in the spring shaft 151, and coupled to the spring shaft 151 in a relatively non-rotatable manner.

Accordingly, with the tip portion of the boss portion 152A of the spring seat 152 abutting on the take-up-spring-side flange portion 67 of the take-up drum 61, the base end portion of the shaft 68 of the take-up drum 61 is rotatably supported. Further, the urging force of the spiral spring 147 constantly urges the take-up drum unit 6 to rotate in the webbing take-up direction, through the spring shaft 151. Further, the positioning portion 158A of the reinforcement rib 158 is inserted into the through hole 57 so as to have substantially the same height as the inner surface of the side wall portion 17.

[Operation of Stopper Mechanism]

Figure 19:
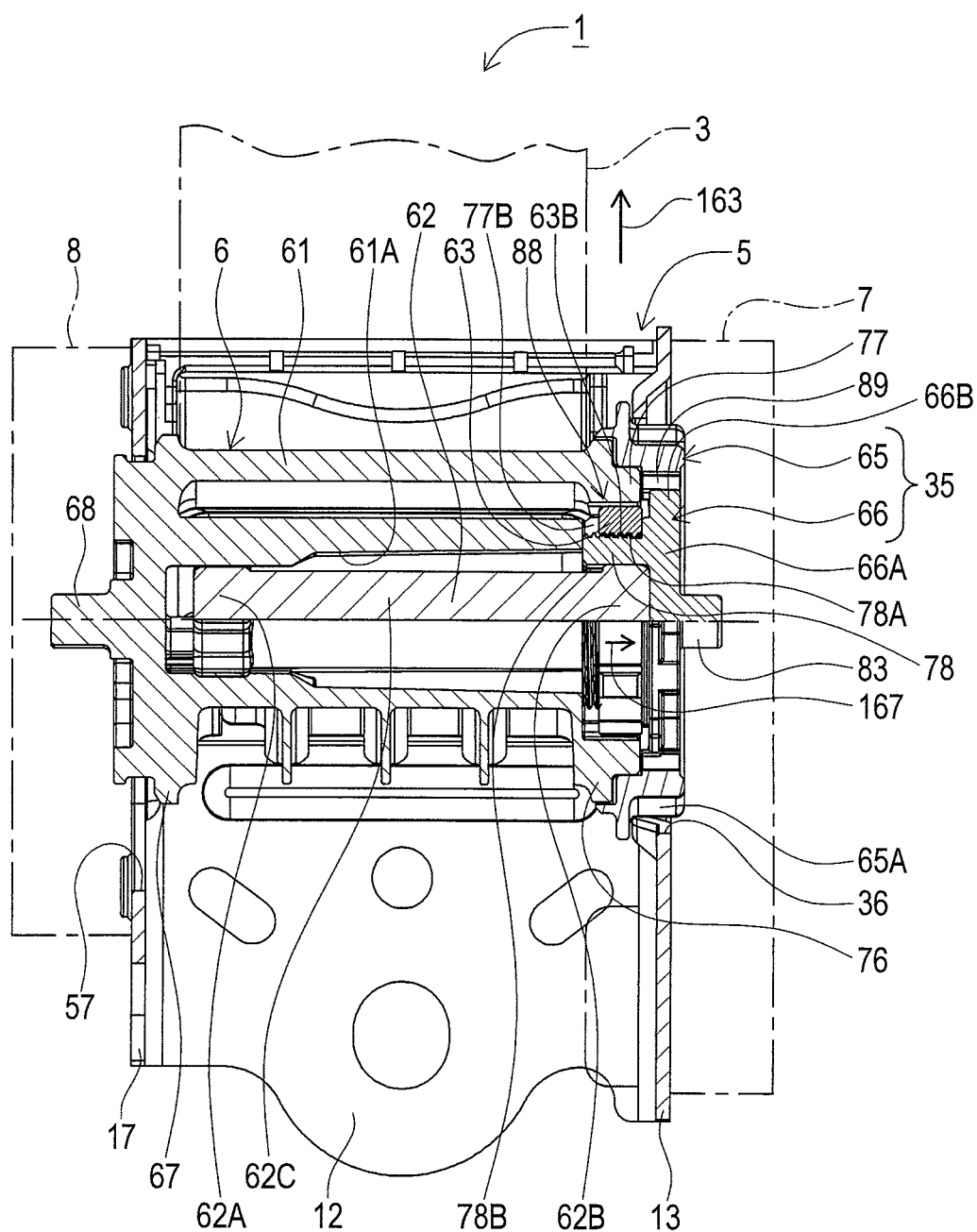
FIG. 19 is a sectional view of the principal portion of the seatbelt retractor, showing a state where a stopper mechanism has fastened the lock gear and the take-up drum.

Next, there will be described on operation of the stopper mechanism 88 in case of an emergency such as vehicle collision and the like by referring to FIG. 11, FIG. 18 and FIG. 19. FIG. 19 is a cross sectional view of the principal portion in a state that the stopper mechanism 88 of the seatbelt retractor 1 has fastened the lock gear 35 and the take-up drum 61 together.

In case of an emergency such as vehicle collision and the like, the inertia mass 52 of the acceleration sensor 28 moves on the bottom portion of the sensor holder 51 so as to move the sensor lever 53 vertically upward. Thereby, as already described, the lock claw 53A of the sensor lever 53 moves the pilot lever 96 vertically upward. Subsequently, the engagement claw portion 96A of the pilot lever 96 gets in contact with the locking gear teeth 91A formed on the outer periphery of the locking gear 91.

Consequently, the webbing 3 is pulled out (in the direction indicated with arrow 163 in FIG. 19). In a case where the take-up drum 61 is rotated in the webbing-pull-out direction, the engagement claw portion 96A of the pilot lever 96 gets engaged with the locking gear teeth 91A on the outer periphery of the locking gear 91 so that the clutch 95 is moved toward the webbing-pull-out direction. Thereby, the pawl 23 guided to the guiding hole 131 gets engaged with the ratchet gear teeth 65A of the lock gear 35.

Accordingly, when the webbing 3 is pulled out in case of emergency such as vehicle collision, etc., the engagement of the pawl 23 and the ratchet gear teeth 65A serves to stop rotation of the lock gear 35 of the take-up drum unit 6 in the webbing-pull-out direction. Incidentally, the engagement of the pawl 23 and the ratchet gear teeth 65A is engagement structure that allows the take-up drum 61 to rotate in one direction, namely, in webbing-pull-out direction.

In a case where a vehicle occupant is relatively moved frontward with respect to the vehicle in a state that engagement of the pawl 23 and the ratchet gear teeth 65A of the lock gear 35 is kept, significantly large pull-out load acts on the webbing 3. As shown in FIG. 11, in a case where the webbing 3 is pulled out with the pull-out load exceeding predetermined value corresponding to threshold (for instance, approximately 4KN), rotation torque in the webbing-pull-out direction (in the direction indicated with the arrow 165 in FIG. 11) acts on the take-up drum 61.

Since the pawl 23 stops rotation of the lock gear 35, there is stopped rotation of the connecting portion 62B on the torsion bar 62 press-fitted in the engagement convex portion 78B of the lock gear 35 in the webbing-pull-out direction. Therefore, of the torsion bar 62, the connecting portion 62A press-fitted into the shaft hole 61A of the take-up drum 61 is rotated by the rotation torque acting on the take-up drum 61 in the webbing-pill-out direction and torsional deformation is caused to the shaft portion 62C of the torsion bar 62. The take-up drum 61 is rotated in the webbing-pull-out direction along the torsional deformation at the shaft portion 62C of the torsion bar 62 whereby the energy is absorbed in the form of the torsional deformation of the torsion bar 62.

Incidentally, since the pawl 23 and the lock gear 35 are engaged when the take-up drum 61 is rotated, relative rotation is caused between the lock gear 35 and the take-up drum 61. As shown in FIG. 11, since each spline 63A is fitted in each groove portion 77A formed in the inner peripheral surface of the fitting hole 77B, the stopper nut 63 is rotated in the webbing-pull-out direction (in the direction indicated with the arrow 165) together with the take-up drum 61.

Since relative rotation is also caused between the stopper nut 63 and the fixation boss 78 of the lock gear 35, the stopper nut 63 to be screwed with the external thread portion 78A is caused to move toward the base end portion of the fixation boss 78 along each groove portion 77A, namely axially outward with respect to the take-up drum 61 (in the direction indicated with the arrow 167 in FIG. 19) from the state as shown in FIG. 18.

In a case where amount of torsional deformation brought to the shaft portion 62C of the torsion bar 62 reaches a certain extent corresponding to the predetermined number of times of rotations (for instance, approximately 1.5 turns), the stopper nut 63 comes into contact with the brim-like portion 66B formed on the base end portion of the fixation boss 78, as shown in FIG. 19. Thereby, the stopper nut 63 and the fixation boss 78 are fastened in a relatively non-rotatable manner. Accordingly, owing to the intervention of the stopper mechanism 88 consisting of the stopper nut 63 press-fitted inside the fitting hole 77B and the fixation boss 78, the lock gear 35 and the take-up drum 63 are fastened so that relative rotation therebetween is stopped and pull-out of the webbing 3 is locked.

Thereby, even if large pull-out load acts on the webbing 3 due to an emergency such as vehicle collision, etc. and the torsion bar 62 is caused to rotate plural number of times to the extent of getting torsional deformation for absorbing kinetic energy of the vehicle occupant, the stopper mechanism 88 thoroughly fastens the lock gear 35 and the take-up drum 61 in a relatively non-rotatable manner. Since torsional deformation of the torsion bar 62 is put to an end by the time the lock gear 35 and the take-up drum 61 are fastened, the stopper mechanism 88 can prevent fracture of the shaft portion 62C exceeding the enduarable number of times of rotations.

Further, by properly setting the number of times of rotations to bring the shaft portion 62C of the torsion bar 62 into the state of torsional deformation to the extent that the stopper nut 63 comes in contact with the brim-like portion 66B on the base end portion of the fixation boss 78 of the lock gear 35, safety of the vehicle occupant can be secured in a state that the vehicle occupant is surely restrained so as to avoid secondary collision against steering wheel, automobile windshield, front seat, etc.

The predetermined value of webbing-pull-out load to cause the torsion bar 62 to start torsional deformation can be properly set by selecting length, diameter, material, etc. of the torsion bar 62. Further, the number of times for the shaft portion 62C of the torsion bar 62 to rotate and get torsional deformation to the extent that the stopper nut 63 comes in contact with the brim-like portion 66B on the base end portion of the fixation boss 78 of the lock gear 35 can be properly set by selecting length of the external thread portion 78A of the fixation boss 78, clearance between the stopper nut 63 and the brim-like portion 66B, etc.

Further, regarding the stopper mechanism 88, the helical structure between the external thread portion 78A of the fixation boss 78 and the internal thread portion 63B of the stopper nut 63 may be made inverse. With the inverse helical structure, the stopper nut 63 may be configured to rotate and move axially inward in a case where the shaft portion 62C of the torsion bar 62 gets torsionaly deformed and relative rotation is caused between the lock gear 35 and the take-up drum 61.

In a case where amount of torsional deformation brought to the shaft portion 62C of the torsion bar 62 reaches a certain extent corresponding to the predetermined number of times of rotations (for instance, approximately 1.5 turns), relative rotation between the stopper nut 63 and the fixation boss 78 may be stopped when each spline 63A of the stopper nut 63 comes into contact with the axially rearward end surface of each groove portion 77A, or alternatively, when the stopper nut 63 comes into contact with the axially rearward end surface of the fitting hole 77B. Thereby, owing to the intervention of the stopper mechanism 88 consisting of the stopper nut 63 press-fitted inside the fitting hole 77B and the fixation boss 78, the lock gear 35 and the take-up drum 63 are fastened so that relative rotation therebetween is stopped and pull-out of the webbing 3 is locked.

Further, regarding the stopper mechanism 88, the stopper nut 63 may be mounted to the fitting hole 77B of the take-up drum 61 so as not to be movable in the axial direction and a clearance may be taken between the lock gear 35 and the take-up drum 61 in the axial direction. In a case where relative rotation is caused between the lock gear 35 and the take-up drum 61 with the above structure, the stopper nut 63 may be configured to rotate and move axially outward together with the take-up drum 61.

In a case where amount of torsional deformation brought to the shaft portion 62C of the torsion bar 62 reaches a certain extent corresponding to the predetermined number of times of rotations (for instance, approximately 1.5 turns), relative rotation between the stopper nut 63 and fixation boss 78 may be stopped when the stopper nut 63 comes into contact with the brim-like portion 66B formed on the base end portion of the fixation boss 78, or alternatively, when the take-up drum 61 comes into contact with the lock gear 35. Thereby, owing to the intervention of the stopper mechanism 88 consisting of the stopper nut 63 press-fitted inside the fitting hole 77B and the fixation boss 78, the lock gear 35 and the take-up drum 61 are fastened together so that relative rotation therebetween is stopped and pull-out of the webbing 3 is locked.

As described in detail, in the seatbelt retractor 1 directed to the first embodiment, the lock gear 35 thereof includes: the ratchet gear 65 that is a ring-like shape in cross sectional view and provided with the ratchet gear teeth 65A on the outer peripheral surface thereof and the ratchet base 66 fitted and fixed inside of the ratchet gear 65 so as to close the axially outer end surface portion of the ratchet gear 65.

Further, the ratchet base 66 consists of: the base portion 66A that is substantially circular-plate-like shaped; and the cylindrical shaped fixation boss 78 that is mounted upright on the center of the base portion 66A at the inside of the take-up drum 61. The fixation boss 78 includes the external thread portion 78A on the outer peripheral surface at full length thereof and the engagement convex portion 78B at inside thereof. The circular-plate-like base portion 66A includes the brim-like portion 66B that is ring-like shaped in front view and configured to project in radially outward at full periphery of the circular-plate-like shape from the base end portion of the fixation boss 78 with respect to rotation axis of the take-up drum 61.

Thus, since the ratchet gear 65 and the ratchet base 66 can be separately manufactured, the ratchet gear teeth 65A on the ratchet gear 65 and the fixation boss 78 of the ratchet base 66 each can be formed easily. Further, since the ratchet gear 65 and the ratchet base 66 can be separately manufactured, the ratchet gear 65 and the ratchet base 66 can be made from different material; the ratchet gear 65 can be formed by means of aluminum die-casting, zinc die-casting or the like and the ratchet base 66 can be formed from steel material.

Accordingly, degree of design freedom of material and manufacturing method can be increased while strength of the external thread portion 78A on the outer peripheral surface of the fixation boss 78 is easily secured and weight reduction of the lock gear 35 is achieved concurrently. Further, the fixation boss 78 can be made from material of which strength is higher than material of which the ratchet gear 65 is made, the fixation boss 78 is designed to get coupled with the connecting portion 62B of the torsion bar 62 in a relatively non-rotatable manner. Thereby, design optimization and cost reduction can be satisfied while fastening intensity of the stopper mechanism 88 can be enhanced easily.

Further, by preparing the ratchet gear 65 and the ratchet base 66 as separate parts, the ratchet gear teeth 65A and the external thread portion 78A of the fixation boss 78 can be separately elaborated. Thereby, without arranging the ratchet gear 65 and the fixation boss 78 apart in the axial direction, there can be easily formed the lock gear 35 with the bottom end portion of the external thread portion 78A on the fixation boss 78 being arranged axially inward with respect to of the ratchet gear 65. Accordingly, size reduction of the stopper mechanism 88 consisting of the stopper nut 63 and the fixation boss 78 can be achieved with respect to axial directional size thereof and eventually size reduction of the take-up drum unit 6 of the seatbelt retractor 1 can be achieved with respect to axial directional size thereof, as well.

Further, the ratchet base 66 is mounted on the ratchet gear 65 by taking the following steps: the base portion 66A is fitted in the through hole 87 of the ratchet gear 65 while each notch portion 86 formed on the outer peripheral portion of the brim-like portion 66B gets in contact with outer periphery of each rivet pin 82B; and each stepped portion 82A formed on each mounting piece 82 is fitted into each concave portion 85 of the brim-like portion 66B. Thereafter, a head of each rivet pin 82B is made plastically deformed so as to spread over each concave portion 82C of the bottom end portion and a periphery portion of the corresponding notch portion 86. Thereby, the ratchet base 66 is attached inside of the ratchet gear 65 in a relatively non-rotatable manner. The integration of the ratchet base 66 and the ratchet gear 65 is fixed to the take-up drum 61 so as not to remove therefrom, whereby the lock gear 35 is made up.

Thus, the ratchet base 66 is fixedly attached to the ratchet gear 65 by fitting each mounting piece 82 of the ratchet gear 65 to each concave portion 85 and making a head of each rivet pin 82 plastically deformed. Therefore, the structure to mount the ratchet gear 65 to the ratchet base 66 can be made thinner and downsizing of the lock gear 35 can be achieved with respect to axial directional size thereof. The above mentioned mechanical structure can facilitate integration of the ratchet gear 65 and the ratchet base 66 so as to enhance efficiency in assemblage work of the lock gear 35.

Further, when the flat-plate-like base portion 66A of ratchet base 66 is fitted in the through hole 87 of the ratchet gear 65 and each step portion 82A formed on each mounting piece 82 is fitted into each concave portion 85 of the brim-like portion 66B, the axially outer surface of the base portion 66A constitutes an axially outer end surface of the ratchet gear 65.

The base portion 66A of the ratchet base 66 may be formed as large as possible so that the base portion 66A should make up most of the axially outer end surface portion of the lock gear 35, which intends to make the axially outer end surface portion of the lock gear 35 thinner. Thereby, movement amount of the stopper nut 63 can easily be secured and weight reduction of the lock gear 35 can be realized. Since the base end portion of the fixation boss 78 having the external thread portion 78A on the outer surface thereof is located inside of the ratchet gear 65, downsizing of the stopper mechanism 88 can be achieved further with respect to axial directional size thereof.

Further, the stopper nut 63 screwed with the external thread portion 78A of the fixation boss 78 is fitted in the take-up drum 61 so that each spline 63A projecting from the outer peripheral surface of the stopper nut 63 fits in the corresponding groove portion 77A formed on the inner peripheral surface of the steeped portion 77 of the take-up drum 61. Thereby, the stopper nut 63 is allowed to rotate and move axially outward with respect to the take-up drum 61 when relative rotation between the lock gear 35 and the take-up drum 61 is caused due to an emergency such as vehicle collision and the like. Since the stopper nut 63 is allowed to rotate, freedom in setting the number of times of relative rotations allowed for the take-up drum 61 with respect to the lock gear 35 can be extended.

Further, the stopper nut 63 mounted on the fixation boss 78 is located inside of the ratchet gear 65 and axially outward movement of the stopper nut 63 along axial direction of the fixation boss 78 is restricted inside of the ratchet gear 65. Thereby, while dimensional design limitation in axial directional size of the seatbelt refractor 1 is suppressed, movement amount of the stopper nut 63 can easily be secured and the number of times of relative rotations allowed for the take-up drum 61 with respect to the lock gear 35 can be set freely. Since the lock gear 35 and the take-up drum 61 are fastened together in a relatively non-rotatable manner by getting the stopper nut 63 in contact with the brim-like portion 66 formed on the base end portion of the fixation boss 78, fastening strength of the stopper mechanism 88 can easily be secured.

Further, the fitting hole 77B allowing insertion of the fixation boss 78 is formed inside of the stepped portion 77. The stepped portion 77 is substantially cylinder-like shaped and configured to project from one end portion of the take-up drum 61 axially outward so as to be inserted in the inner side of the ratchet gear teeth 65A of the ratchet gear 65. Thereby, while dimensional design limitation in axial directional size of the seatbelt retractor 1 is suppressed, the fitting hole 77B can be formed in the take-up drum 61, movement amount of the stopper nut 63 can easily be secured and the number of times of relative rotations allowed for the take-up drum 61 with respect to the lock gear 35 can be set freely.

For instance, in a case where webbing-pull-out amount allowed for a front seat is set a little so as to prevent vehicle occupant's secondary collision against the front seat, the number of times of relative rotations allowed for the take-up drum 61 with respect to lock gear 35 may be set to 1.5 turns at maximum. Thereby, the fitting hole 77B for allowing insertion of the fixation boss 78 can easily be formed inside of the substantially cylinder-like stepped portion 77. Consequently, there can be suppressed dimensional design limitation in axial directional size of the stepped portion 77 configured to project axially outward from one end portion of the take-up drum 61 as well as dimensional design limitation in axial directional size of the seatbelt retractor 1, the stopper mechanism 88 can be provided with movement amount of the stopper nut 63 being secured at ease.

Further, with respect to the fitting hole 77B of the stepped portion 77, depth thereof in the axial direction of the take-up drum 61 is set so that deepest position is located near the locking-unit-side flange portion 76, more specifically, located at the end periphery of the webbing insertion hole 74 at the locking unit 7 side. Therefore, the fitting hole 77B can be formed in the end portion of the take-up drum 61 at the locking unit 7 side without influence on attachment of the webbing 3 to the take-up drum 61.

Accordingly, without considering influence when attaching the webbing 3 to the take-up drum 61, size of the fitting hole 77B can be made as large as possible with respect to the outer diameter of the stepped portion 77 and that of the lock-unit-side flange portion 76 that is extended radially outward from the outer peripheral surface at the one end portion of the take-up drum 61. In other words, the size of the fitting hole 77B can be made as large as possible just paying attention to mechanical strength thereof.

Since outer diameter of the stopper nut 63 can be made large, strength of the stopper nut 63 can be secured easily. Further, thickness of the stopper nut 63 can be made thinner, downsizing of the stopper mechanism 88 can be achieved with respect to axial directional size thereof and eventually, downsizing of the seatbelt retractor 1 can be achieved with respect to axial directional size thereof, as well. Further, since outer diameter of the fixation boss 78 can be made large, mechanical strength of the stopper mechanism 88 can be secured easily.

Mounting pieces 82 of the ratchet gear 65 are fitted in corresponding concave portions 85 of the ratchet base 66. Thereafter, the rivet pins 82B are riveted. Thereby, there are formed six through holes 89 each of which is a rectangular shape in cross sectional view, near the radially inward portion of the ratchet gear teeth 65A so that the six holes 89 are arranged at an interval of roughly 60-degrees central angle on a concentric circle of which center is rotation axis. Thereafter, the shaft portion 83 of the lock gear 35 is fitted into the shaft hole portion 106A and six of convex portions 112, each being square pole shaped and erected on end surface of the locking gear 91 at the lock gear 35 side, are fitted in corresponding through holes 89.

Thereby, the locking gear 91 is mounted on the lock gear 35 co-axially in contact with the outer end surface of the lock gear 35 in a relatively non-rotatable manner. Further, the shaft portion 83 of the lock gear 35 is threaded through the rotational axis portion 106 of the locking gear 91, inserted in the supporting boss 103 of the mechanism cover 11 and supported thereby.

Since the locking gear 91 constituting the locking unit 7 gets in contact with the axially outer end surface of the lock gear 35, it is not necessary to arrange a clearance between the lock gear 35 and the locking gear 91 and thickness of the locking unit 7 constituting the lock mechanism 10 can be made thinner. Further, the locking unit 7 is required to have only two clearances, namely, a clearance between the locking gear 91 and the clutch 95 and a clearance between the clutch 95 and the bottom surface portion 97 of the mechanism cover 11 in axial direction. Therefore, the number of clearances to be arranged axially inward with respect to the locking unit 7 can be reduced and thickness of the locking unit 7 can be made thinner easily. Eventually, downsizing of the seatbelt retractor 1 can be achieved.

When relative rotation is caused between the lock gear 35 and the take-up drum 61 in response to an emergency such as vehicle collision and the like, torsional deformation caused to the shaft portion 62C of the torsion bar 62 continues so as to absorb the energy until the stopper nut 63 comes into contact with base end portion of the fixation boss 78 and the lock gear 35 and the take-up drum 61 are thoroughly fastened in a non-rotatable manner. Thereby, in an emergency such as vehicle collision and the like, torsional deformation caused to the shaft portion 62C of the torsion bar 62 can absorb the energy until pull-out action of the webbing 3 is stopped and thus, structure of collision energy absorption mechanism can be simplified.

[Second Embodiment]

Next, there will be described on a seatbelt retractor 171 directed to the second embodiment by referring to FIG. 20 through FIG. 25. It is to be noted that in the following description, reference numbers identical with those used for constituent elements of the seatbelt retractor 1 directed to the first embodiment shown in FIG. 1 through 19 stand for the constituent elements identical or substantially equivalent with those of the seatbelt retractor directed to the first embodiment.

The schematic configuration of the seatbelt retractor 171 directed to the second embodiment is almost the same as that of the seatbelt retractor 1 directed to the first embodiment. The seatbelt retractor 171 directed to the second embodiment differs in that a take-up drum unit 172 shown in FIG. 20 and FIG. 21 is arranged in place of the take-up drum unit 6.

[Schematic Configuration of Take-up Drum Unit]

Firstly, there will be described on the schematic configuration of the take-up drum unit 172 by referring to FIG. 20 through FIG. 22. FIG. 20 and FIG. 21 each show an exploded perspective view of the take-up drum unit 172. FIG. 22 is a view cross-sectioned in perpendicular to the rotational axis of the take-up drum unit 172 for describing operation to pull out a wire 173.

Figure 20:
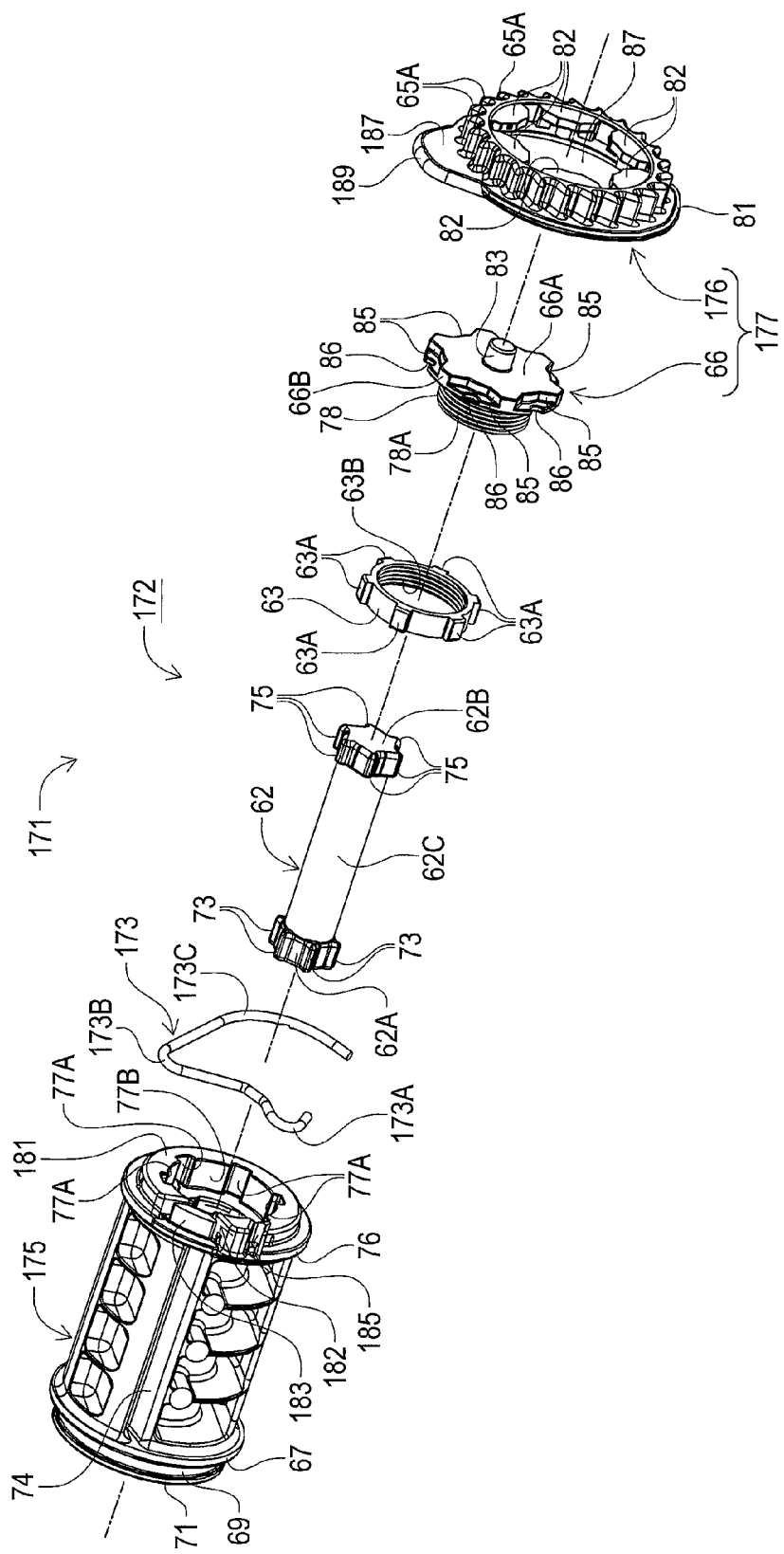
FIG. 20 is an exploded perspective view of a take-up drum unit of a seatbelt retractor according to a second embodiment.
Figure 21:
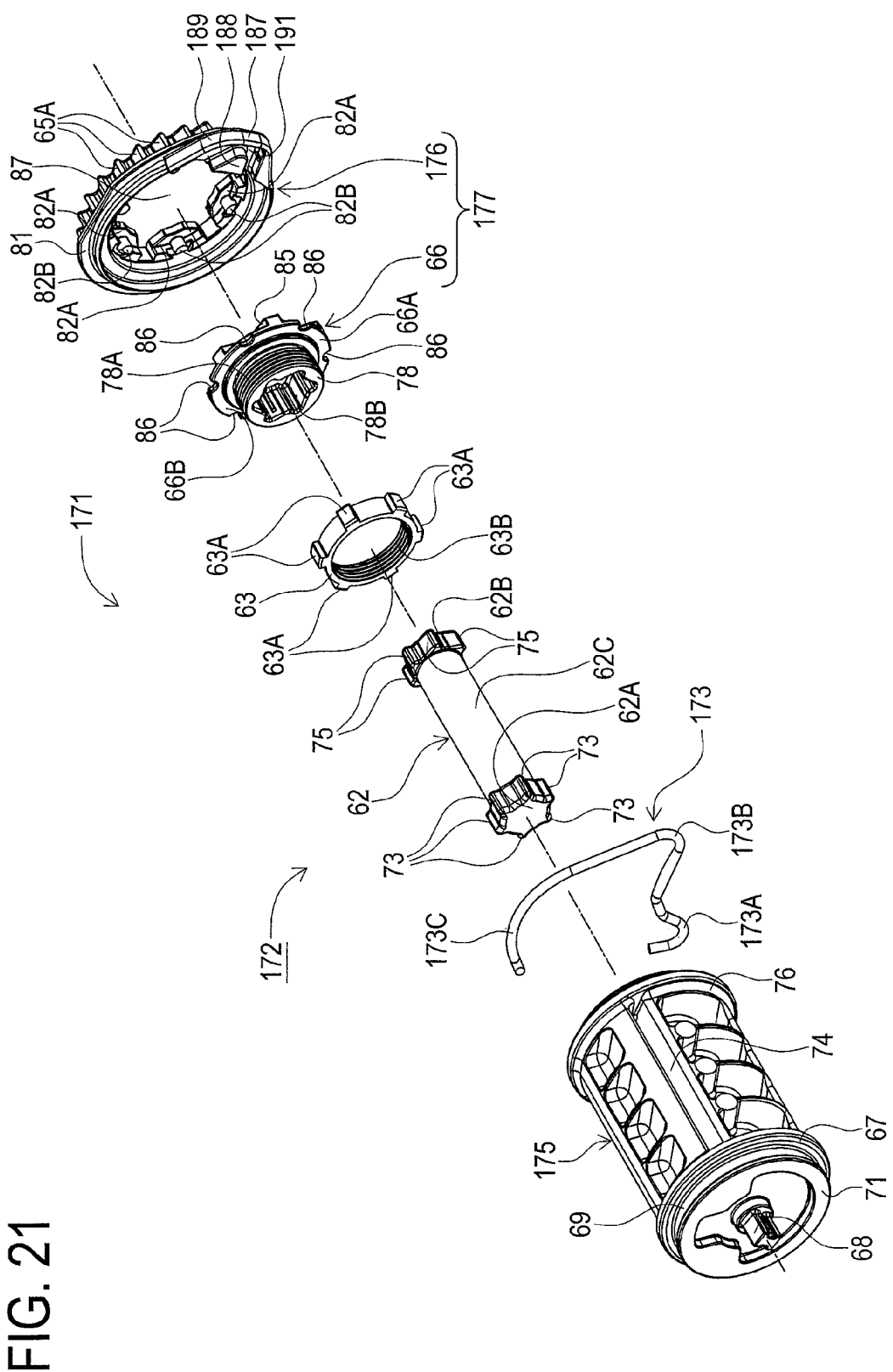
FIG. 21 is an exploded perspective view of the take-up drum unit of the seatbelt retractor according to the second embodiment.
Figure 22:
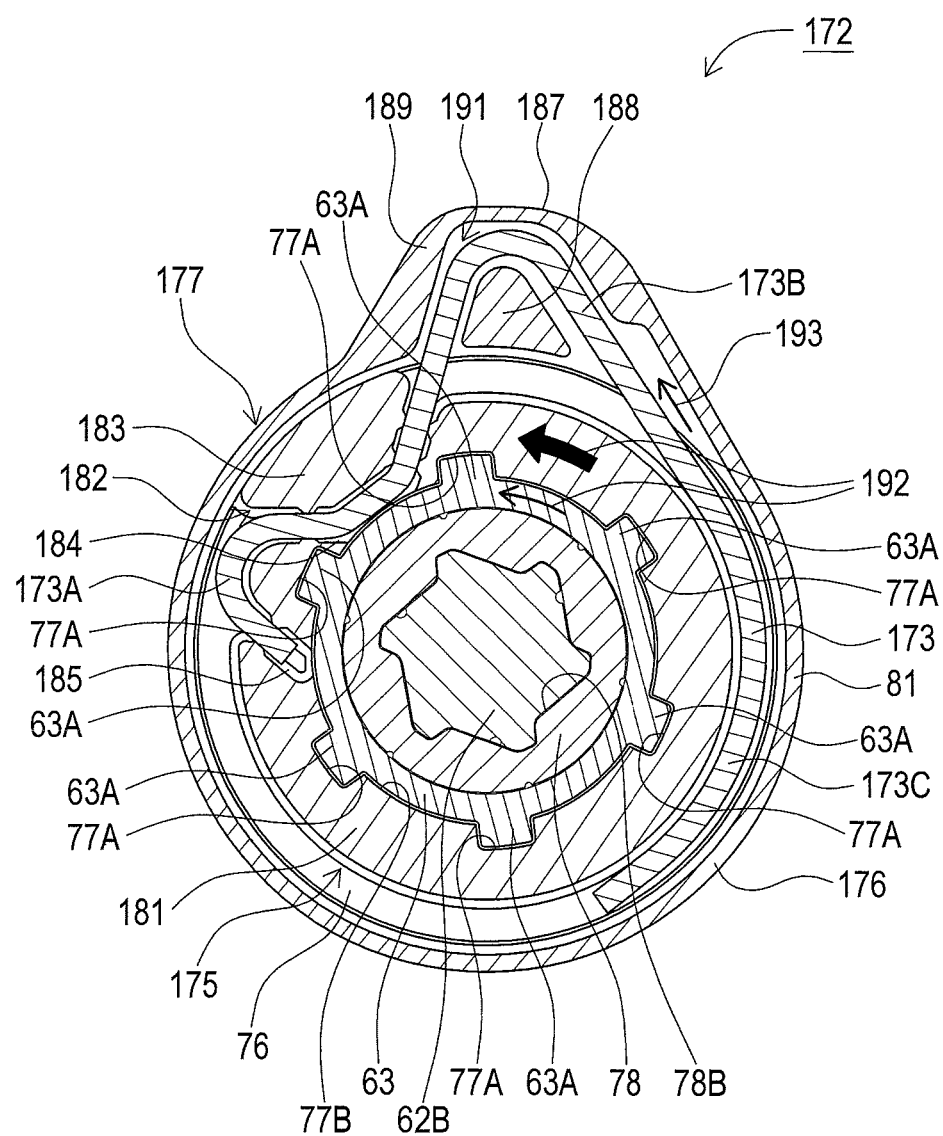
FIG. 22 is a view for describing a pull-out-wire operation.

As shown in FIG. 20 and FIG. 21, the configuration of the take-up drum unit 172 is almost the same as that of the take-up drum unit 6 in terms of including the torsion bar 62, the stopper nut 63, the ratchet base 66. However, for absorbing the energy, the take-up drum unit 172 includes the wire 173 that is a circular shape in cross-sectional view and made of metallic material such as stainless steel and the like. Therefore, the take-up drum unit 172 includes the take-up drum 175 and the ratchet gear 176, in place of the take-up drum 61. Further, in place of the lock gear 35, the take-up drum unit 172 includes the lock gear 177 consisting of the ratchet base 66 and the ratchet gear 176.

The configuration of the take-up drum 175 is almost the same as that of the take-up drum 61 but the structural difference lies in that: the stepped portion 181 having a cylindrical shape is arranged so as to project axially outward from the lock-unit-side flange portion 76; and the fitting hole 77B inside which the stopper nut 63 is housed is formed in coaxial with the shaft hole 61A. Further, in the inner periphery of the fitting hole 77B, of the length equal to the depth thereof, there are formed six groove portions 77A each having a spline-like shape, by every 60 degrees of equal center angle. To each of the six groove portions 77A, there is fitted a spline 63A having a square shaoe and projecting along the axial direction by every 60 degrees of equal center angle from the outer periphery of the stopper nut 63

Further, as shown in FIG. 20 and FIG. 22, there is formed a holding-side crooked path 182 on the outer peripheral surface of the stepped portion 181 as a part thereof, so that the crooked portion 173A at one end of the wire 173 is fixedly held thereat. The holding-side crooked path 182 consists of: a convex portion 183 that is substantially trapezoid shaped in front view so as to go narrower in an inner radial direction and configured to project axially outward from outer side surface of the lock-unit-side flange portion 76; a concave portion 184 that is configured to extend from the outer peripheral surface of the stepped portion 181 to the inner peripheral surface of the fitting hole 77B facing the convex portion 183; a groove portion 185 that is formed so as to extend toward oblique inner direction slanting in counterclockwise direction from the outer peripheral surface of the stepped portion 181 a bit away from an end portion at the counterclockwise direction in front view (counterclockwise directional side in FIG. 22) of the concave portion 184; and an outer peripheral surface between the concave portion 184 and the groove portion 185 on the stepped portion 181.

Further, at each set of opposite faces disposed slantwise in radial direction of the convex portion 183 and tht of the concave oirtuib 184, there is erected each set of thin opposite ribs along depth direction fo the holding-sude crooked path 182. Namely, a set of thin opposite ribs are provided in opposite face at the groove portion 185 side in peripheral direction and two sets of thin opposite ribs are provided in opposite faces at the opposite side in the peripheral direction with respect to the groove portion 185. Further, distance between each pair of opposite ribs is made smaller than outer diameter of the wire 173. Incidentally, height of each rib from the bottom portion of the holding-side crooked path 182 is made higher than the outer diameter of the wire 173.

The crooked portion 173A at the one end of the wire 173 is fitted in the holding-side crooked path 182 crushing each rib and fixedly held thereat. Further, the wire 173 includes a crooked portion 173B that is substantially up-side-down U shaped in front view and formed so as to continue to the crooked portion 173A and project exterior to the outer periphery of the lock-unit-side flange portion 76. The wire 173 further includes a crooked portion 173C that is formed so as to continue to the crooked portion 173B and shaped like arc along outer peripheral surface outline of the stepped portion 181.

As shown in FIG. 20 through FIG. 22, the configuration of the ratchet gear 176 is almost the same as that of the ratchet gear 65 but the difference thereof lies in arrangement of a trapezoid-like portion 187 that is extended radially outward from the outer peripheral portion of the flange portion 81 so that the upper side of the trapezoid-like portion 187 in front view is narrower than the lower side thereof keeping predetermined center angle (for instance, center angle of roughly 60 degrees). A convex portion 188 having a substantially mount-like shape in front view is formed at substantially center of an inner side surface of the trapezoid-like portion 187, more specifically, its surface at the take-up-drum 175 side so as to project axially outward from the trapezoid-like portion 187. The crooked portion 173B substantially up-side-down U shaped in front view, as a part of the wire 173, is fitted in the convex portion 188.

Further, on the inner surface of the flange portion 81, namely, its one surface at the take-up drum 175 side, a flange portion 189 is formed so as to project vertically and outwardly (leftward direction in FIG. 20) from the inner surface and extend along outer edge portions of the trapezoid-like portion 187. Further, the inner periphery of the flange portion 189 and the outer periphery of the convex portion 188 make up a deformation-giving crooked path 191 that is substantially up-side-down U shaped in front view (refer to FIG. 22). The wire 173 is guided and pulled out through the deformation-giving crooked path 191.

There will be described on attachment of the wire 173 to the take-up drum 175 and the lock gear 177 by referring to FIG. 20 through FIG. 22.

As shown in FIG. 20 through FIG. 22, the crooked portion 173A at one end of the wire 173 being bent like a substantially S-like shape is fitted in the holding-side crooked path 182 formed of the lock-unit-side flange portion 76 of the take-up drum 175 and the stepped portion 181. When the crooked portion 173A is fitted in the holding-side crooked path 182, each rib is crushed thereby. The crooked portion 173B that is substantially up-side-down U shaped in front view and formed to continue to the crooked portion 173A is placed so as to project exterior to the outer periphery of the lock-unit-side flange portion 76.

Further, the crooked portion 173C that is formed so as to continue to the crooked portion 173B and shaped like arc is placed along outer peripheral surface outline of the stepped portion 181. Thereby, the crooked portion 173A at one end of the wire 173 is fixedly held by the holding-side crooked path 182 formed of the lock-unit-side flange portion 76 of the take-up drum 175 and the stepped portion 181 while the crooked portion 173C is placed so as to face the lock-unit-side flange portion 76.

For assembling the lock gear 177, the shaft portion 83 arranged upright on the outer-side surface of the base portion 66A with respect to axial direction is inserted in the ratchet gear 176 (rightward direction in FIG. 20) while each notch portion 86 formed on the outer peripheral portion of the brim-like portion 66B is arranged so as to face each rivet pin 82B of each mounting piece 82 on the ratchet gear 176.

Next, each stepped portion 82A formed on each mounting piece 82 is fitted into each concave portion 85 of the brim-like portion 66B, while each notch portion 86 formed on the outer peripheral portion of the brim-like portion 66B gets in contact with outer periphery of each rivet pin 82B. Thereafter, a head of each rivet pin 82B is made plastically deformed so as to spread over each concave portion 82C of the bottom end portion and a periphery portion of the corresponding notch portion 86. Thereby, the ratchet base 66 is attached inside of the ratchet gear 176 in a relatively non-rotatable manner. The integration of the ratchet base 66 and the ratchet gear 176 is fixed to the take-up drum 175 so as not to remove therefrom, whereby the lock gear 177 is made up.

Accordingly, the peripheral edge portion of each mounting piece 82 of the ratchet gear 176 makes up the through hole 87 in which the base portion 66A of the ratchet base 66 is to be fitted. Further, as shown in FIG. 21, the external thread portion 78A of the fixation boss 78 can be set so that the bottom end portion thereof is located inside of the ratchet gear 176.

Next, the internal thread portion 63B of the stopper nut 63 is mounted on the external thread portion 78A of the fixation boss 78. That is to say, the stopper nut 63 constituting the stopper mechanism 88 is screwed with the fixation boss 78. Subsequently, the stopper nut 63 is rotated so that the end faces of the fixation boss 78 and that of the stopper nut 63 axially on the take-up drum 61 sides, respectively, are substantially coplanar.

Next, the connecting portion 62B of the torsion bar 62 provided on its insertion side to the lock gear 177 is press-fitted into the engaging concave portion 78B of the fixation boss 78, while inserting each spline 63A projecting at the outer circumference of the stopper nut 63 into each groove portion 77A formed on the inner circumference of the fitting hole 77B of the stepped portion 181. At the same time, the crooked portion 173B that is substantially up-side-down U shaped in front view and configured to project exterior to the outer periphery of the lock-unit-side flange portion 76 of the take-up drum 175 is fitted in the deformation-giving crooked path 191 formed at outer peripheral portion of the convex portion 188 arranged on the trapezoid-like portion 187 of the flange portion 81 of the lock gear 177.

Thereby, the wire 173 is arranged between the lock-unit-side flange portion 76 of the take-up drum 175 and the lock gear 177 and further, the lock gear 177 is attached to the take-up drum 175 through the torsion bar 62 in the relatively non rotatable manner. Still further, the stopper nut 63 constituting the stopper mechanism 88 is fitted inside the fitting hole 77B of the stepped portion 181 so as to be relatively non-rotatable with respect to the fitting hole 77B and to be relatively movable axially outward.

[Energy Absorption]

As explained, when the webbing 3 is pulled out in case of emergency such as vehicle collision, etc., the engagement of the pawl 23 and the ratchet gear teeth 65A serves to stop rotation of the lock gear 177 of the take-up drum unit 172 in the webbing-pull-out direction. Incidentally, the engagement of the pawl 23 and the ratchet gear teeth 65A is engagement structure that allows the take-up drum 175 to rotate in one direction, namely, in webbing-pull-out direction.

In a case where a vehicle occupant is relatively moved frontward with respect to the vehicle in a state that engagement of the pawl 23 and the ratchet gear teeth 65A of the lock gear 177 is kept, significantly large pull-out load acts on the webbing 3. As shown in FIG. 22, in a case where the webbing 3 is pulled out with the pull-out load exceeding predetermined value corresponding to threshold (e.g., approximately 4KN), rotation torque in the webbing-pull-out direction (to arrow 192) acts on the take-up drum 175.

Since the pawl 23 stops rotation of the lock gear 177, the connecting portion 62B of the torsion bar 62 press-fitted in an engagement convex portion 78B of the lock gear 177 is prevented from rotating in the webbing-pull-out direction. Therefore, of the torsion bar 62, the connecting portion 62A press-fitted into the shaft hole 61A of the take-up drum 175 is rotated by the rotation torque acting on the take-up drum 175 in the webbing-pill-out direction so that torsional deformation starts at the shaft portion 62C of the torsion bar 62. The take-up drum 175 is rotated in the webbing-pull-out direction due to the torsional deformation at the shaft portion 62C of the torsion bar 62, whereby, as "first energy absorption mechanism", the energy is absorbed in the form of the torsional deformation caused to the torsion bar 62.

Incidentally, since the pawl 23 and the lock gear 177 are engaged when the take-up drum 175 is rotated, relative rotation is caused between the lock gear 177 and the take-up drum 175. Consequently, relative rotation is subsequently caused between the wire 173 and the lock gear 177 due to rotation of the take-up drum 175, whereby, as "second energy absorption mechanism", the wire 173 serves to absorb the energy.

[Pull-out-Wire Operation]

Figure 23:
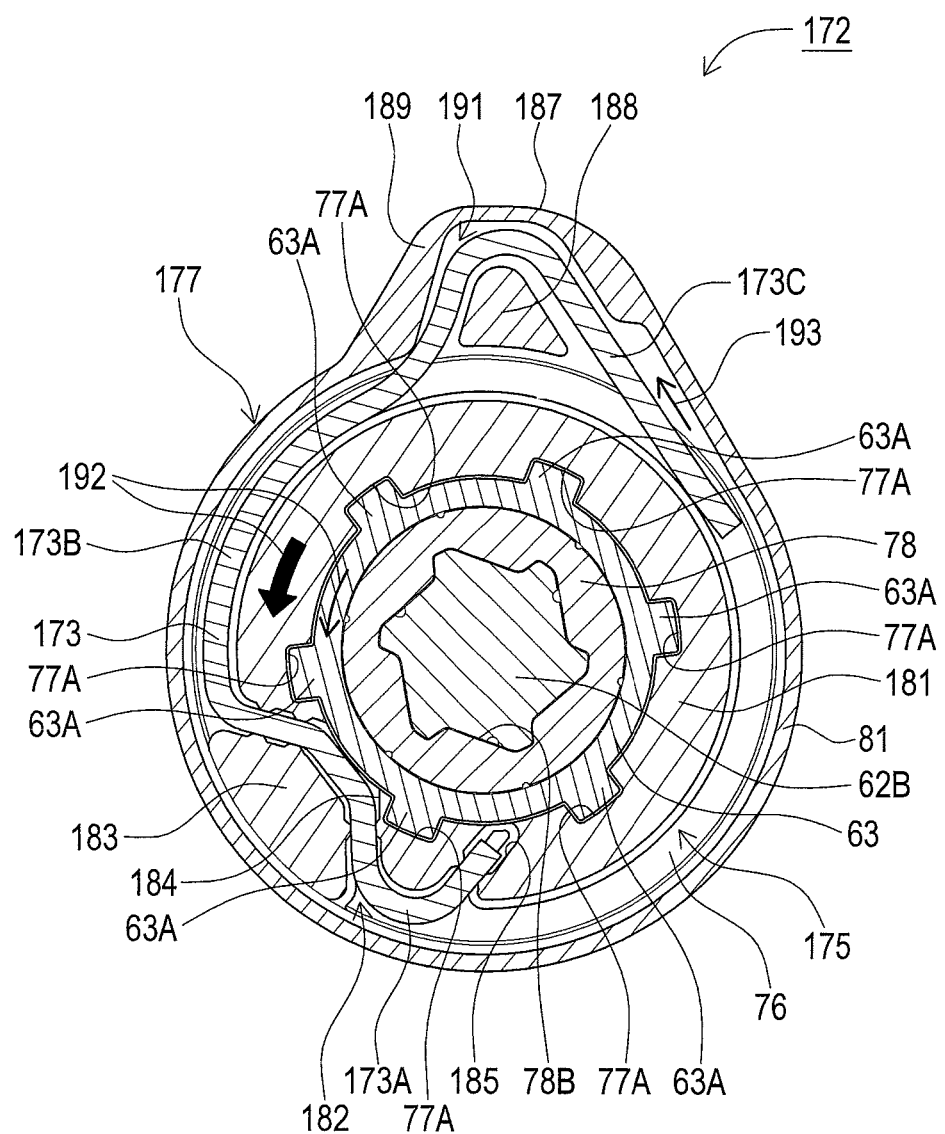
FIG. 23 is a view for describing the pull-out-wire operation.
Figure 24:
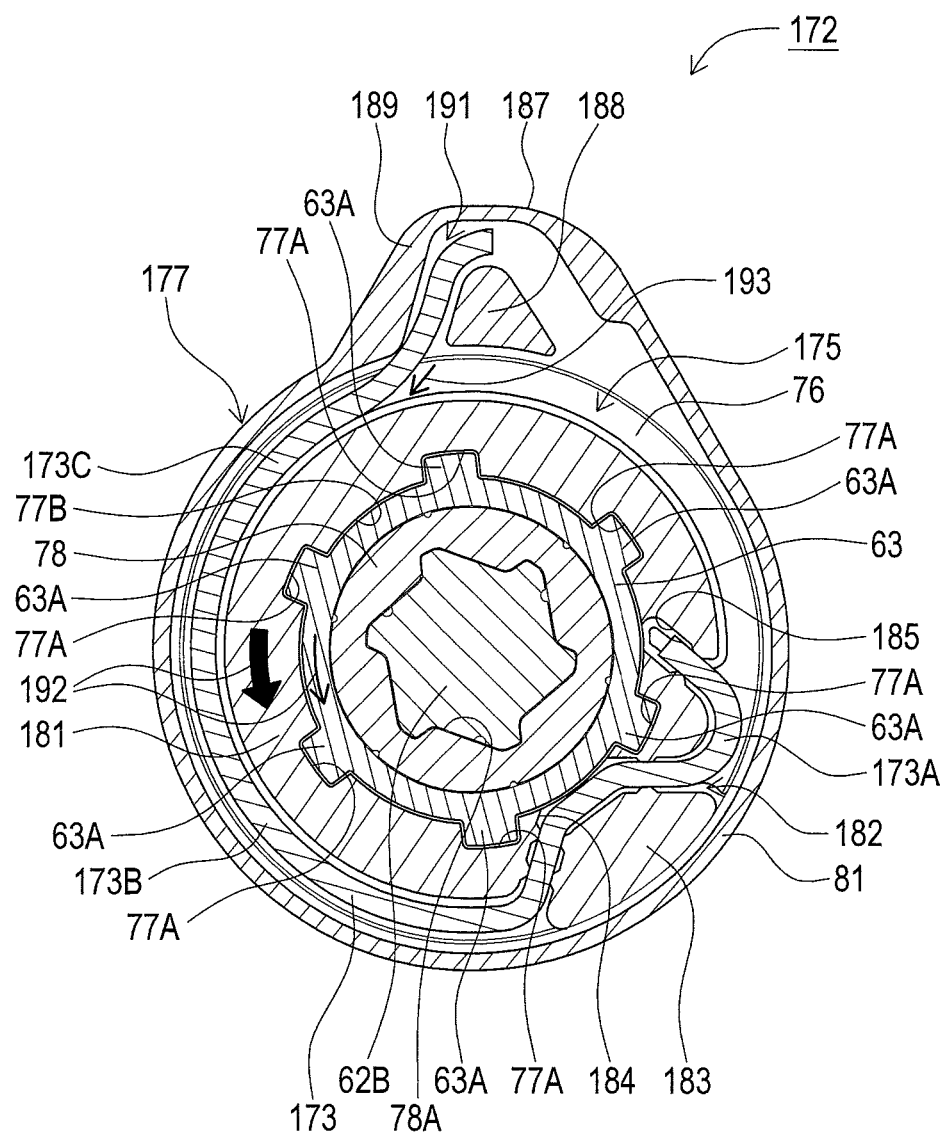
FIG. 24 is a view for describing the pull-out-wire operation.
Figure 25:
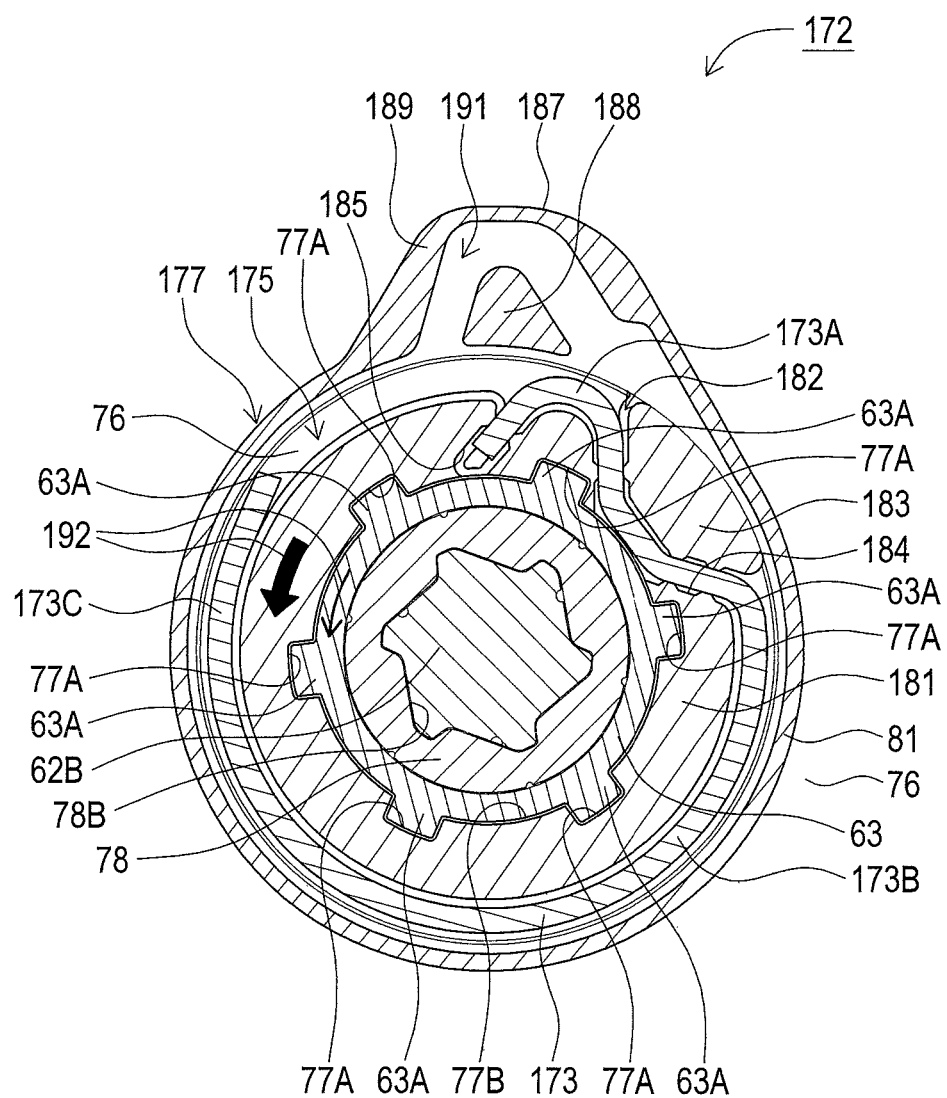
FIG. 25 is a view for describing the pull-out-wire operation.

Here will be described on the pull-out-wire operation for absorbing the energy with the wire 173 by referring to FIG. 22 through FIG. 25. Each of FIG. 23 through FIG. 25 is a view for describing the pull-out-wire operation.

As shown in FIG. 22, at the initial state between the take-up drum 176 and the lock gear 177, the wire's exit-side end portion of the the convex portion 183 and that of the concave portion 184 constituting the holding-side crooked path 182 of the take-up drum 175 are located near the wire-pull-out-side end portion of the deformation-giving crooked portion 191 formed on the outer periphery portion of the convex portion 188 arranged so as to project from the trapezoid-like portion 187 of the flange portion 81.

The crooked portion 173A that is a part of the wire 173 and bent like substantially S-like shaped is fitted in and fixedly held by the holding-side crooked path 182 constituted by the convex portion 183, the concave portion 184 and the groove portion 185 of the take-up drum 175. The crooked portion 173B substantially up-side-down U shaped in front view and formed so as to continue to the crooked portion 173A is fitted in the deformation-giving crooked path 191 formed on the outer peripheral portion of the convex portion 188 that is arranged so as to project from the trapezoid-like portion 187. Thereby, the wire's exit-side end portion of the holding-side crooked path 182 and the wire-pull-out-side end portion of the deformation-giving crooked path 191 communicate each other almost straight via the wire 173.

As shown in FIG. 22 through FIG. 25, when the take-up drum 175 rotates in the webbing-pull-out direction (in the direction indicated with the arrow 192) in response to webbing-pull-out operation, rotation of the lock gear 177 is stopped by the pawl 23 and the stepped portion 181 is relatively rotated in the webbing-pull-out direction (in the direction indicated with the arrow 192) with respect to the trapezoid-like portion 187 of the lock gear 177.

Thereby, the wire 173 of which crooked portion 173A is fixedly held by the holding-side crooked path 182 of the stepped portion 181 is firstly pulled in the direction of arrow 193, further pulled out undergoing deformation effect given by the deformation-giving crooked path 191, and finally taken up on the outer peripheral surface of the stepped portion 181, the deformation-giving crooked path 191 being substantially up-side-down U shaped in front view and formed of the convex portion 188 arranged so as to project from the center of the trapezoid-like portion 187 and the flange portion 189 arranged so as to project the outer peripheral portion of the trapezoid-like portion 187.

In concurrent with the pull-out operation of the wire 173, torsional deformation is caused to the torsion bar 62 by rotation of the take-up drum 175. At the same time, relative rotation is caused between the lock gear 177 and the take-up drum 175 because the pawl 23 and the lock gear 177 get engaged with each other when the take-up drum 175 is rotated. Consequently, the stopper nut 63 is rotated in the webbing-pull-out direction (indicated with arrow 192) together with the take-up drum 175 because each spline 63A is press-fitted in each groove portion 77A formed on the inner peripheral surface of the fitting hole 77B.

Accordingly, since relative rotation is caused between the stopper nut 63 and the fixation boss 78 of the lock gear 177, the stopper nut 63 to be screwed with the external thread portion 78A of the fixation boss 78 moves toward the base end portion of the fixation boss 78, namely, axially outward with respect to the take-up drum 175 (rightward direction in FIG. 20) along each groove portion 77A.

The wire 173 passes through the deformation-giving crooked path 191 substantially up-side-down U shaped in front view and gets deformed in such a manner that the wire 173 passes through there getting rubbed on the deformation-giving crooked path 191 at its side surface portion located at wire-pull-out-side end portion at the side of the rotational direction of the stepped portion 181 (in the direction indicated with the arrow 192) and the outer peripheral surface of the convex portion 188. Thereby, rubbing resistance is caused between the convex portion 188 and the wire 173 and bending resistance of the wire 173 itself is caused. Thus, the energy is absorbed by resistance caused when the wire 173 is pulled out, namely, pull-out resistance in corporation of rubbing resistance and bending resistance.

As shown in FIG. 25, when the end of the crooked portion 173 C of the wire 173 leaves the deformation-giving crooked path 191 along rotation of the take-up drum 175, the energy absorption action by the wire 173 terminates. Thereafter, there continues energy absorption action by only torsional deformation of the torsion bar 62 along rotation of the take-up drum 175.

In a case where amount of torsional deformation brought to the shaft portion 62C of the torsion bar 62 reaches a certain extent corresponding to the predetermined number of times of rotations (for instance, approximately 1.5 turns), the stopper nut 63 and fixation boss 78 are fastened to stop relative rotation therebetween in such a manner that the stopper nut 63 comes into contact with the brim-like portion 66B formed on the base end portion of the fixation boss 78. Thereby, owing to the intervention of the stopper mechanism 88 consisting of the stopper nut 63 press-fitted inside the fitting hole 77B and the fixation boss 78, the lock gear 177 and the take-up drum 175 are fastened so that relative rotation therebetween is stopped and pull-out of the webbing 3 is locked.

Thereby, even if large pull-out load acts on the webbing 3 due to an emergency such as vehicle collision, etc. and the torsion bar 62 is caused to rotates plural number of times to the extent of getting torsional deformation for absorbing kinetic energy of the vehicle occupant, the stopper mechanism 88 thoroughly fastens the lock gear 177 and the take-up drum 175 in a relatively non-rotatable manner. Since torsional deformation of the torsion bar 62 is put to an end by the time the lock gear 177 and the take-up drum 175 are fastened, the stopper mechanism 88 can prevent fracture of the shaft portion 62C exceeding the enduarable number of times of rotations.

Further, by properly setting the number of times of rotations to bring the shaft portion 62C of the torsion bar 62 into the state of torsional deformation to the extent that the stopper nut 63 comes in contact with the brim-like portion 66B on the base end portion of the fixation boss 78 of the lock gear 177, safety of the vehicle occupant can be secured in a state that the vehicle occupant is surely restrained so as to avoid secondary collision against steering wheel, automobile windshield, front seat, etc.

As shown in FIG. 25, the stopper nut 63 may be configured to come in contact with the brim-like portion 66B formed on the base end portion of the fixation boss 78 of the lock gear 177 so as fasten the stopper nut 63 and the fixation boss 78 in a relatively non-rotatable manner, when the end of the crooked portion 173C of the wire 173 leaves the deformation-giving crooked path 191 along relative rotation of the take-up drum 175 with respect to the lock gear 177, or a bit before leaving the deformation-giving crooked path 191.

Thereby, since webbing-pull-out action is locked in a state that the pull-out resistance of the wire 173 and torsional deformation of the torsion bar 62 concurrently work as the energy absorption action, safety of the vehicle occupant can be secured in a state that the vehicle occupant is surely restrained so as to avoid secondary collision against steering wheel, automobile windshield, front seat, etc.

Further, the trapezoid-like portion 187 may be formed on the lock-unit-side flange portion 76 of the take-up drum 175 so as to form the deformation-giving crooked path 191 in the take-up drum 175, and at the same time, the convex portion 183, the concave portion 184 and the groove portion 185 may formed at the lock gear 177 side so as to form the holding-side crooked path 182 and hold the wire 173 at the lock gear 177 side. In that case also, relative rotation is caused between the wire 173 and the take-up drum 175 along rotation of the take-up drum 175 caused by the relative rotation between the lock gear 177 and the take-up drum 175. Thereby, the energy absorption by the wire 173 as "second energy absorption mechanism" is performed.

As described in the above, in the seatbelt retractor 171 directed to the second embodiment, the crooked portion 173A formed at one end of the wire 173 and bent like substantially S-like shaped is inserted and fixedly held by the holding-side crooked path 182 formed of the lock-unit-side flange portion 76 of the take-up drum 175 and the stepped portion 181. Further, the crooked portion 173B substantially up-side-down U shaped in front view and formed so as to continue to the crooked portion 173A is fitted in the deformation-giving crooked path 191 formed on the trapezoid-like portion 187 of the flange portion 81 of the lock gear 177.

When relative rotation is caused between the lock gear 177 and the take-up drum 175 in response to an emergency such as vehicle collision and the like, pull-out resistance of the wire 173 and torsional deformation of the torsion bar 62 can cooperatively absorb the energy until the stopper nut 63 comes into contact with base end portion of the fixation boss 78 and the lock gear 177 and the take-up drum 175 are thoroughly fastened in a non-rotatable manner.

Thereby, in the case of an emergency such as vehicle collision and the like, the pull-out resistance of the wire 173 and the torsional deformation caused to the shaft portion 62C of the torsion bar 62 can cooperatively absorb the energy until pull-out operation of the webbing 3 is locked, in addition to the working effect of the seatbelt retractor 1 directed to the first embodiment. Accordingly, the mechanical structure of the energy absorption mechanism can be simplified.

Further, by variously setting the predetermined number of times of rotations (for instance, approximately 1.5 turns) in the form of amount of torsional deformation brought to the shaft portion 62C of the torsion bar 62, the pull-out operation of the webbing 3 can be locked at arbitrary moment such as in the state of the energy absorption performed by corporation of the pull-out resistance of the wire 173 and the torsional deformation of the torsion bar 62, in the state of the energy absorption performed by only the torsional deformation of the torsion bar 62.

The present invention is not limited to the above-described embodiments, but various improvements and alterations can be made thereto without departing from the spirit of the present invention. For instance, the following alternations can be made.

(A) For instance, regarding the ratchet gear 65 or/and the ratchet gear 176, the mounting pieces 82 may be connected continuously at their respective side edge portions, each of which extends from a bottom end portion to a radial directional center portion, in peripheral direction of the ratchet gear so as to omit formation of through holes 89. Further, the front end of the shaft portion 83 on the ratchet base 66 may be formed in a rectangle shape in cross-section. Further, regarding the locking gear 91, arrangement of six convex portions 112 may be omitted and the shaft hole portion 166A may be formed in a rectangle shape in cross-section so that the rectangle-shaped shaft portion 83 can be fitted in there.

Regarding the ratchet gear 65 or/and the ratchet gear 176, the peripheral both side edges on the bottom end portion of each mounting piece 82 are thus connected. Thereby, mechanical strength of the ratchet gear 65 or/and the ratchet gear 176 can be improved. Further, regarding the lock gear 35 or/and the lock gear 177, one end surface at outside of the axial direction is configured to get in contact with the locking gear 91 constituting the locking unit 7. Therefore, it is not necessary to arrange a clearance between the lock gear 35 or/and the lock gear 177 and the locking gear 91 and thickness of the locking unit 7 constituting the lock mechanism 10 can be made thinner.

(B) For instance, the lock gear 35 or/and the lock gear 177 may be made in integral structure from metallic material such as aluminum, steel, etc. by shaving. Thereby, working effect similar to the one achieved in the first embodiment or/and the second embodiment can be achieved.

(C) For instance, in the take-up drum unit 172 of the second embodiment, arrangement of the torsional bar 62 may be omitted. In that case, the stopper nut 63 is configured to get in contact with the brim-like portion 66B formed on the base end portion of the fixation boss 78 of the lock gear 177 so that the stopper nut 63 and the fixation boss 78 are fastened together in a relatively non-rotatable manner when the end of the crooked portion 173C of the wire 173 leaves the deformation-giving crooked path 191 along relative rotation of the take-up drum 175 with respect to the lock gear 177, or a bit before leaving the deformation giving crooked path 191

Thereby, since webbing-pull-out action is locked in a state that the pull-out resistance of the wire 173 works as the energy absorption action, safety of the vehicle occupant can be secured in a state that the vehicle occupant is surely restrained so as to avoid secondary collision against steering wheel, automobile windshield, front seat, etc.

The invention claimed is:

1. A seatbelt retractor comprising:
a take-up drum onto which a webbing is wound;
a lock mechanism having a lock member that is arranged near one end of the take-up drum and connected to the take-up drum with relative rotation between the take-up drum and the lock member being prohibited, the lock member being prohibited from rotating in a webbing-pull-out direction in case of emergency, and the take-up drum being allowed a relative rotation with respect to the lock member when force to pull out the webbing exceeds a predetermined value in a state that the lock member is prohibited from rotating in the webbing-pull-out direction;
an energy absorption mechanism arranged between the take-up drum and the lock member and configured to absorb energy by allowing the relative rotation between the take-up drum and the lock member; and
a stopper mechanism configured to stop the relative rotation between the take-up drum and the lock member when the take-up drum is rotated a predetermined number of times relative to the lock member,
wherein the lock member includes:
a cylindrical portion having lock teeth on an outer periphery thereof and having an inner bottom surface that (i) closes the cylindrical portion, (ii) faces the take-up drum, and (iii) is concentric with the take-up drum; and
a fixation boss provided at the inner bottom surface to face the take-up drum along an axial direction of the closed cylindrical portion, the fixation boss being concentric with the take-up drum and inserted in a fitting hole formed at the one end of the take-up drum and in a stepped portion that is located within the closed cylindrical portion and configured to project from the one end of the take-up drum in an axial direction of the take-up drum,
wherein the stopper mechanism includes a ring member that (i) is externally fitted and screwed to the fixation boss so as to be allowed relative rotation with respect to the fixation boss, (ii) has an outer peripheral surface fitted in the fitting hole so as to prohibit relative rotation of the ring member and allow the ring member to move in the axial direction of the take-up drum with respect to the fitting hole, and (iii) is movable toward a base end of the fixation boss in the axial direction of the take-up drum by the relative rotation with respect to the fixation boss,
wherein when the take-up drum is rotated the predetermined number of times relative to the lock member, the ring member comes into contact with the base end of the fixation boss and is prevented from moving so as to stop the relative rotation between the take-up drum and the lock member, and
wherein the base end portion of the fixation boss, including a surface of the base end portion that comes into contact with the ring member, is inside the closed cylindrical portion in the axial direction of the take-up drum and is located radially inward of the lock teeth of the closed cylindrical portion.

2. The seatbelt retractor according to claim 1,
wherein the lock member includes:
a ratchet gear member that has the closed cylindrical portion; and
a fixation member being fixed to the ratchet gear member so as to prohibit relative rotation with respect to the ratchet gear member and having the fixation boss on a center portion thereof facing to the take-up drum.

3. The seatbelt retractor according to claim 2,
wherein the ratchet gear member has a connecting portion provided inside of the closed cylindrical portion and including a through hole, and
wherein the fixation member is attached to the connecting portion so that the fixation member is fitted in at least a part of the through hole.

4. The seatbelt retractor according to claim 3,
wherein the connecting portion includes a plurality of mounting pieces extended radially inward from the inner peripheral surface of the closed cylindrical portion, wherein the fixation member includes a brim-like portion configured to project radially outward from the base end portion of the fixation boss with respect to rotational axis of the take-up drum, and wherein the brim-like portion includes a plurality of concave portions at a radially outer peripheral portion so that the plurality of mounting pieces are fitted in the plurality of concave portions, and wherein the brim-like portion is attached to the connecting portion so that the plurality of mounting pieces are fitted in the plurality of concave portions and the fixation member is attached to the ratchet gear member so as to prohibit relative rotation therebetween.

5. The seatbelt retractor according to claim 4,
wherein the ratchet gear member includes a plurality of pins arranged so as to erect on the connecting portion,
wherein the fixation member includes a plurality of notch portions formed on an outer peripheral portion of the brim-like portion so that the plurality of pins are fitted in the plurality of notch portions,
wherein heads of the plurality of pins are configured to project from the plurality of notch portions when the plurality of pins are fitted in the plurality of notch portions, and
wherein, the fixation member is fixedly attached to the ratchet gear member by causing the heads of the plurality pins to get plastically deformed and cover at least a part of the brim-like portion after the plurality of pins are fitted in the plurality of notch portions.

6. The seatbelt retractor according to claim 4,
wherein the brim-like portion is provided on the fixation member at an edge portion located at an axially opposite side with respect to the take-up drum, and
wherein the brim-like portion is attached to the connecting portion so that a surface of the brim-like portion constitutes at least a part of a surface of the ratchet gear facing an opposite side with respect to the take-up drum.

7. The seatbelt retractor according to claim 2, wherein the fixation member is made from material of which strength is higher than strength of material used for the ratchet gear member.

8. The seatbelt retractor according to claim 1, wherein the fitting hole has a deepest position in the axial direction of the take-up drum at a location near a flange portion that is extended radially outward from an outer periphery of the one end of the take-up drum.

9. The seatbelt retractor according to claim 1, wherein the energy absorption mechanism includes a torsion bar that is inserted and fitted inside the take-up drum in such a manner that one axial end of the torsion bar is fixed to the other end of the take-up drum so as to prohibit relative rotation with respect to the take-up drum and the other axial end of the torsion bar is fixed to the fixation boss so as to prohibit relative rotation with respect to the fixation boss, the torsion bar absorbing energy in a form of torsional deformation caused by relative rotation between the take-up drum and the lock member.

* * * * *